United States Patent
Yeo et al.

(10) Patent No.: US 11,595,848 B2
(45) Date of Patent: Feb. 28, 2023

(54) METHOD AND APPARATUS FOR TRANSMISSION AND RECEPTION OF DATA IN COMMUNICATION SYSTEM

(71) Applicant: Samsung Electronics Co., Ltd., Suwon-si (KR)

(72) Inventors: Jeongho Yeo, Suwon-si (KR); Suha Yoon, Suwon-si (KR); Hyunseok Ryu, Suwon-si (KR); Cheolkyu Shin, Suwon-si (KR); Sungjin Park, Suwon-si (KR); Jonghyun Bang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/221,266

(22) Filed: Apr. 2, 2021

(65) Prior Publication Data

US 2021/0321291 A1 Oct. 14, 2021

(30) Foreign Application Priority Data

Apr. 3, 2020 (KR) .................. 10-2020-0040810
May 14, 2020 (KR) .................. 10-2020-0057916
Nov. 5, 2020 (KR) .................. 10-2020-0147068

(51) Int. Cl.
*H04W 28/06* (2009.01)

(52) U.S. Cl.
CPC .................. *H04W 28/06* (2013.01)

(58) Field of Classification Search
CPC ... H04L 1/0002; H04L 1/0041; H04L 1/0007; H04L 1/0045; H04L 1/0009; H04L 1/0003; H04W 28/06; H04W 28/22

See application file for complete search history.

(56) References Cited

U.S. PATENT DOCUMENTS

| 8,169,907 | B1 | 5/2012 | Khanka et al. |
| 9,197,364 | B1 * | 11/2015 | von der Embse ........ H04L 1/00 |
| 9,374,806 | B2 * | 6/2016 | Han .................. H04W 40/246 |
| 10,733,498 | B1 * | 8/2020 | Diamant .......... G06V 30/19173 |
| 10,949,736 | B2 * | 3/2021 | Deisher ................ G06N 3/0454 |

(Continued)

FOREIGN PATENT DOCUMENTS

| CN | 102098727 B | 5/2014 |
| KR | 10-2020-0099044 A | 8/2020 |
| WO | 2010/054002 A2 | 5/2010 |

OTHER PUBLICATIONS

5G; NR; User Equipment (UE) radio access capabilities, ETSI TS 138 306 V15.3.0, (Release 15), Oct. 31, 2018.

(Continued)

*Primary Examiner* — Syed Ali
(74) *Attorney, Agent, or Firm* — Jefferson IP Law, LLP

(57) ABSTRACT

The disclosure relates to a communication technique for combining an IoT technology with a 5G communication system for supporting a higher data transmission rate than a 4G system, and a system therefor. The disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies.

10 Claims, 28 Drawing Sheets

(56) References Cited

U.S. PATENT DOCUMENTS

| | | | |
|---|---|---|---|
| 2015/0031361 A1 | 1/2015 | Timus et al. | |
| 2016/0227005 A1* | 8/2016 | Kwon | H04L 69/22 |
| 2018/0083751 A1* | 3/2018 | Seo | H04L 5/0048 |
| 2019/0157770 A1* | 5/2019 | Park | H04W 72/0446 |
| 2020/0077386 A1* | 3/2020 | Papasakellariou | H04L 1/1671 |
| 2020/0322944 A1* | 10/2020 | Soriaga | H04L 41/0806 |
| 2021/0050956 A1* | 2/2021 | Yeo | H04L 1/0057 |
| 2021/0344413 A1* | 11/2021 | Gao | H04W 28/0278 |

OTHER PUBLICATIONS

International Search Report dated Jul. 6, 2021, issued in International Application No. PCT/KR2021/004210.
3GPP TS 38.306 V15.8.0,3rd Generation Partnership Project; Technical Specification Group Radio Access Network; NR; User Equipment (UE) radio access capabilities(Release 15), Dec. 2019.
3GPP TS 38.212 V15.8.0, 3rd Generation Partnership Project;Technical Specification Group Radio Access Network; NR; Multiplexing and channel coding(Release 15), Dec. 2019.

* cited by examiner

BLOCK DIAGRAM OF CHANNEL CODING IN WHICH OUTER CODE IS NOT USED (600)

BLOCK DIAGRAM OF CHANNEL CODING IN WHICH OUTER CODE IS USED (650)

METHOD AND APPARATUS FOR TRANSMISSION AND RECEPTION OF DATA IN COMMUNICATION SYSTEM

CROSS-REFERENCE TO RELATED APPLICATION(S)

This application is based on and claims priority under 35 U.S.C. § 119(a) of a Korean patent application number 10-2020-0040810, filed on Apr. 3, 2020, in the Korean Intellectual Property Office, of a Korean patent application number 10-2020-0057916, filed on May 14, 2020, in the Korean Intellectual Property Office, and of a Korean patent application number 10-2020-0147068, filed on Nov. 5, 2020, in the Korean Intellectual Property Office, the disclosure of each of which is incorporated by reference herein in its entirety.

BACKGROUND

1. Field

The disclosure relates to a communication system. More particularly, the disclosure relates to a method and an apparatus for scheduling and transmitting/receiving data according to the amount of data that a terminal can process or according to a data rate.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to smoothly provide these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for scheduling and transmitting/receiving data according to the amount of data that a terminal can process or according to a data rate.

In a wireless communication system, particularly in an NR system, the data rate that a terminal can support may be predetermined between the base station and the terminal. This may be calculated by using the maximum frequency band supported by the terminal, the maximum modulation order, the maximum layer number, and the like. The base station cannot schedule, for the terminal, an amount of data corresponding to an instantaneous data rate higher than the calculated data rate. In addition, scheduling operations by the base station and data transmission/reception operations by the terminal may vary depending on how the instantaneous data rate is calculated.

The NR system may provide not only data communication between the base station and the terminal, but also data communication between terminals. In the case of data communication between terminals, it is necessary to determine the data rate that the terminals can support. It is also necessary to define operations of terminals following the determined data rate and scheduling information.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes identifying a counterpart of a communication of the terminal as another terminal, obtaining at least one parameter for identifying a data rate for the communication, and identifying the data rate based on the at least one parameter and following equation:

$$\text{data rate (in Mbps)} = 10^{-6} \cdot v_{Layers} \cdot f \cdot Q_m \cdot R_{max} \cdot \frac{N_{PRB}^{BW,\mu} \cdot 12}{T_s^\mu} \cdot (1 - OH)$$

In accordance with another aspect of the disclosure, a terminal in a communication system is provided. The terminal includes a transceiver and a controller coupled with the transceiver and configured to identify a counterpart of a communication of the terminal as another terminal, obtain at least one parameter for identifying a data rate for the communication, and identify the data rate based on the at least one parameter and following equation:

$$\text{data rate (in Mbps)} = 10^{-6} \cdot v_{Layers} \cdot f \cdot Q_m \cdot R_{max} \cdot \frac{N_{PRB}^{BW,\mu} \cdot 12}{T_s^\mu} \cdot (1 - OH)$$

According to the disclosure, a terminal and a base station may determine the maximum data rate during communication between the terminal and another terminal or during communication between the terminal and the base station, and a device that performs scheduling may efficiently transmit/receive data by scheduling the same such that the maximum data rate supported by the counterpart terminal is not exceeded.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
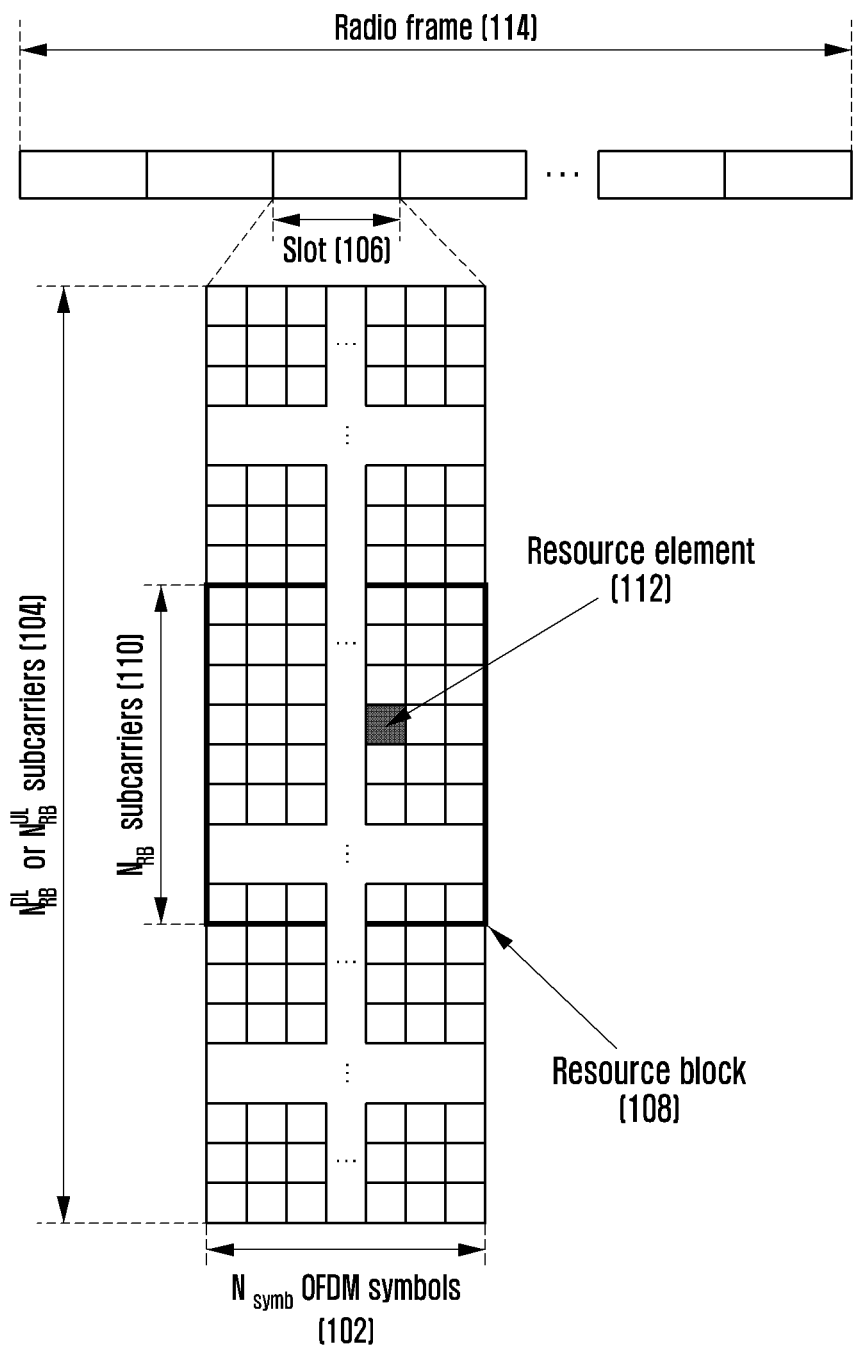
FIG. 1 illustrates a basic structure of a time-frequency domain, which is a radio resource domain in which data or a control channel is transmitted in a downlink or uplink in an NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New radio access technology (NR), which is new 5G communication, is designed to enable various services to be freely multiplexed in time and frequency resources. Accordingly, in the NR system, a waveform, numerology, and/or a reference signal may be dynamically or freely allocated according to needs of a corresponding service. In order to provide an optimal service to a terminal in wireless communication, it is required to perform data transmission optimized based on measurements of channel quality and interference. Accordingly, it is essential to accurately measure a channel state. The channel and interference characteristics are not dramatically changed depending on a frequency resource in a 4G communication system. However, unlike the 4G communication system, the channel and interference characteristics are dramatically changed depending on a service in the case of a 5G channel. Accordingly, subset support in a frequency resource group (FRG) dimension may be required in order to separately measure channel and interference characteristics for each frequency resource. Meanwhile, the types of services supported in the NR system may be categorized into enhanced mobile broadband (eMBB), massive machine type communications (mMTC), and ultra-reliable and low-latency communications (URLLC). The eMBB may be a service that targets high-speed transmission of high-capacity data. The mMTC may be a service that targets minimizing power consumption by a terminal and access of multiple terminals. URLLC may be a service that targets high-reliability and low-latency. Different requirements may be applied depending on the type of service applied to a terminal.

As research on the next generation communication system is being conducted, various methods for scheduling communication with a terminal are currently being discussed. Accordingly, there is a desire for an efficient scheduling and data transmission/reception scheme in consideration of the characteristics of the next generation communication system.

As described above, a plurality of services may be provided to a user in a communication system, and in order to provide the plurality of services to a user, there is a desire for a method and apparatus for providing respective services in the same time interval.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved into a broadband wireless communication system that provides a high speed and high quality packet data service, like the communication standards of, for example, high speed packet access (HSPA), long term evolution (LTE or evolved universal terrestrial radio access (E-UTRA)), and LTE-advanced (LTE-A) of 3GPP, high rate packet data (HRPD) and ultra-mobile broadband (UMB) of 3GPP2, 802.16e of IEEE, and the like, departing from the early stage of providing only voice-oriented services. Further, communication standards for 5G or new radio (NR) have been made in a fifth generation wireless communication system.

An NR system, which is a representative example of the broadband wireless communication system, adopts an orthogonal frequency division multiplexing (OFDM) scheme for a downlink (DL) and an uplink. More specifically, a cyclic-prefix OFDM (CP-OFDM) scheme is adopted for a downlink, and two schemes including a CP-OFDM scheme and a discrete Fourier transform spreading OFDM (DFT-S-OFDM) scheme are adopted for an uplink. An uplink refers to a radio link through which a terminal (user equipment (UE)) or a mobile station (MS) transmits data or control signals to a base station (BS or gNode B). A downlink refers to a radio link through which a base station transmits data or control signals to a terminal. In multiple access schemes as described above, time-frequency resources, on which data or control information is to be carried to each user, are usually allocated and managed to satisfy orthogonality, i.e., not to overlap to each other, so that data or control information for each user is distinguished.

The NR system employs a hybrid automatic repeat request (HARQ) scheme that retransmits corresponding data in a physical layer if decoding fails at the initial transmission. In a HARQ scheme, if a receiver fails to accurately decode data, the receiver transmits, to a transmitter, information (negative acknowledgement (NACK)) notifying of a decoding failure, to allow the transmitter to retransmit the corresponding data in a physical layer. The receiver combines data retransmitted by the transmitter with the previous data, for which decoding has failed, to increase a data reception performance. In addition, if the receiver accurately decodes data, the receiver transmits, to the transmitter, information (acknowledgement (ACK)) notifying of a decoding success, to allow the transmitter to transmit new data.

FIG. 1 illustrates a basic structure of a time-frequency domain, which is a radio resource region in which data or a control channel is transmitted through a downlink or uplink in an NR system according to an embodiment of the disclosure.

Referring to FIG. 1, the horizontal axis indicates the time domain, and the vertical axis indicates the frequency domain. The minimum transmission unit in the time domain is an OFDM symbol, and $N_{symb}$ OFDM symbols 102 are gathered to configure one slot 106. The length of a subframe is defined as 1.0 ms, and a radio frame 114 is defined as 10 ms. The minimum transmission unit in the frequency domain is a subcarrier, and the bandwidth of the entire system transmission band is configured by a total of $N_{RB}^{DL}$ or $N_{RB}^{UL}$ subcarriers 104.

In the time-frequency domain, the basic resource unit is a resource element (RE) 112, and an RE is expressed by an OFDM symbol index and a subcarrier index. A resource block (RB) 108 (or physical resource block (PRB)) is defined by $N_{symb}$ consecutive OFDM symbols 102 in the time domain and $N_{RB}$ consecutive subcarriers 110 in the frequency domain. Therefore, one RB 108 is configured by $N_{symb} \times N_{RB}$ REs. Generally, the minimum transmission unit of data is an RB unit. In the NR system, $N_{symb}$=14, $N_{RB}$=12, and $N_{RB}^{DL}$, $N_{RB}^{UL}$ is proportional to the bandwidth of the system transmission band. In addition, the data rate may increase in proportion to the number of RBs scheduled for the terminal.

In the NR system, in the case of a FDD system in which downlink and uplink are operated at separate frequencies, the downlink transmission bandwidth and the uplink transmission bandwidth may be different from each other. The channel bandwidth indicates an RF bandwidth corresponding to the system transmission bandwidth. Table 1 shows a correspondence between a system transmission bandwidth and a channel bandwidth defined in an LTE system, the fourth generation wireless communication, before the NR system. For example, in an LTE system having a channel bandwidth of 10 MHz, a transmission bandwidth may include 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The NR system may operate at a wider channel bandwidth than the channel bandwidth of LTE proposed in Table 1.

The bandwidth of the NR system may have a configuration as shown in Table 2 and Table 3. Table 2 describes the bandwidth configuration of frequency range 1 (FR1), and Table 3 describes the bandwidth configuration of frequency range 2 (FR2).

TABLE 2

| 13 | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Channel bandwidth $BW_{Channel}$ [MHz] | Subcarriers width | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, the frequency range may be divided and defined as FR1 and FR2. For example, FR1 denotes 450 MHz to 7125 MHz, and FR2 denotes 24250 MHz~52600 MHz.

In the above, the ranges of FR1 and FR2 may be differently changed and applied. For example, the frequency range of FR1 may be changed from 450 MHz to 7125 MHz and applied.

In the NR system, scheduling information for downlink data or uplink data may be transmitted from a base station to a terminal via downlink control information (DCI). The DCI is defined according to various formats, and the DCI may indicate whether it is scheduling information (UL grant) for uplink data or scheduling information (DL grant) for downlink data, whether it is a compact DCI having a small amount of control information, whether or not spatial multiplexing using multiple antennas is applied, or whether or not DCI for power control is applied, according to each format. For example, DCI format 1-1, which is scheduling control information (DL grant) for downlink data, may include at least one of the following pieces of control information.

Carrier indicator: indicates a carrier frequency at which transmission is performed.

DCI format indicator: DCI format indicator indicates whether the corresponding DCI is for downlink or for uplink.

Bandwidth part (BWP) indicator: indicates a BWP in which transmission is performed.

Frequency domain resource assignment: indicates an RB of the frequency domain, which is allocated for data transmission. A resource is determined according to a system bandwidth and a resource allocation scheme.

Time domain resource assignment: indicates a slot and an OFDM symbol of the slot, in which a data-related channel is to be transmitted.

VRB-to-PRB mapping: indicates a mapping scheme by which a virtual RB (VRB) index is mapped to a physical RB (PRB) index.

Modulation and coding scheme (MCS): indicates a codding rate and a modulation scheme used for data transmission. That is, MCS may indicate a coding rate value capable of indicating a transport block size (TBS) and channel coding information together with information relating to QPSK, 16 QAM, 64 QAM, and 256 QAM.

Code block group (CBG) transmission information: indicates information on a CBG which is transmitted when retransmission in units of CBG is configured.

HARQ process number: indicates a process number of HARQ.

New data indicator: indicates whether HARQ transmission is initial transmission or retransmission.

Redundancy version: indicates the redundancy version of HARQ.

Transmit power control (TPC) command for physical uplink control channel (PUCCH): indicates a TPC command for the PUCCH serving as an uplink control channel.

In the case of PUSCH transmission, time-domain resource assignment may be performed based on information about a slot in which a PUSCH is transmitted, a start symbol position S in the corresponding slot, and the number L of symbols to which the PUSCH is mapped. In the above, S may be a relative position from the start of a slot, L may be the number of consecutive symbols, and S and L may be determined based on a start and length indicator value (SLIV) defined as follows.

if $(L-1) \leq 7$ then $$SLIV = 14 \cdot (L-1) + S$$

else $$SLIV = 14 \cdot (14-L+1) + (14-1-S)$$

where $0 < L \leq 14-S$

Generally, in the NR system, a terminal may receive, through RRC configuration, configuration of a table in which an SLIV value, a PDSCH or PUSCH mapping type, and information (for example, a form of Table), on a slot in which a PDSCH or PUSCH is transmitted are included in one row. Thereafter, for the time-domain resource assignment of the DCI, by indicating an index value in the table configured as above, a base station may transmit, to a terminal, the SLIV value, the PDSCH or PUSCH mapping type, and information on the slot in which the PDSCH or PUSCH is transmitted.

In the NR system, the PUSCH mapping type is defined by type A and type B. In the PUSCH mapping type A, the first symbol among DMRS symbols is located at the second or the third OFDM symbol in a slot. In the PUSCH mapping type B, the first symbol among DMRS symbols is located at the first OFDM symbol in a time domain resource assigned via PUSCH transmission.

In the NR system, the PDSCH mapping type is defined by type A and type B. The first symbol among DMRS symbols may be located in the first symbol of the PDSCH.

Table 4 and Table 5 each indicate a combination of S and L, which are supported for each type of the PDSCH and the PUSCH.

TABLE 4

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3 . . . 14} | {3 . . . 14} | {0, 1, 2, 3} (Note 1) | {3 . . . 12} | {3 . . . 12} |
| Type B | {0 . . . 12} | {2, 4, 7} | {2 . . . 14} | {0 . . . 10} | {2, 4, 6} | {2 . . . 12} |

Note 1:
S = 3 is applicable only if dmrs-TypeA-Posiition = 3

TABLE 5

| PUSCH mapping type | Normal cyclic prefix | | | Extended cyclic prefix | | |
|---|---|---|---|---|---|---|
| | S | L | S + L | S | L | S + L |
| Type A | 0 | {4 . . . 14} | {1 . . . 14} | 0 | {4 . . . 12} | {4 . . . 12} |
| Type B | {0 . . . 13} | {1 . . . 14} | {1 . . . 14} | {0 . . . 12} | {1 . . . 12} | {1 . . . 12} |

The DCI may be subjected to a channel coding and modulation process, and may then be transmitted through a physical downlink control channel (PDCCH) (or "control information", hereinafter used interchangeably), which is a downlink physical control channel.

Generally, the DCI is scrambled with a specific radio network temporary identifier (RNTI) (or a terminal identifier), independently for each terminal, a cyclic redundancy identify (CRC) is added thereto, and channel coding is performed, whereby each independent PDCCH is configured and transmitted. The PDCCH is mapped and transmitted in a control resource set (CORESET) configured for a terminal.

The downlink data may be transmitted through a physical downlink shared channel (PDSCH) serving as a physical channel for downlink data transmission. The PDSCH may be transmitted after a control channel transmission interval, and scheduling information, such as a specific mapping position and modulation scheme, in the frequency domain may be determined based on DCI transmitted through the PDCCH.

Through an MCS among control information included in the DCI, a base station may notify a terminal of a modulation scheme applied to a PDSCH to be transmitted, and the size (transport block size (TBS)) of data to be transmitted. In an embodiment, the MCS may be configured by 5 bits or more or fewer bits. The TBS corresponds to the size of data (transport block, TB) that the base station desires to transmit, before channel coding for error correction is applied to the data.

In the disclosure, a transport block (TB) may include a medium access control (MAC) header, a MAC control element (CE), one or more MAC service data units (SDUs), and padding bits. According to another embodiment, the TB may indicate the unit of data, which is dropped from a MAC layer to a physical layer, or a MAC protocol data unit (MAC PDU).

The modulation schemes supported by the NR system are quadrature phase shift keying (QPSK), 16 quadrature amplitude modulation (16 QAM), 64 QAM, and 256 QAM. Modulation orders ($Q_m$) of the QPSK, 16 QAM, 64 QAM, and 256 QAM correspond to 2, 4, 6, and 8, respectively. That is, 2 bits per symbol in the case of QPSK modulation, 4 bits per symbol in the case of 16 QAM modulation, 6 bits per symbol in the case of 64 QAM modulation, and 8 bits per symbol in the case of 256 QAM modulation may be transmitted.

Figure 2:
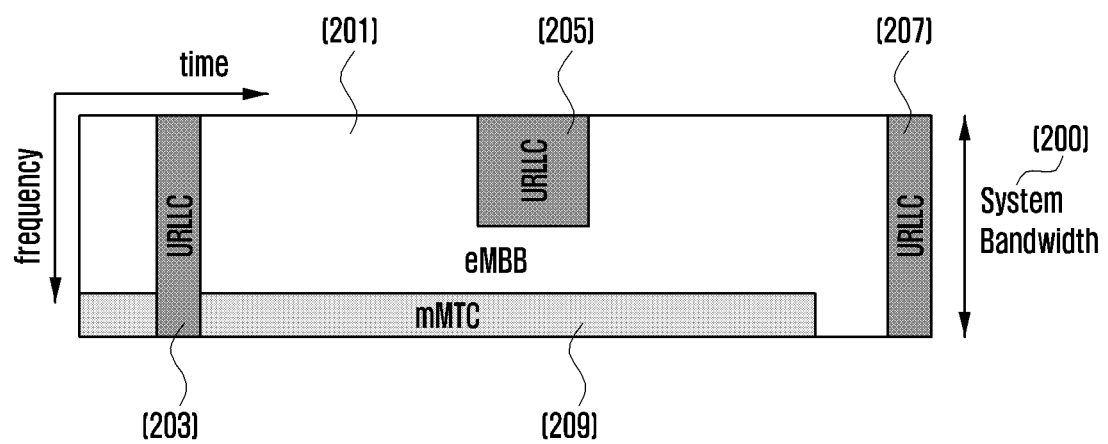
FIG. 2 illustrates an aspect in which pieces of data for eMBB, URLLC, and mMTC, which are services considered in a 5G or NR system, are allocated in frequency-time resources according to an embodiment of the disclosure.
Figure 3:
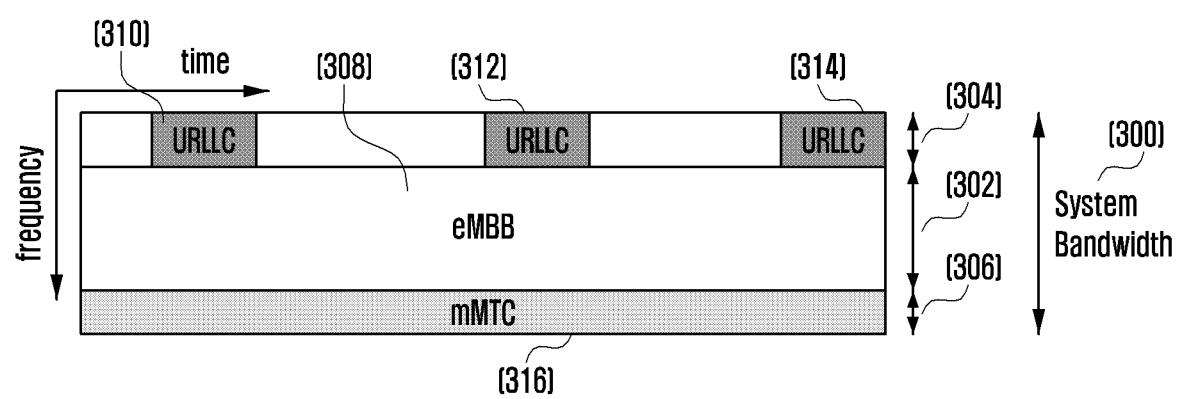
FIG. 3 illustrates an aspect in which pieces of data for eMBB, URLLC, and mMTC, which are services considered in a 5G or NR system, are allocated in frequency-time resources according to an embodiment of the disclosure.

FIG. 2 illustrates an aspect in which pieces of data for eMBB, URLLC, and mMTC, which are services considered in the 5G or NR system, are allocated in frequency-time resources according to an embodiment of the disclosure, and FIG. 3 illustrates an aspect in which pieces of data for eMBB, URLLC, and mMTC, which are services considered in the 5G or NR system, are allocated in frequency-time resources according to an embodiment of the disclosure.

Referring to FIGS. 2 and 3, there may be presented a scheme in which frequency and time resources are allocated for performing information transmission in each system.

First, FIG. 2 illustrates an aspect in which pieces of data for eMBB, URLLC, and mMTC are allocated in the entire system frequency bandwidth 200. In the middle of allocation and transmission of eMBB data 201 and mMTC data 209 in a specific frequency bandwidth, if URLLC data 203, 205, and 207 occur and transmission thereof is thus necessary, a base station or a terminal may transmit the URLLC data 203, 205, and 207 without emptying or transmitting a portion in which the eMBB data 201 and the mMTC data 209 have been already allocated. Since the URLLC needs to reduce a delay time in the middle of service, URLLC data 203, 205, and 207 may be allocated to a portion of the resource to which the eMBB data 201 is allocated, and thus may be transmitted. Of course, in a case where URLLC data 203, 205, and 207 are additionally allocated and transmitted in the resource to which the eMBB data 201 is allocated, the eMBB data may not be transmitted in an overlapping frequency-time resource, and thus the transmission performance of the eMBB data may be lowered. That is, in the above case, eMBB data transmission failure due to URLLC allocation may occur.

Referring to FIG. 3, the entire system frequency bandwidth 300 may be divided into sub-bands 302, 304, and 306 and used for transmission of a service and data therein. Information associated with the sub-band configuration may be predetermined, and the information may be transmitted to a terminal by a base station via higher layer signaling. Alternatively, the information associated with the sub-bands may be arbitrarily divided by a base station or a network node and provide services to the terminal without transmitting separate sub-band configuration information. FIG. 3 illustrates that the sub-band 302 is used for transmission of eMBB data 308, the sub-band 304 is used for transmission of URLLC data 310, 312, and 314, and the sub-band 306 is used for transmission of mMTC data 316.

Throughout the embodiment, the length of a transmission time interval (TTI) used for URLLC transmission may be shorter than the length of TTI used for transmission of eMBB data or mMTC data. In addition, the response of information related to the URLLC may be transmitted faster than that of eMBB or mMTC, and accordingly information transmission or reception with a low delay is possible. The structures of physical layer channels used for transmission of the three types of services or data may be different from each other. For example, at least one of the length of a transmission time interval (TTI), the allocation unit of frequency resources, a structure of a control channel, and a data mapping method may be different.

In the embodiments above, three types of services and three types of data are assumed and described. Alternatively, an even greater number of types of services and data corresponding thereto may exist, and details of the disclosure may be applied thereto.

In order to explain a method and apparatus proposed in the embodiment, the terms "physical channel" and "signal", pertaining to the NR system may be used. However, details of the disclosure may be applied to a wireless communication system other than the NR system.

Figure 4:
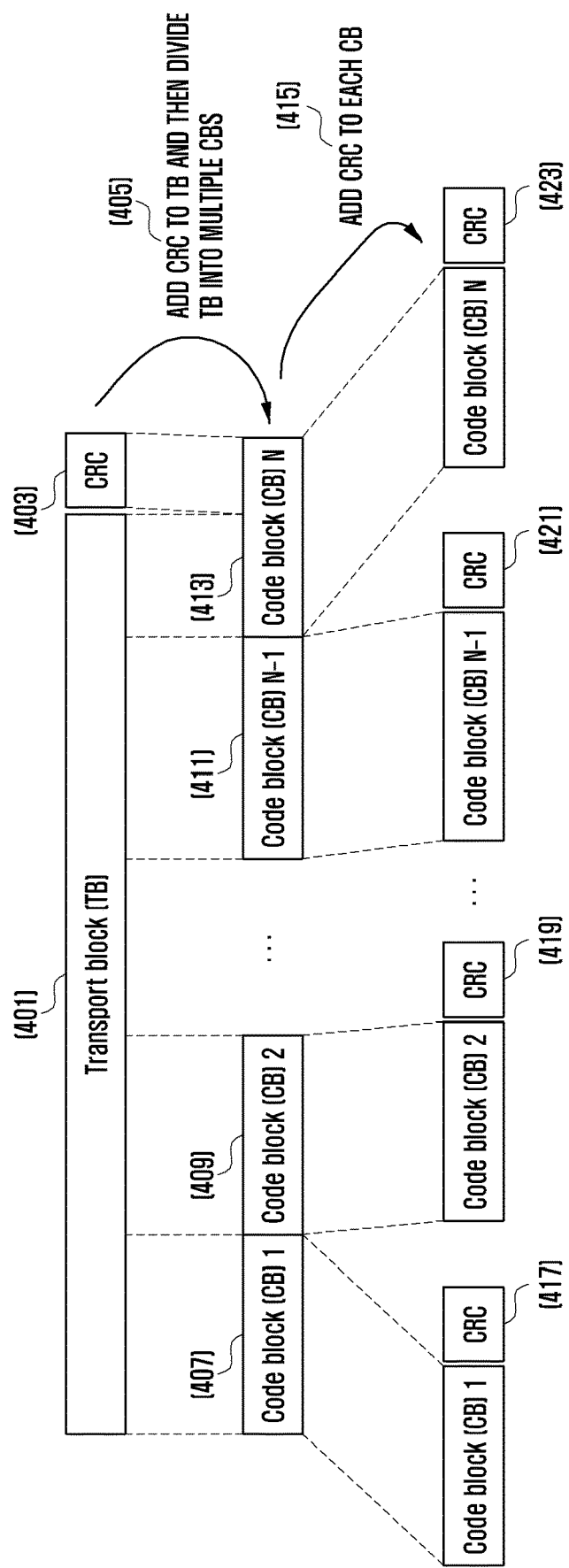
FIG. 4 illustrates a process in which one transport block is divided into a plurality of code blocks and a CRC is added thereto according to an embodiment of the disclosure.

FIG. 4 illustrates a process in which one transport block is divided into several code blocks and a CRC is added thereto according to an embodiment of the disclosure.

Referring to FIG. 4, a CRC 403 may be added to the last part or the first part of one transport block (TB) 401 to be transmitted in an uplink or a downlink. The CRC 403 may have 16 bits, 24 bits, or a pre-fixed number of bits, or may have a variable number of bits depending on channel conditions, and may be used to determine whether channel coding is successful. The TB 401 and a block to which CRC 403 is added may be divided into a plurality of code blocks (CBs) 407, 409, 411, and 413 (indicated by reference numeral 405). The divided code blocks 407, 409, 411, and 413 may have a predetermined maximum size, and in this case, the last code block 413 may be smaller in size than those of other code blocks 407, 409, and 411. However, this is only an example, and according to another example, by inserting zeros, random values, or ones to the last code block 413, the length of the last code block 413 may be adjusted to be the same as that of the other code blocks 407, 409, and 411.

CRCs 417, 419, 421, and 423 may be added to the divided code blocks, respectively (indicated by reference numeral 415). The CRCs may include 16 bits, 24 bits, or a pre-fixed number of bits, and may be used to determine whether channel coding is successful.

The TB 401 and cyclic generator polynomial may be used in order to generate the CRC 403, and the cyclic generator polynomial may be defined in various methods. For example, if it is assumed that cyclic generator polynomial gCRC24A(D)=[D24+D23+D18+D17+D14+D11+D10+ D7+D6+D5+D4+D3+D+1] for a 24-bit CRC, and L=24, with respect to TB data $a_0, a_1, a_2, a_3, \ldots, a_{A-1}$, CRC $p_0$, $p_1, p_2, p_3, \ldots, p_{L-1}$ may determine $a_0 D^{A+23} + a_1 D^{A+22} + \ldots + a_{A-1} D^{24} + p_0 D^{23} + p_1 D^{22} + \ldots + p_{22} D^1 + p_{23}$ as a value in which the remainder becomes zero by dividing $p_0$ $p_1, p_2, p_3, \ldots, p_{L-1}$ by the gCRC24A(D). In the above example, the CRC length "L" is assumed to be 24 as an example, but the CRC length "L" may be determined to have different lengths, such as 12, 16, 24, 32, 40, 48, 64, and the like.

Through this process, the CRC 403 is added to the TB 401, and the TB having CRC added thereto may be divided into N CBs 407, 409, 411, and 413. CRCs 417, 419, 421, and 423 may be added to each of the divided CBs 407, 409, 411, and 413 (indicated by reference numeral 415). The CRCs 417, 419, 421, and 423 added to the CBs 407, 409, 411, and 413 may have a different length than that of the CRC 403 added to the TB 401 or may use a different cyclic generator polynomial. However, the CRC 403 added to the TB 401 and the CRCs 417, 419, 421, and 423 added to the code blocks 407, 409, 411, and 413 may be omitted depending on the type of a channel code to be applied to the code block. For example, if LDPC codes other than turbo codes are applied to code blocks, CRCs 417, 419, 421, and 423 to be inserted for each code block may be omitted.

However, even if the LDPC is applied, the CRCs 417, 419, 421, and 423 may be added to the code block as it is. In addition, CRC may be added or omitted even if a polar code is used.

As described above in FIG. 4, the maximum length of one code block is determined according to the type of channel coding applied to a TB to be transmitted, and the TB and CRC, which is added to the TB, are divided into code blocks according to the maximum length of the code block.

In the LTE system, according to the related art, CRC for CB is added to the divided CB, data bits and the CRC of the CB are encoded with a channel code, and thus coded bits are determined and a number of bits, which perform predetermined rate matching to each of coded bits, may be determined.

Figure 5:
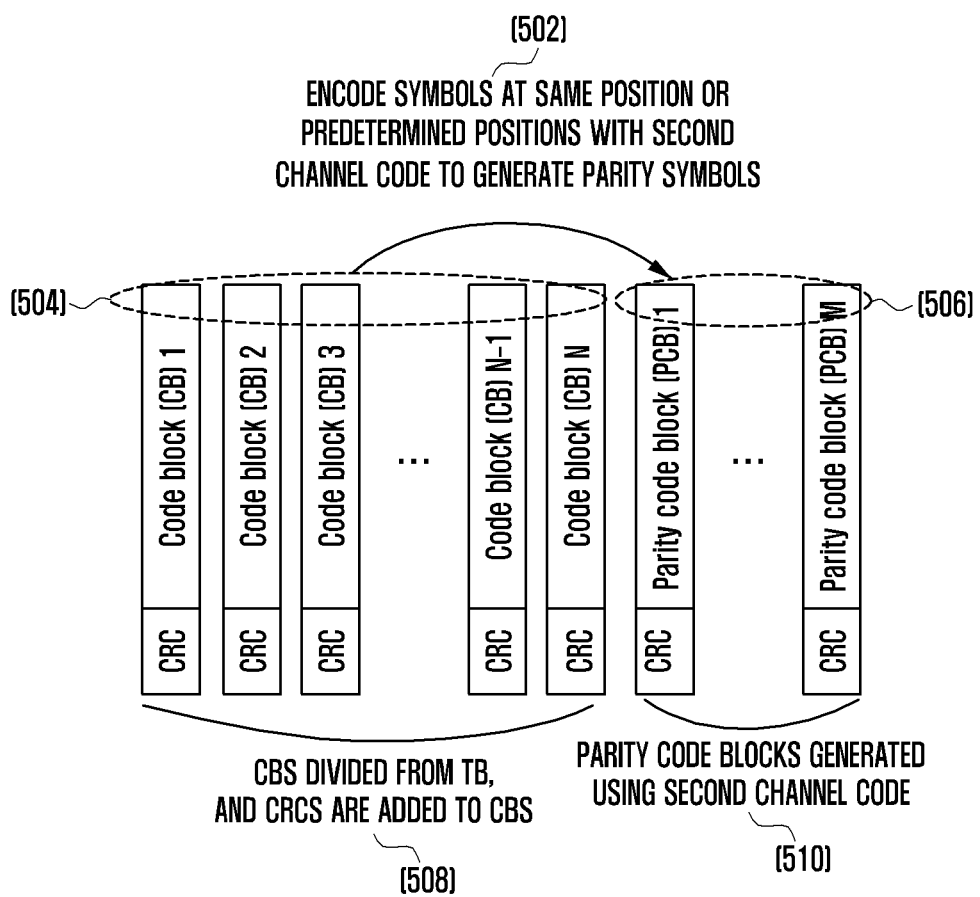
FIG. 5 illustrates a method in which an outer code is used and transmitted according to an embodiment of the disclosure.
Figure 6A:
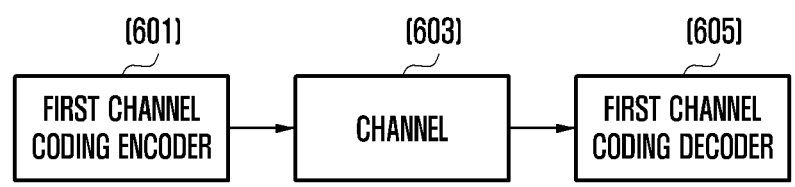
FIG. 6A is a block diagram illustrating a structure of a communication system in which an outer code is not used according to an embodiment of the disclosure.

FIG. 5 illustrates a method in which transmission is performed using an outer code according to an embodiment of the disclosure. FIG. 6A is a block diagram illustrating a structure of a communication system in which an outer code is not used according to an embodiment of the disclosure, and FIG. 6B is a block diagram illustrating a structure of a communication system in which an outer code is used according to an embodiment of the disclosure.

Figure 6B:
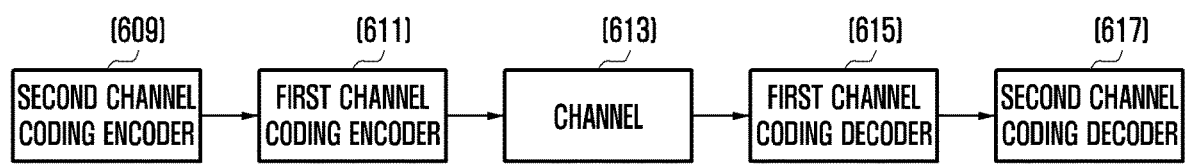
FIG. 6B is a block diagram illustrating a structure of a communication system in which an outer code is used according to an embodiment of the disclosure.

Referring to FIGS. 5, 6A, and 6B, a method for transmitting a signal using an outer code may be described.

Referring to FIG. 5, one transport block is divided into a plurality of code blocks, and bits or symbols 504 at the same position in each code block are encoded with a second channel code to generate parity bits or symbols 506 (indicated by reference numeral 502). Thereafter, CRCs may be added to respective code blocks and parity code blocks generated by the second channel code encoding, respectively (indicated by reference numerals 508 and 510).

Whether or not to add the CRC may be determined depending on the type of channel codes. For example, if a turbo code is used as a first channel code, the CRCs 508 and 510 are added. Thereafter, the respective code blocks and parity code blocks may be encoded by the first channel code encoding. In the disclosure, a convolutional code, an LDPC code, a turbo code, a polar code, and the like may be used as the first channel code. However, this is merely an example, and various channel codes, as the first channel code, may be applied to the disclosure. In the disclosure, as a second channel code, for example, a Reed-Solomon code, a BCH code, a Raptor code, a parity bit generation code, or the like may be used. However, this is just an example, and various channel codes may be applied to the disclosure as the second channel code.

Referring to reference numeral 600 in FIG. 6A, if the outer code is not used, the first channel coding encoder 601 and the first channel coding decoder 605 are each used in a transceiver (e.g., first channel coding encoder 601 and the first channel coding decoder 605 being connected by channel 603), and a second channel coding encoder and a second channel coding decoder may not be used. Even if the outer code is not used, the first channel coding encoder 601 and the first channel coding decoder 605 may be configured in the same manner as the case in which an outer code to be described later is used.

Referring to reference numeral 650 in FIG. 6B, if the outer code is used, data to be transmitted may pass through a second channel coding encoder 609. Bits or symbols passing through the second channel coding encoder 609 may pass through a first channel coding encoder 611. If the channel coded symbols pass through a channel 613 and are received by a receiver, the receiver may sequentially operate a first channel coding decoder 615 and a second channel coding decoder 617 based on the received signal. The first channel coding decoder 615 and the second channel coding decoder 617 may perform operations corresponding to the first channel coding encoder 611 and the second channel coding encoder 609, respectively.

Figure 7:
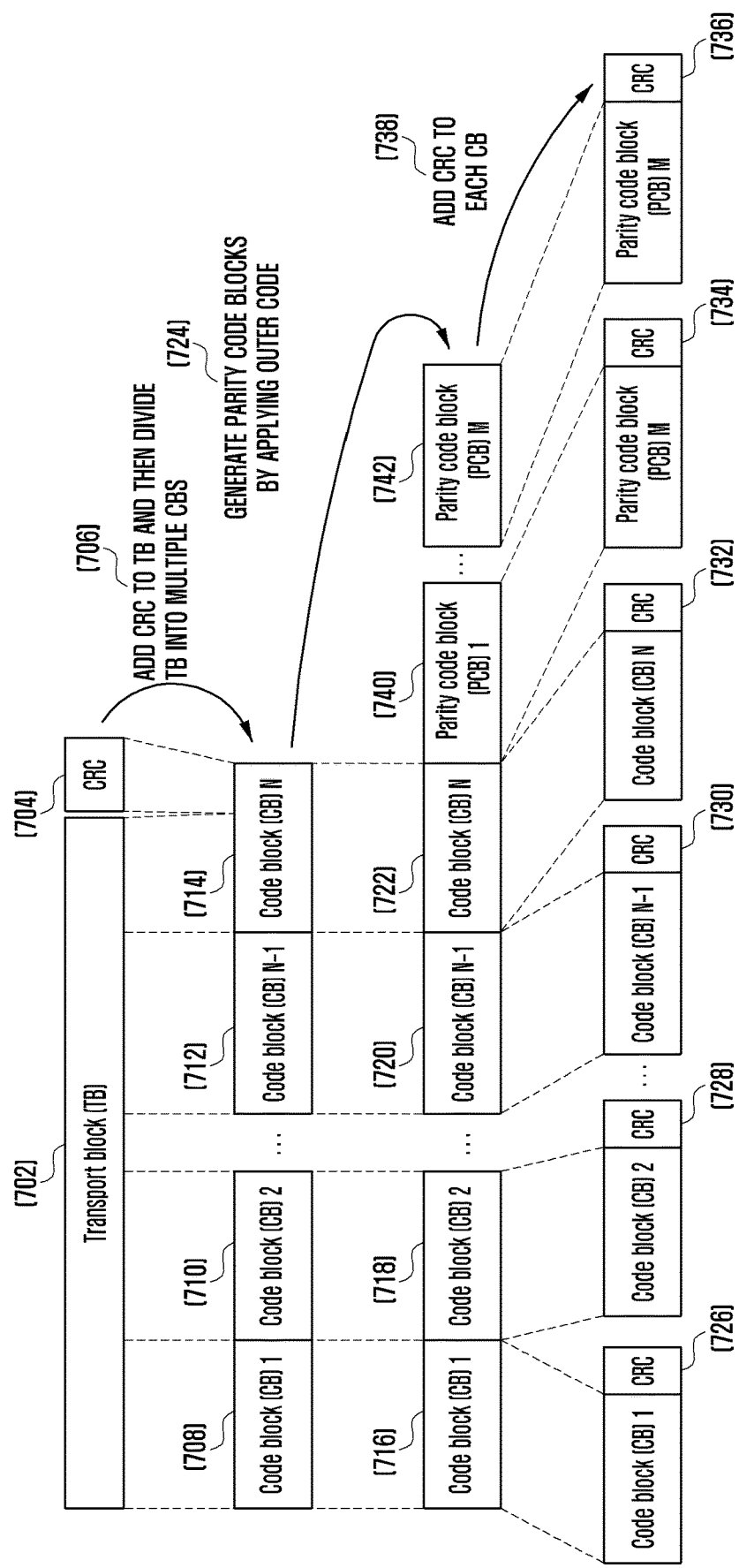
FIG. 7 illustrates a method for generating one or more parity code blocks by applying a second channel code or an outer code to a plurality of code blocks, which are obtained by dividing one transport block, according to an embodiment of the disclosure.

FIG. 7 illustrates an example of generating one or more parity code blocks by applying a second channel code or an outer code to a plurality of code blocks, which are obtained by dividing one transport block, according to an embodiment of the disclosure.

Referring to FIG. 7, as described above in FIG. 4, one transport block 702 may be divided into one or more code blocks (e.g., code blocks 708, 710, 712, and 714). Reference number 706 indicates a CRC being added to a transport block and the transport block being divided into multiple code blocks. Here, if only one code block is generated according to the size of a transport block, a CRC (e.g., CRC 704) may not be added to the corresponding code block. If an outer code is applied to code blocks to be transmitted, parity code blocks 740 and 742 may be generated (indicated by reference numeral 724). If the outer code is used, parity code blocks 740 and 742 may be located after the last code block of code blocks 716, 718, 720, and 722 (indicated by reference numeral 724). After the outer code, CRCs 726, 728, 730, 732, 734, and 736 may be added (indicated by reference numeral 738). Thereafter, the respective code blocks and parity code blocks may be encoded with a channel code together with the CRC.

The size of TB (that is, TBS) in the NR system may be calculated through the following operations.

Operation 1: $N'_{RE}$, which is the number of REs assigned to PDSCH mapping in one PRB in the assigned resource, is calculated.

Here, $N_{RE'}$ may be calculated by $N_{SC}^{RB} \cdot N_{symb}^{sh} - N_{DMRS}^{PRB} - N_{oh}^{PRB}$. Here, $N_{SC}^{RB}$ is 12, and $N_{symb}^{sh}$ may represent the number of OFDM symbols allocated to the PDSCH. $M_{DMRS}^{PRB}$ is the number of REs in one PRB occupied by DMRSs of the same CDM group. $N_{oh}^{PRB}$ is the number of REs occupied by the overhead in one PRB, which is configured via higher layer signaling, and may be configured to be one of 0, 6, 12, or 18. Thereafter, $N_{RE}$, the total number of REs, allocated to the PDSCH may be calculated. $N_{RE}$ is calculated by $\min(156, N_{RE}') \cdot n_{PRB}$, and $N_{PRB}$ denotes the number of PRBs allocated to a terminal.

Operation 2: The number of temporary information bits, $N_{info}$, may be calculated by $N_{RE} * R * Q_m * v$. Here, R is a code rate, $Q_m$ is a modulation order, and information of this value may be transferred using MCS bitfield and a table predefined in the control information. Also, v is the number of assigned layers. In the case of $N_{info} \leq 3824$, TBS may be calculated through operation 3 below. Otherwise, TBS may be calculated through operation 4.

Operation 3: $N'_{info}$ may be calculated by the equation of $$N'_{info} = \max\left(24, 2^n * \left\lfloor \frac{N_{info}}{2^n} \right\rfloor\right)$$

and $n = \max(3, \lfloor \log_2(N_{info}) \rfloor - 6)$. TBS may be determined as a value, which is the closest to $N'_{info}$ among values equal to or larger than $N'_{info}$ in Table 6 below.

TABLE 6

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |

TABLE 6-continued

| Index | TBS |
|---|---|
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ may be calculated by the equation of $$N'_{info} = \max\left(3830,\ 2^n \times \text{round}\left(\frac{N_{info} - 24}{2^n}\right)\right)$$

and $n = \lfloor \log_2(N_{info} - 24) \rfloor - 5$. TBS can be determined through a value of $N'_{info}$ and the following [pseudo-code 1].

[Start Pseudo-code 1]
if R ≤ 1/4

$$TBS = 8 * C * \left\lceil \frac{N'_{inf\ o} + 24}{8 * C} \right\rceil - 24,\ \text{where}\ C = \left\lceil \frac{N'_{inf\ o} + 24}{3816} \right\rceil$$

else
 if $N_{inf\ o}' > 8424$ $$TBS = 8 * C * \left\lceil \frac{N'_{inf\ o} + 24}{8 * C} \right\rceil - 24,\ \text{where}\ C = \left\lceil \frac{N'_{inf\ o} + 24}{8424} \right\rceil$$

else $$TBS = 8 * \left\lceil \frac{N'_{inf\ o} + 24}{8} \right\rceil - 24$$

end if
end if
[End Psudo-code 1]

In the NR system, if one CB is input to an LDPC encoder, parity bits may be added to the CB and the CB added with the parity bits may be output. The amount of parity bits may differ according to an LDPC base graph. A method of transmitting all parity bits, generated by LDPC coding for a specific input, may be called full buffer rate matching (FBRM), and a method of limiting the number of parity bits that can be transmitted may be called limited buffer rate matching (LBRM).

If resources are allocated for data transmission, the output of the LDPC encoder is made using a circular buffer, and bits of the buffer are repeatedly transmitted as many times as the number of the allocated resources, and the length of the circular buffer may be called $N_{cb}$. If the number of parity bits generated by LDPC coding is N, $N_{cb}$ is equal to N in the FBRM method. In the LBRM method, $N_{cb}$ denotes min(N, $N_{ref}$), $N_{ref}$ is given by $$\left\lfloor \frac{TBS_{LBRM}}{C \cdot R_{LBRM}} \right\rfloor,$$

and $R_{LBRM}$ may be determined to be 2/3. In a method for obtaining the TBS described above, $TBS_{LBRM}$ denotes the maximum number of layers supported by a terminal in the corresponding cell. Further, in order to obtain $TBS_{LBRM}$, if there is no configured maximum modulation order for the terminal in the corresponding, $TBS_{LBRM}$ is assumed to be 64 QAM, and the code rate is assumed to be 948/1024, which is the maximum code rate, $N_{RE}$ is assumed to be 156·$n_{PRB}$, and $n_{PRB}$ may be assumed to be $n_{PRB,LBRM}$, wherein $n_{PRB,LBRM}$ may be given as shown in Table 7 below.

TABLE 7

| Maximum number of PRBs across all configured BWPs of a carrier | $n_{PRB,\ LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by a terminal in the NR system may be determined through Equation 1 below.

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu} \cdot 12}{T_s^\mu} \cdot (1 - OH^{(j)}) \right)$$

Equation 1

In Equation 1, J may denote the number of carriers bound by carrier aggregation, Rmax=948/1024, $v_{Layers}^{(j)}$ may denote the maximum number of layers, $Q_m^{(j)}$ may denote a maximum modulation order, $f^{(j)}$ may denote a scaling index, and μ may denote a subcarrier spacing. The terminal may report $f^{(j)}$ as one of 1, 0.8, 0.75, and 0.4 values, and μ may be given as shown in Table 8 below.

TABLE 8

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is the average OFDM symbol length, $T_s^\mu$ may be calculated to be $$\frac{10^{-3}}{14 \cdot 2^\mu},$$

and $N_{PRB}^{BW(j),\mu}$ is the maximum number of RBs in BW (j). $OH^{(j)}$ is an overhead value, and $OH^{(j)}$ may be given as 0.14 in the downlink of FR1 (a band equal to or less than 6 GHz) and given as 0.18 in the uplink thereof, and may be given as 0.08 in the downlink of FR2 (a band above 6 GHz) and given as 0.10 in the uplink thereof. Through Equation 1, the maximum data rate in the downlink in a cell having a 100 MHz frequency bandwidth at a 30 kHz subcarrier spacing may be calculated by the following Table 9.

TABLE 9

| $f^{(j)}$ | $v_{layers}^{(j)}$ | $Q_m^{(j)}$ | Rmax | $N^{BW(j)\mu}_{PRB}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate, measurable by a terminal in the actual data transmission, may be a value obtained by dividing the data amount by a data transmission time. This value may be obtained by dividing TBS by the TTI length in 1 TB transmission or dividing the sum of TBSs by the TTI length in 2 TB transmission. For example, as shown in Table 6, the maximum actual data rate in downlink in a cell having a 100 MHz frequency bandwidth at a 30 kHz subcarrier spacing may be determined as shown in Table 10 below according to the number of allocated PDSCH symbols.

TABLE 10

| $N^{sh}_{symb}$ | $N_{DMRS}^{PRB}$ | $N_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225.280 | 27 | 225.480 | 0.107143 | 2,104.48 |
| 4 | 8 | 40 | 10920 | 323505.0 | 13 | 319.488 | 38 | 319.784 | 0.142857 | 2,238.49 |
| 5 | 8 | 52 | 14196 | 420556.5 | 13 | 417.792 | 50 | 417.976 | 0.178571 | 2,340.67 |
| 6 | 8 | 64 | 17472 | 517608.0 | 13 | 516.096 | 62 | 516.312 | 0.214286 | 2,409.46 |
| 7 | 8 | 76 | 20748 | 614659.5 | 14 | 622.592 | 74 | 622.760 | 0.250000 | 2,491.04 |
| 8 | 8 | 88 | 24024 | 711711.0 | 14 | 704.512 | 84 | 704.904 | 0.285714 | 2,467.16 |
| 9 | 8 | 100 | 27300 | 808762.5 | 14 | 802.816 | 96 | 803.304 | 0.321429 | 2,499.17 |
| 10 | 8 | 112 | 30576 | 905814.0 | 14 | 901.120 | 107 | 901.344 | 0.357143 | 2,523.76 |
| 11 | 8 | 124 | 33852 | 1002865.5 | 14 | 999.424 | 119 | 999.576 | 0.392857 | 2,544.38 |
| 12 | 8 | 136 | 37128 | 1099917.0 | 15 | 1,114.112 | 133 | 1,115.048 | 0.428571 | 2,601.78 |
| 13 | 8 | 148 | 40404 | 1196968.5 | 15 | 1,212.416 | 144 | 1,213.032 | 0.464286 | 2,612.68 |
| 14 | 8 | 160 | 43680 | 1294020.0 | 15 | 1,277.952 | 152 | 1,277.992 | 0.500000 | 2,555.98 |

The maximum data rate supported by the terminal may be identified through Table 9, and the actual data rate according to the allocated TBS may be identified through Table 10. At this time, the actual data rate may be larger than the maximum data rate depending on scheduling information.

In a wireless communication system, in particular, NR system, data rates supportable by a terminal may be promised between a base station and a terminal. The data rate may be calculated using the maximum frequency band, the maximum modulation order, the maximum number of layers, which are supported by the terminal. However, the calculated data rate may be different from a value calculated according to a transport block size (TBS) and a TTI length of a transport block (TB) used for actual data transmission.

Accordingly, a case, in which a terminal is allocated with a TBS larger than a value corresponding to a data rate supported by the terminal itself, may occur. It may be necessary to minimize the occurrence of the case and define an operation of the terminal in the above case. The following embodiments provide a method and apparatus for solving a case where the maximum data rate that can be supported by the terminal and the actual data rate according to the scheduling do not match. In the above, the maximum data rate may be a value determined based on the capability or the terminal capability, and the actual data rate may be a value determined based on scheduling information upon data transmission is performed.

In the embodiments described below, a base station is a subject that performs resource allocation to a terminal, and may be a base station supporting both V2X communication and general cellular communication, or a base station supporting only V2X communication. That is, the base station may denote a new generation Node B (gNB), an evolved Node B (eNB), or a road site unit (RSU), a base station (BS), a radio access unit, a base station controller, or a fixed station. The terminal may be one of: a vehicle that supports vehicle-to-vehicular communication (V2V), a vehicle that supports vehicle-to-pedestrian communication (V2P), a pedestrian's handset (e.g., a smartphone), a vehicle that supports vehicle-to-network communication (V2N), or a vehicle that supports vehicle-to-infrastructure communication (V2I), an RSU equipped with a terminal function, an RSU equipped with a base station function, or an RSU equipped with a part of the base station function and a part of the terminal function, as well as a general UE and a mobile station.

In the disclosure, terms of a "physical channel" and a "signal" may be used interchangeably with data or a control signal. For example, the PDSCH is a physical channel through which data is transmitted, but in the disclosure, the PDSCH may be referred to as data. In addition, for example, the PSSCH is a physical channel through which data is transmitted, but in the disclosure, the PSSCH may be referred to as data.

Hereinafter, in the disclosure, higher layer signaling is a signal transmission method, which is performed by a base station to transmit a signal to a terminal by using a downlink data channel of a physical layer or performed by the terminal to transmit a signal to the base station by using an uplink data channel of the physical layer, and may be referred to as RRC signaling or a MAC control element (CE).

In the disclosure, a peak data rate, a max data rate, a maximum data rate, and the like may be used interchangeably.

In the V2X environment, data may be transmitted from one terminal to a plurality of terminals, or data may be transmitted from one terminal to one terminal. Alternatively, data may be transmitted from the base station to a plurality of terminals. However, the disclosure is not limited thereto, and may be applied to various cases.

In order to perform transmission or reception by a terminal through a sidelink (SL) (the SL refers to a radio path of a signal transmitted by a terminal to at least one other terminal), the terminal operates based on resource pools previously defined, configured, or preconfigured between terminals. The resource pool may be a set of frequency and time domain resources that can be used for transmission or reception of sidelink signals. That is, in order to transmit or receive a sidelink signal, transmission or reception of the sidelink signal needs to be performed in a predetermined frequency-time resource, and the resource is defined as a resource pool. The resource pool may be defined for transmission and reception, and may be commonly defined and used for transmission and reception. In addition, the terminals may receive configuration of one or a plurality of resource pools and may perform a sidelink signal transmission/reception operation.

Configuration information relating to the resource pool used for sidelink transmission and reception and other configuration information for the sidelink may be pre-installed when the terminal is produced, may be configured by the current base station, may be preconfigured by another base station or another network unit before accessing the current base station, may be a fixed value, may be provisioned from a network, or may be self-constructed by the terminal.

A sidelink control channel may be referred to as a physical sidelink control channel (PSCCH), and a sidelink shared channel or data channel may be referred to as a physical sidelink shared channel (PSSCH). In addition, a broadcast channel broadcast together with a synchronization signal may be referred to as a physical sidelink broadcast channel (PSBCH), and a channel for feedback transmission may be referred to as a physical sidelink feedback channel (PSFCH). However, PSCCH or PSSCH may be used for feedback transmission. Depending on a communication system, the above-described channels may be referred to as an LTE-PSCCH, an LTE-PSSCH, an NR-PSCCH, an NR-PSSCH, and the like. In the disclosure, a sidelink may denote a link between terminals, and a Uu link may denote a link between a base station and a terminal.

Information transmitted through the sidelink may include sidelink control information (SCI), sidelink feedback control information (SFCI), sidelink channel state information (SCSI), and a sidelink shared channel (SL-SCH) that is transmission channel.

The above-described information and transport channels may be mapped to physical channels as shown in Tables 11 and 12 below.

TABLE 11

| TrCH (Transport channel) | Physical Channel |
| --- | --- |
| SL-SCH | PSSCH |

TABLE 12

| Control information | Physical Channel |
| --- | --- |
| SCI | PSCCH |
| SFCI | PSFCH |
| SCSI | PSSCH |

Alternatively, if the SCSI is transmitted through the PSFCH, transmission channel-physical channel mapping as shown in Tables 13 and 14 may be applied thereto.

TABLE 13

| TrCH (Transport channel) | Physical Channel |
| --- | --- |
| SL-SCH | PSSCH |

TABLE 14

| Control information | Physical Channel |
| --- | --- |
| SCI | PSCCH |
| SFCI | PSFCH |
| SCSI | PSFCH |

Alternatively, when SCSI is transmitted to a higher layer and transmitted using, for example, an MAC CE, the SCSI may be transmitted through PSSCH because higher layer signaling corresponds to the SL-SCH. Hereinafter, transmission channel-physical channel mapping as shown in Tables 15 and 16 may be applied thereto.

TABLE 15

| TrCH (Transport channel) | Physical Channel |
| --- | --- |
| SL-SCH | PSSCH |

TABLE 16

| Control information | Physical Channel |
| --- | --- |
| SCI | PSCCH |
| SFCI | PSFCH |

Figure 8A:
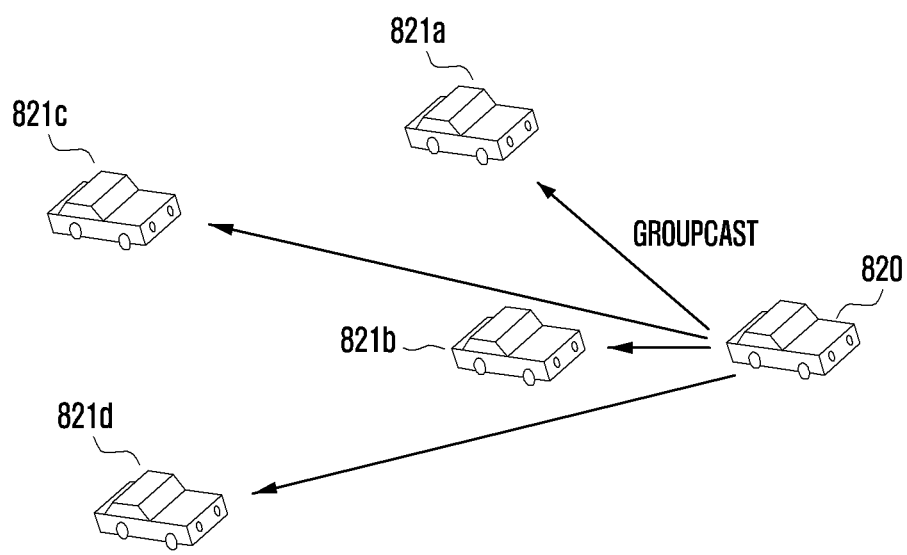
FIG. 8A illustrates an example of groupcast transmission in a wireless communication system according to an embodiment of the disclosure.

FIG. 8A illustrates an example of groupcast transmission in a wireless communication system according to an embodiment of the disclosure.

Referring to FIG. 8A, a terminal 820 transmits common data to a plurality of terminals 821a, 821b, 821c, and 821d, that is, transmits data in a groupcasting method. The terminal 820 and the terminals 821a, 821b, 821c, and 821d may be a mobile device like a vehicle. For groupcasting, at least one of separate control information (e.g., SCI), a physical control channel (e.g., PSCCH), and data may be transmitted.

Figure 8B:
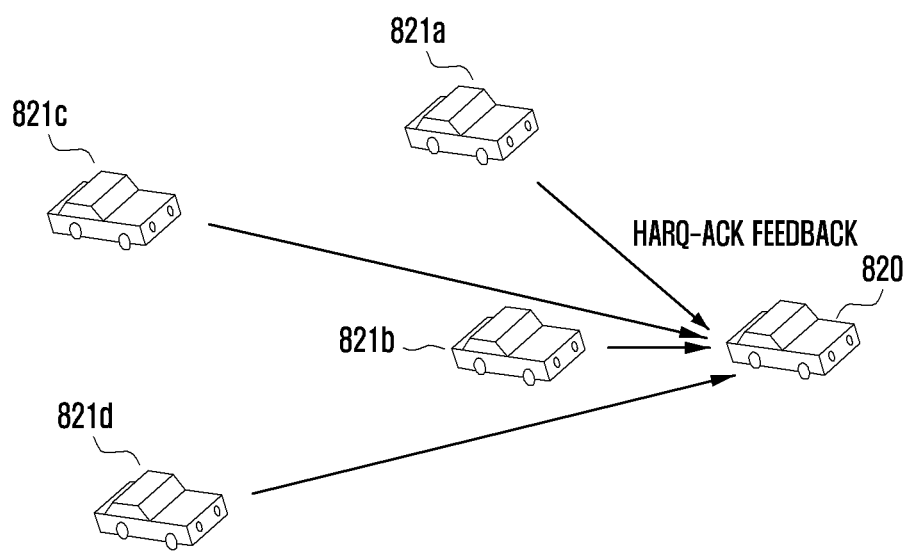
FIG. 8B illustrates an example of hybrid automatic repeat request (HARQ) feedback transmission according to groupcast in a wireless communication system according to an embodiment of the disclosure.

FIG. 8B illustrates an example of HARQ feedback transmission according to groupcasting in a wireless communication system according to an embodiment of the disclosure.

Referring to FIG. 8B, terminals 821a, 821b, 821c, and 821d, which have received common data via groupcasting, transmit information indicating success or failure of data reception to the terminal 820 that has transmitted the data. Information indicating success or failure of data reception may include HARQ-ACK feedback. Data transmission and feedback operations as shown in FIGS. 8A and 8B have been performed based on groupcasting. However, according to another embodiment, data transmission and feedback operations as shown in FIGS. 8A and 8B may be applied to unicast transmission.

Figure 9:
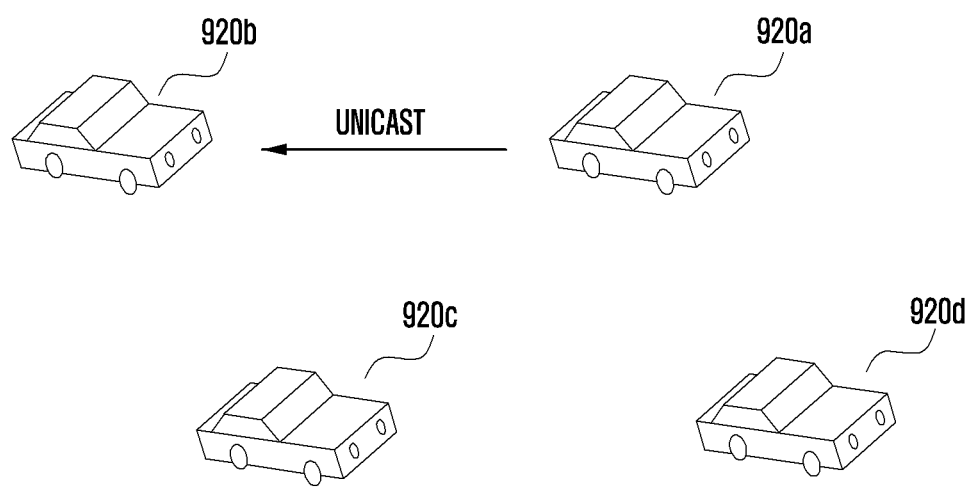
FIG. 9 illustrates an example of unicast transmission in a wireless communication system according to an embodiment of the disclosure.

FIG. 9 illustrates an example of unicast transmission in a wireless communication system according to an embodiment of the disclosure.

Referring to FIG. 9, a first terminal 920a transmits data to a second terminal 920b. As another example, the direction of data transmission may be reversed (i.e., data may be transmission from the second terminal 920b to the first terminal 920a). The terminals 920c and 920d other than the first terminal 920a and the second terminal 920b may not receive data transmitted or received via a unicast scheme between the first terminal 920a and the second terminal 920b. Data transmission or reception through the unicast communication between the first terminal 920a and the second terminal 920b may be performed through mapping in a promised resource between the first terminal 920a and the second terminal 920b, may be performed through a process of scrambling using a value promised therebetween, or may be performed using a preconfigured value. Alternatively, control information related to data via unicast communication between the first terminal 920a and the second terminal 920b may be mapped in a promised manner. Alternatively, data transmission or reception via unicast communication between the first terminal 920a and the second terminal 920b may include an operation of identifying unique IDs with each other. The terminal may be a mobile terminal such as a vehicle. For the unicast communication, at least one of separate control information, a physical control channel, and data may be transmitted.

Figure 10A:
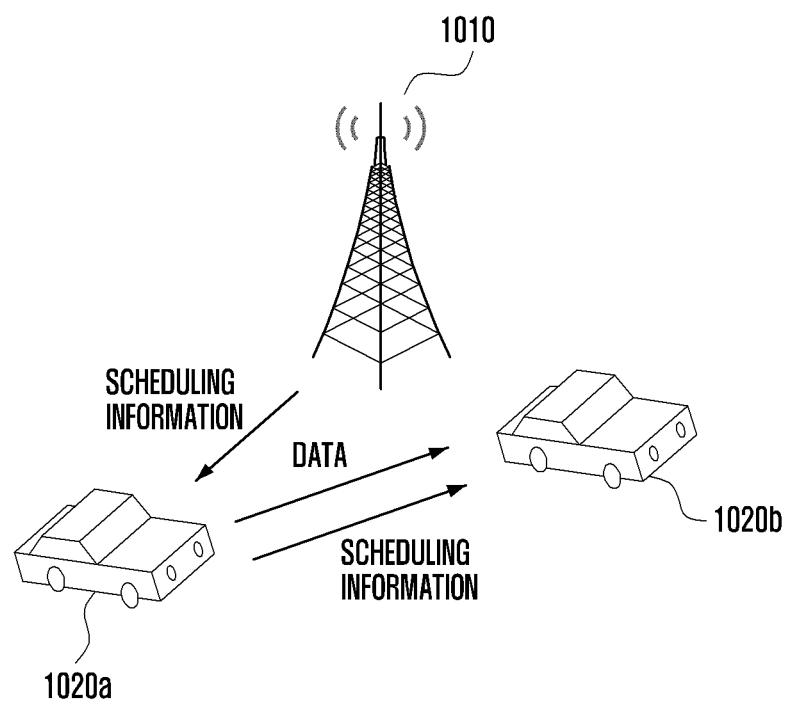
FIG. 10A illustrates an example of sidelink data transmission according to scheduling of a base station in a wireless communication system according to an embodiment of the disclosure.

FIG. 10A illustrates an example of sidelink data transmission according to scheduling of a base station in a wireless communication system according to an embodiment of the disclosure.

FIG. 10A illustrates a "Mode 1" method, which is a method for transmitting sidelink data by a terminal having received scheduling information from a base station. In the disclosure, a method for performing sidelink communication based on the scheduling information is called "Mode 1", but may be called differently therefrom. Referring to FIG. 10A, a terminal 1020a which wants to perform transmission through a sidelink (hereinafter, referred to as "transmission terminal") receives scheduling information for sidelink communication from a base station 1010. Upon receiving the scheduling information, the transmission terminal 1020a transmits sidelink data to another terminal 1020b (hereinafter referred to as "reception terminal") based on the scheduling information. The scheduling information for sidelink communication received from the base station is included in the DCI, and the DCI may include at least one of items shown in Table 17 below.

TABLE 17

| Items | Details |
|---|---|
| Carrier indicator | Used for a purpose of scheduling sidelink for another carrier in the state where carrier aggregation (CA) has been applied |
| Lowest index at the allocation of sub-channels for initial transmission | Used to allocate a frequency resource at initial transmission |
| Information to be included in sidelink control information | Frequency resource allocation information, which may include resource allocation or resource reservation information for initial transmission, retransmission, and N number of transmissions thereafter Information on time interval between initial transmission and retransmission |
| Information relating to a sidelink slot structure | Information relating to slots and symbols that can be used for sidelink |
| HARQ-ACK or/and CSI feedback timing information | Timing information for transmitting a HARQ-ACK or CSI feedback to a base station through a sidelink |
| Recipient ID | ID information relating to terminals which are to perform reception |
| QoS information such as priority | Information relating to a priority by which data is to be transmitted |

The scheduling may be performed for one-time sidelink transmission, or may be performed for periodic transmission, semi-persistent scheduling (SPS), or transmission of a configured grant. Scheduling methods may be distinguished by an indicator included in DCI, an RNTI scrambled to a CRC added to the DCI, or an ID value. DCI for sidelink transmission may further include padding bits (for example, 0 bits) to allow the size of the DCI to be identical to that of another DCI format of such as DCI for downlink scheduling or uplink scheduling.

The transmission terminal 1020a receives DCI for sidelink scheduling from the base station 1010, transmits a PSCCH including sidelink scheduling information to the reception terminal 1020b, and then transmits a PSSCH which is data corresponding to the PSCCH. SCI, which is sidelink scheduling information transmitted by a terminal through the PSCCH, may include at least one of items shown in Table 18 below.

TABLE 18

| Items | Details |
| --- | --- |
| HARQ process number | HARQ process ID for an operation relating to a HARQ of data for transmission |
| New data indicator (NDI) | Information relating to whether data which is currently being transmitted is new data |
| Redundancy version (RV) | Information relating to a parity bit to be transmitted at the time of mapping after channel coding of data |
| Layer-1 source ID | ID information in a physical layer of a transmission terminal |
| Layer-1 destination ID | ID information in a physical layer of a reception terminal |
| Frequency-domain resource assignment for PSSCH scheduling | Frequency domain resource configuration information of data for transmission |
| MCS | Information on modulation order and coding rate |
| QoS indication | Include priority, target latency/delay, target distance, target error rate, etc. |
| Antenna port(s) | Information on an antenna port for data transmission |
| DMRS sequence initialization | Information such as an ID value for initializing a DMRS sequence |
| PTRS-DMRS association | Information relating to PTRS mapping; |
| CBGTI | Used as an indicator for retransmission by the units of CBGs; |
| Resource reservation | Information for resource reservation; |
| Time gap between initial transmission and retransmission | Information on time interval between initial transmission and retransmission |
| Retransmission index | An indicator of distinguishing retransmission |
| Transmission format/cast type indicator | A transmission format or an indicator for distinguishing between unicast/groupcast/broadcast |
| Zone ID | Location information of a transmission terminal |
| NACK distance | A reference indicator of determining whether a reception terminal is required to transmit a HARQ-ACK/NACK |
| HARQ feedback indication | Include whether a HARQ feedback is required to be transmitted, or whether a HARQ feedback is being transmitted |
| Time-domain resource assignment for scheduling PSSCH | Time domain resource information of sidelink data for transmission |
| Second SCI indication | An indicator including mapping information of second SCI in the case of two-stage control information |
| DMRS pattern | Information on a DMRS pattern (for example, the position of a symbol through which a DMRS is mapped |

Control information including at least one of items shown in Table 18 may be included in a single piece of SCI or two pieces of SCI in order to be transmitted to the reception terminal. A transmission method which is performed through two pieces of SCI in a divided manner may be called a 2-stage SCI method.

Figure 10B:
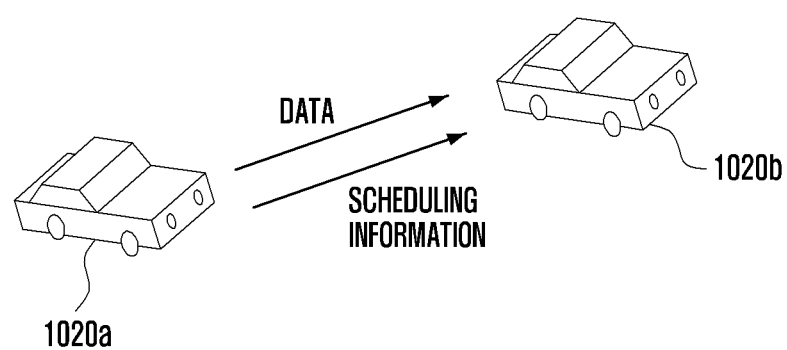
FIG. 10B illustrates an example of sidelink data transmission without scheduling of a base station in a wireless communication system according to an embodiment of the disclosure.

FIG. 10B illustrates an example of sidelink data transmission without scheduling of a base station in a wireless communication system according to an embodiment of the disclosure.

Referring to FIG. 10B, it illustrates an example of "Mode 2" method that is a method of transmitting sidelink data by a terminal without receiving scheduling information from a base station. In the disclosure, a method for performing sidelink communication without receiving scheduling information is called Mode 2, but can be called differently therefrom. The transmission terminal 1020a, which wants to transmit data through a sidelink, may transmit sidelink scheduling information and sidelink data to a reception terminal 1020b based on the transmission terminal's own determination without receiving scheduling from the base station. Here, the sidelink scheduling control information may include SCI, which is the same format as SCI used in the mode 1 sidelink communication. For example, the scheduling control information may include at least one of items shown in Table 18.

Figure 11A:
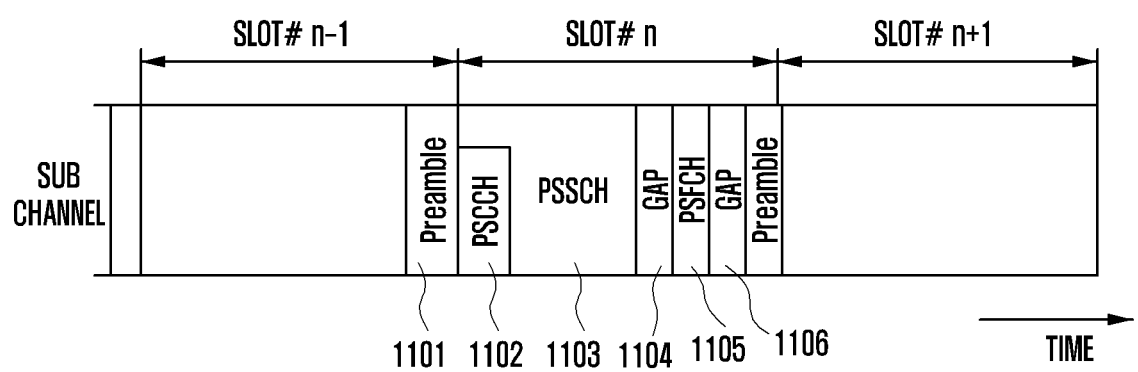
FIG. 11A illustrates an example of a channel structure of a slot used for sidelink communication in a wireless communication system according to an embodiment of the disclosure.

FIG. 11A illustrates an example of a channel structure of a slot used for sidelink communication according to an embodiment of the disclosure. FIG. 11A illustrates an example of physical channels mapped to slots for sidelink communication. Referring to FIG. 11A, a preamble 1101 is mapped to a position before the beginning of the slot, that is, the rear end of the previous slot. Thereafter, from the beginning of the slot, a PSCCH 1102, a PSSCH 1103, a GAP 1104, a physical sidelink feedback channel (PSFCH) 1105, and a GAP 1106 are mapped.

Before transmitting a signal in the corresponding slot, a transmission terminal transmits the preamble signal 1101 in one or more symbols. The preamble may be used to enable a reception terminal to correctly perform automatic gain control (AGC) for adjusting the intensity of amplification when the reception terminal amplifies the power of a received signal. In addition, the preamble may be transmitted or not according to whether or not the transmission terminal performs transmission of a previous slot. That is, when the transmission terminal transmits a signal to the same terminal in a previous slot (e.g., slot #n−1) of the corresponding slot (e.g., slot #n), transmission of the preamble 1101 may be omitted. The preamble 1101 may be referred to as a "sync signal", a "sidelink sync signal", a "sidelink reference signal", a "midamble", an "initial signal", a "wake-up signal", or other terms having an equivalent technical meaning thereof.

The PSCCH 1102 including control information is transmitted using symbols transmitted at the beginning of the slot, and the PSSCH 1103 scheduled by the control information of the PSCCH 1102 may be transmitted. At least a part of SCI, which is control information, may be mapped to the PSCCH 1102. Thereafter, the GAP 1104 exists, and the PSFCH 1105, which is a physical channel for transmission of feedback information, is mapped thereto.

The terminal may receive pre-configuration of a position of a slot capable of transmitting the PSFCH. The description that a pre-configuration is received may denote that the same is predetermined in a terminal-making process, that the same is transferred when accessing a sidelink-related system, that the same is transferred from a base station when accessing the base station, or that the same is transferred from another terminal.

Referring to FIG. 11A, the PSFCH 1105 is illustrated as being located at the last part of the slot. By securing the GAP 1104 between the PSSCH 1103 and the PSFCH 1105, which is an empty section for a predetermined time, the terminal having transmitted or received the PSSCH 1103 may prepare for reception or transmission of the PSFCH 1105 (e.g., transmission/reception conversion). After the PSFCH 1105, a GAP 1106, which is an empty section for a predetermined time, exists.

A terminal, which wants to transmit data in a sidelink resource pool, first performs an operation of searching for a resource of a sidelink in order to determine the resource for data transmission. This may be referred to as channel sensing, and the channel sensing may be an operation of pre-searching for resources for initial transmission and retransmission of specific data, a transport block (TB), or a code block (CB). In this channel sensing process, resources found for initial transmission and retransmission may have different sizes of resources in the frequency domain. That is, only 1 subchannel or 10 PRBs may be used for initial transmission, and 4 subchannels or 40 PRBs may be used for retransmission.

Here, a TB transmitted via 1 subchannel at the initial transmission may have the same size as that of a TB transmitted at the retransmission. Accordingly, the terminal may need a method of appropriately determining the TB size (TBS). A terminal for transmitting control information and data and a terminal for reception thereof may determine the size of a TB for transmission or reception by using a combination of one or more methods among the following methods.

The TBS determination method for sidelink data transmission may be summarized as follows.

---

Operation 1: $N_{RE}'$, which is the number of REs assigned to PDSCH mapping in one PRB in the assigned resource, is calculated.
Here, $N_{RE}'$ may be calculated by the equation of $N_{RE}' = N_{symb}^{RB} \cdot N_{symb}^{sh} - N_{DMRS}^{PRB} - N_{oh}^{PRB} - N_{symb}^{PSCCH\_RB} \cdot N_{symb}^{PSCCH}$. Here, $N_{sc}^{RB}$ denotes the number of subcarriers included in one RB (e.g., 12), and $N_{symb}^{sh}$ denotes the number of OFDM symbols allocated to the PDSCH. $N_{DMRS}^{PRB}$ is the number of REs in one PRB occupied by demodulation reference signals (DMRSs) of the same code division multiplexing (CDM) group, and $N_{oh}^{PRB}$ is the number of REs occupied by the overhead in one PRB, which is configured via higher layer signaling (e.g., may be configured to be one of 0, 6, 12, or 18).
Thereafter, $N_{RE}$, the total number of REs, allocated to the PDSCH may be calculated. $N_{RE}$ is calculated by the equation of $N_{RE} = \min(156, N_{RE}') \cdot n_{PRB}$, and $n_{PRB}$ denotes the number of PRBs allocated to the terminal. $N_{symb}^{PSCCH\_RB}$ may be the number of RBs to which the PSCCH is mapped, and $N_{symb}^{PSCCH}$ may be the number of symbols allocated to the PSCCH. In the above, an example of calculation performed using the number of PRBs has been described, $N_{RE}$ may be calculated using the number of sub-channels in a similar manner.
Operation 2: The number of temporary information bits, $N_{info}$, may be calculated by the equation of $N_{inf\_o} = N_{RE} \cdot R \cdot Q_m \cdot \upsilon$. Here, R is a code rate, $Q_m$ is a modulation order, and $\upsilon$ denotes the number of assigned layers. The coding rate and modulation order may be transferred using an MCS field included in the control information and a pre-defined corresponding relationship. In the case of $N_{info} \leq 3824$, TBS may be calculated through operation 3 below. Otherwise, TBS may be calculated through operation 4.

Operation 3: $N_{info}'$ may be calculated by the equation of $N_{info}' = \max\left(24, 2^n * \left\lfloor \frac{N_{info}}{2^n} \right\rfloor\right)$ and $n = \max(3, \lfloor \log_2(N_{info}) \rfloor - 6)$. In addition, TBS may be determined as a value, which is closest to $N_{info}$ among values equal to or larger than $N_{info}'$ in Table 19 below.
Operation 4: $N_{info}'$ may be calculated depending on $$N_{info}' = \max\left(3840, 2^n \times \text{round}\left(\frac{N_{inf\_o} - 24}{2^n}\right)\right) \text{ and } n = \lfloor \log_2(N_{inf\_o} - 24) \rfloor - 5. \text{ In addition, } TBS$$

may be determined by the $N_{inf\_o}'$ value and a pseudo-code as shown in Table 20 below.

---

TABLE 19

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |

TABLE 19-continued

| Index | TBS |
|---|---|
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

TABLE 20 if R ≤ 1/4

$$TBS = 8 * C * \left\lceil \frac{N'_{inf\ o} + 24}{8 * C} \right\rceil - 24, \text{ where } C = \left\lceil \frac{N'_{inf\ o} + 24}{3816} \right\rceil$$

TABLE 20-continued else
  if $N_{inf\ o}' > 8424$ $$TBS = 8 * C * \left\lceil \frac{N'_{inf\ o} + 24}{8 * C} \right\rceil - 24, \text{ where } C = \left\lceil \frac{N'_{inf\ o} + 24}{8424} \right\rceil$$

else $$TBS = 8 * \left\lceil \frac{N'_{inf\ o} + 24}{8} \right\rceil - 24$$

end if
end if

In methods of determining TBS in sidelink data transmission/reception, a value smaller than 156, for example, 144 may be used instead of 156 in the equation of $N_{RE}$=min (156, $N_{RE}'$)·$n_{PRB}$.

Alternatively, TBS may be determined by the equation of $N_{RE}=N_{symb}^{RB} \cdot N_{symb}^{sh} \cdot n_{PRB}^{PSSCH} - N_{DMRS}^{RE} - N_{oh}^{PRB} \cdot n_{PRB}^{PSSCH} - N_{symb}^{PSCCH\_RB} \cdot N_{symb}^{PSCCH} \cdot n_{PRB}^{PSCCH}$, and $N_{RE}'$ may not be used in this process. In the above, the number of OFDM symbols, $N_{symb}^{sh}$, allocated to the PSSCH may be determined according to at least one of the following methods.

Method A-1: $N_{symb}^{sh}$ is the number of symbols to which the PSSCH is mapped in the slot in which the PSSCH is transmitted.

Method A-2: $N_{symb}^{sh}$ is determined as the largest value among the number of symbols available for sidelink PSSCH transmission among slots configured in the resource pool in which the PSSCH is transmitted. For example, if PSFCH is configured for every 2 slots in the corresponding resource pool, $N_{symb}^{sh}$ is determined based on a slot in which the PSFCH does not exist.

Method A-3: $N_{symb}^{sh}$ is determined as the smallest value among the number of symbols available for sidelink PSSCH transmission among slots configured in the resource pool in which the PSSCH is transmitted. For example, if the PSFCH is configured for every 2 slots in the corresponding resource pool, $N_{symb}^{sh}$ is determined based on the slot in which the PSFCH exists.

Method A-4: $N_{symb}^{sh}$ determined as the average value of the number of symbols available for sidelink PSSCH transmission among slots configured in the resource pool in which the PSSCH is transmitted. For example, if the PSFCH is configured for every 2 slots in the corresponding resource pool, $N_{symb}^{sh}$ is determined as the average of the number of symbols available for the PSSCH in slots in which the PSFCH exists and slots in which the PSFCH does not exist.

Method A-5: $N_{symb}^{sh}$ has the value determined by ceiling of average of the number of symbols available for sidelink PSSCH transmission among slots configured in the resource pool in which the PSSCH is transmitted.

Method A-6: $N_{symb}^{sh}$ has the value determined by flooring of average of the number of symbols available for sidelink PSSCH transmission among slots configured in the resource pool in which the PSSCH is transmitted.

Method A-7: $N_{symb}^{sh}$ has the value determined by rounding of average of the number of symbols available for sidelink PSSCH transmission among slots configured in the resource pool in which the PSSCH is transmitted.

In the case of using the above methods, the first symbol of the sidelink that can be used for AGC purposes or the like is not included in $N_{symb}^{sh}$. In addition, symbols defined as gap symbols are not included in $N_{symb}^{sh}$. However, since the foregoing is only an example, the embodiment of the disclosure is not limited thereto, and the methods for determining the number of OFDM symbols, $N_{symb}^{sh}$, may be applied even when the first symbol of the sidelink is included in $N_{symb}^{sh}$. In addition, the methods may be applied even in the case of including symbols defined as gap symbols.

In addition, a symbol to which 2nd SCI and the like is mapped may be included when $N_{symb}^{sh}$ is determined, and additionally, the number of OFDM symbols allocated to the PSFCH may be excluded when $N_{symb}^{sh}$ is determined. In addition, $N_{oh}^{PRB}$ denotes the number of REs occupied by overhead in one PRB configured via higher level signaling. This value can be a value that is configured (in advance) in the resource pool. For values that can be preconfigured as values of $N_{oh}^{PRB}$, not only 0, 6, 12, or 18 used by the NR system of the related art, but also larger values may be applied, which may occur due to consideration of 2nd SCI. For example, the value of $N_{oh}^{PRB}$ may be configured to be a value among values of 0, 6, 12, 18, 24, 30, 36, 42, or the like, or one of values of 0, 6, 12, 18, 36, 60, 84, or 108.

First Embodiment

According to an embodiment, the maximum data rate supported by a terminal may differ depending on a counterpart with which the terminal communicates. That is, the maximum data rate supported by the terminal may be different depending on whether the terminal transmits or receives data to or from a base station or another terminal. The maximum data rate supported by the terminal may be determined through [Equation 1], and at least one of the parameters in [Equation 1] may have different values depending on the communication counterpart of the terminal. That is, the maximum data rate may differ depending on whether the terminal performs a downlink and an uplink transmission/reception operation or a sidelink transmission/reception operation.

For example, when the terminal transmits or receives data to or from the base station, $OH^{(j)}$ is an overhead value, and $OH^{(j)}$ may be given as 0.14 in the downlink of FR1 (a band equal to or less than 6 GHz) and given as 0.18 in the uplink thereof, and may be determined as 0.08 in the downlink of FR2 (a band above 6 GHz) and given as 0.10 in the uplink thereof. On the other hand, when the terminal transmits or receives data to or from another terminal, that is, in the sidelink, $OH^{(j)}$ may have a value of $OH_{sub6}$ in FR1 (a band equal to or less than 6 GHz), and may have a value of $OH_{above6}$ in FR2 (a band above 6 GHz). The value of $OH_{sub6}$ may have a value equal to or greater than a specific value regardless of the configuration of a PSFCH. For example, the value of $OH_{sub6}$ may have a value greater than $2/12$. In the above, $OH_{sub6}$ and $OH_{above6}$ may be determined, for example, in the following methods.

Method 1: $OH_{sub6}$ is determined to be 0.21 and $OH_{above6}$ is determined to be 0.21.

Method 2: $OH_{sub6}$ and $OH_{above6}$ each are determined according to the ratio of slots in which PSFCH resources are configured or a period of the PSFCH resource in the resource pool configuration of the corresponding carrier. For example, if the PSFCH is configured for every slot, $OH_{sub6}$ and $OH_{above6}$ may be determined to be 0.42, if the PSFCH is configured for one slot of every two slots, $OH_{sub6}$ and $OH_{above6}$ may be determined to be 0.32, and if the PSFCH is configured for one slot of every four slots, $OH_{sub6}$ and $OH_{above6}$ may be determined to be 0.26. The values may be determined to be $$\frac{3}{14} + \frac{3}{14}, \frac{3}{14} + \frac{3}{14} \times \frac{1}{2}, \text{ and } \frac{3}{14} + \frac{3}{14} \times \frac{1}{4},$$

respectively. Specifically, $OH_{sub6}$ and $OH_{above6}$ each may be determined to be $$\frac{3}{14} + \frac{3}{14}, \frac{3}{14} + \frac{3}{14} \times \frac{1}{2}, \frac{3}{14} + \frac{3}{14} \times \frac{1}{4}$$

according to the ratio of slots in which PSFCH resources are configured in the resource pool configuration of the corresponding carrier, and $OH_{sub6}$ and $OH_{above6}$ each may be determined by an sl-PSFCH-Period parameter included in the PSFCH configuration. When sl-PSFCH-Period, which is the period of the PSFCH resource, is N, $OH_{sub6}$ and $OH_{above6}$ each may be $$\frac{3}{14} + \frac{3}{14} \times \frac{1}{N}$$

according to the resource pool configuration of the corresponding carrier.

For another example, when the terminal transmits or receives data to or from the base station, $OH^{(j)}$ is an overhead value, and $OH^{(j)}$ may be given as 0.14 in the downlink of FR1 (a band equal to or less than 6 GHz) and given as 0.18 in the uplink thereof, and may be determined as 0.08 in the downlink of FR2 (a band above 6 GHz) and given as 0.10 in the uplink thereof. On the other hand, when the terminal transmits or receives data to or from another terminal, that is, in the sidelink, $OH^{(j)}$ value may be determined according to a configuration value of a higher layer. For example, at least one sidelink resource pool may be configured in the terminal in order to perform transmission and reception of a physical sidelink shared channel (PSSCH), and $OH^{(j)}$ value may be determined according to a parameter of the resource pool having the largest bandwidth.

Including the above method, for example, the maximum data rate may be determined as follows.

For NR, the approximate data rate for a given number of aggregated carriers in a band or band combination is computed as follows.

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu} \cdot 12}{T_s^{\mu}} \cdot (1 - OH^{(j)}) \right)$$

wherein J is the number of aggregated component carriers in a band or band combination $R_{max} = 948/1024$ For the j-th CC, $v_{Layers}^{(j)}$ is the maximum number of supported layers given by higher layer parameter maxNumberMIMO-Layers-PDSCH for downlink and the maximum of higher layer parameters maxNumberMIMO-LayersCB-PUSCH and maxNumberMIMO-LayersNonCB-PUSCH for uplink.

$Q_m^{(j)}$ is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

μ is the numerology (as defined in TS 38.211 [6])

$T_s^\mu$ is the average OFDM symbol duration in a subframe for numerology μ, i.e.

$$T_s^\mu = \frac{10^{-3}}{14 \cdot 2^\mu}.$$

Note that normal cyclic prefix is assumed.

$N_{PRB}^{BW(j),\mu}$ is the maximum RB allocation in bandwidth $BW^{(j)}$ with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
0.14, for frequency range FR1 for DL
0.18, for frequency range FR2 for DL
0.08, for frequency range FR1 for UL
0.10, for frequency range FR2 for UL
0.21, for frequency range FR1 for SL
0.21, for frequency range FR2 for SL NOTE: Only one of the UL or SUL carriers (the one with the higher data rate) is counted for a cell operating SUL.

(1-1)th Embodiment

According to an embodiment, the maximum data rate supported by a terminal may be different depending on a counterpart with which the terminal communicates. That is, the maximum data rate supported by the terminal may be different depending on whether the terminal transmits or receives data to or from a base station or another terminal. The maximum data rate supported by the terminal may be determined through the following process.

For NR, the approximate data rate for a given number of aggregated carriers in a band or band combination is computed as follows.

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu} \cdot 12}{T_s^\mu} \cdot (1 - OH^{(j)}) \right)$$

wherein

J is the number of aggregated component carriers in a band or band combination $R_{max} = 948/1024$ For the j-th CC, $v_{Layers}^{(j)}$ is the maximum number of supported layers given by higher layer parameter maxNumberMIMO-LayersPDSCH for downlink and the maximum of higher layer parameters maxNumberMIMO-LayersCB-PUSCH, maxNumberMIMO-LayersNonCB-PUSCH for uplink, maxNumberMIMO-LayersCB-PSSCH-TX for sidelink transmission, and maxNumberMIMO-LayersCB-PSSCH-RX for sidelink reception.

$Q_m^{(j)}$ is the maximum supported modulation order given by higher layer parameter supportedModulationOrderDL for downlink, higher layer parameter supportedModulationOrderUL for uplink, higher layer parameter supportedModulationOrderSLTX for sidelink transmission, and higher layer parameter supportedModulationOrderSLRX for sidelink reception.

$f^{(j)}$ is the scaling factor given by higher layer parameter scalingFactor and can take the values 1, 0.8, 0.75, and 0.4.

μ is the numerology (as defined in TS 38.211 [6])

$T_s^\mu$ is the average OFDM symbol duration in a subframe for numerology μ, i.e.

$$T_s^\mu = \frac{10^{-3}}{14 \cdot 2^\mu}.$$

Note that normal cyclic prefix is assumed.

$N_{PRB}^{BW(j),\mu}$ is the maximum RB allocation in bandwidth $BW^{(j)}$ with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
0.14, for frequency range FR1 for DL
0.18, for frequency range FR2 for DL
0.08, for frequency range FR1 for UL
0.10, for frequency range FR2 for UL
0.21, for frequency range FR1 for SL-TX
0.21, for frequency range FR2 for SL-TX
0.21, for frequency range FR1 for SL-RX
0.21, for frequency range FR2 for SL-RX NOTE: Only one of the UL or SUL carriers (the one with the higher data rate) is counted for a cell operating SUL.

In the above, maxNumberMIMO-LayersPDSCH denotes the maximum number of layers supportable at the time of PDSCH reception in the downlink, and maxNumberMIMO-LayersNonCB-PUSCH denotes the maximum number of layers supportable at the time of PUSCH transmission through the uplink. In addition, in the above, maxNumberMIMO-LayersCB-PSSCH-TX and maxNumberMIMO-LayersCB-PSSCH-RX denote the maximum number of layers that can be supported in PSSCH transmission and reception in the sidelink, respectively.

In the above, supportedModulationOrderDL denotes a maximum modulation order supportable in PDSCH reception in the downlink, and supportedModulationOrderUL denotes a maximum modulation order supportable in PUSCH transmission through the uplink. In addition, in the above, supportedModulationOrderSLTX and supportedModulationOrderSLRX denote a maximum modulation order that can be supported for transmission and reception in the sidelink, respectively. The terminal and the base station may use at least one of parameters associated with each link in determining the respective maximum data rates in the downlink, uplink, and sidelink. For example, in order to determine the maximum data rate of the sidelink, a parameter defined for the sidelink can be used. If a separate parameter for each link is not defined, an existing parameter can be used. For example, a sidelink transmission terminal may use an existing uplink parameter, and a sidelink reception terminal may use an existing downlink parameter.

For example, in the process of determining the maximum transmission data rate in the sidelink, the terminal may calculate the maximum data rate by using at least one of $OH^{(j)}$ value corresponding to transmission in a frequency band used in the sidelink, a value configured by maxNumberMIMO-LayersCB-PSSCH-TX parameter, which denotes the maximum number of layers that can be supported in PSSCH transmission, or a value configured by the supportedModulationOrderSLTX parameter, which denotes the maximum modulation order that can be supported in PSSCH transmission. For example, in the process of determining the maximum reception data rate in the sidelink, the terminal may calculate the maximum data rate by using at least one of $OH^{(j)}$ value corresponding to reception in a frequency band used in the sidelink, a value configured by maxNumberMIMO-LayersCB-PSSCH-TX parameter, which denotes the maximum number of layers that can be supported in PSSCH reception, or a value configured by the supportedModulationOrderSLTX parameter, which denotes the maximum modulation order that can be supported in PSSCH reception.

In the above, an example in which the maximum number of layers, the maximum modulation order, and OHO) values have separate values according to the communication counterpart (down/uplink vs. sidelink) of the terminal has been described. However, this is only an example and does not denote that parameters such as $f^{(j)}$ and $N_{PRB}^{BW(j),\mu}$ do not have separate values depending on the communication counterpart. When other parameters have separate values according to the communication counterpart of the terminal, the above method may be applied to other parameters.

(1-2)th Embodiment

According to an embodiment of the disclosure, the maximum data rate supported by a terminal may be different depending on a counterpart with which the terminal communicates. That is, the maximum data rate supported by the terminal may be different depending on whether the terminal transmits or receives data to or from a base station or another terminal. The maximum data rate supported by the terminal may be determined through the following process.

For NR, the approximate data rate for a given number of aggregated carriers in a band or band combination is computed as follows.

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

wherein

J is the number of aggregated component carriers in a band or band combination. For NR sidelink, J=1.

$R_{max}$=948/1024

For the j-th CC, $v_{Layers}^{(j)}$ is the maximum number of supported layers given by higher layer parameter maxNumberMIMO-LayersPDSCH for downlink and the maximum of higher layer parameters maxNumberMIMO-LayersCB-PUSCH, maxNumberMIMO-LayersNonCB-PUSCH for uplink, maxNumberMIMO-LayersCB-PSSCH-TX for sidelink transmission, and maxNumberMIMO-LayersCB-PSSCH-RX for sidelink reception.

$Q_m^{(j)}$ is the maximum supported modulation order given by higher layer parameter supportedModulationOrderDL for downlink, higher layer parameter supportedModulationOrderUL for uplink, higher layer parameter supportedModulationOrderSLTX for sidelink transmission, and higher layer parameter supportedModulationOrderSLRX for sidelink reception.

$f^{(j)}$ is the scaling factor given by higher layer parameter scalingFactor and can take the values 1, 0.8, 0.75, and 0.4. For NR sidelink, $f^{(j)}$ is 1.

μ is the numerology (as defined in TS 38.211 [6])

$T_s^{\mu}$ is the average OFDM symbol duration in a subframe for numerology μ, i.e.

$$T_s^{\mu} = \frac{10^{-3}}{14 \cdot 2^{\mu}}.$$

Note that normal cyclic prefix is assumed.

$N_{PRB}^{BW(j),\mu}$ is the maximum RB allocation in bandwidth $BW^{(j)}$ with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
 0.14, for frequency range FR1 for DL
 0.18, for frequency range FR2 for DL
 0.08, for frequency range FR1 for UL
 0.10, for frequency range FR2 for UL
 0.21, for frequency range FR1 for SL-TX
 0.21, for frequency range FR2 for SL-TX
 0.21, for frequency range FR1 for SL-RX
 0.21, for frequency range FR2 for SL-RX
 NOTE: Only one of the UL or SUL carriers (the one with the higher data rate) is counted for a cell operating SUL.

In the above, J may be the number of carriers subjected to carrier aggregation (CA). Since CA is not supported in the sidelink, J may be determined to be 1. When CA is supported in the sidelink, J is determined to be the number of carriers supported for the CA in the sidelink. By considering that CA is not supported, the data rate may be determined according to the equation as follows.

$$\text{data rate (in } Mbps\text{)} = 10^{-6} \cdot v_{Layers} \cdot f \cdot Q_m \cdot R_{max} \cdot \frac{N_{PRB}^{BW,\mu} \cdot 12}{T_s^{\mu}} \cdot (1 - OH)$$

In the above, $f^{(j)}$ denotes a scaling index, and the value of $f^{(j)}$ may be different depending on a counterpart with which the terminal communicates. When the terminal transmits or receives data to or from the base station, the value of $f^{(j)}$ may be configured via higher layer signaling, and the value of $f^{(j)}$ used when the terminal transmits or receives data to or from another terminal (in the case of sidelink) may be predefined as a specific value (for example, "1", this embodiment is not limited thereto) or may be configured via higher layer signaling. Considering the case where CA is not applied and f is always 1, the data rate may be determined according to the equation as follows.

$$\text{data rate (in } Mbps\text{)} = 10^{-6} \cdot v_{Layers} \cdot Q_m \cdot R_{max} \cdot \frac{N_{PRB}^{BW,\mu} \cdot 12}{T_s^{\mu}} \cdot (1 - OH)$$

In the above, maxNumberMIMO-LayersPDSCH denotes the maximum number of layers supportable at the time of PDSCH reception in the downlink, and maxNumberMIMO-LayersNonCB-PUSCH denotes the maximum number of layers supportable in PUSCH transmission through the uplink. In addition, in the above, maxNumberMIMO-LayersCB-PSSCH-TX and maxNumberMIMO-LayersCB-PSSCH-RX denote the maximum number of layers that can be supported at the time of PSSCH transmission and reception through the sidelink, respectively.

In the above, supportedModulationOrderDL denotes a maximum modulation order supportable in PDSCH reception in the downlink, and supportedModulationOrderUL denotes a maximum modulation order supportable at the time of PUSCH transmission through the uplink. In addition, in the above, supportedModulationOrderSLTX and supportedModulationOrderSLRX denote a maximum modulation order that can be supported for transmission and reception in the sidelink, respectively.

The terminal and the base station may use at least one of parameters associated with each link in determining the respective maximum data rates in the downlink, uplink, and sidelink. For example, in order to determine the maximum data rate of the sidelink, one or more parameters defined for the sidelink can be used. If a separate parameter for each link is not defined, an existing parameter (or a parameter defined for another link) can be used. For example, a sidelink transmission terminal may use an existing uplink parameter, and a sidelink reception terminal may use an existing downlink parameter.

In the sidelink, $Q_m^{(j)}$ may be determined according to whether the terminal supports 256QAM. That is, if the terminal does not support 256QAM when performing sidelink transmission, $Q_m^{(j)}$ is determined to be 6 in the calculation of the maximum data rate for sidelink transmission since up to 64 QAM is supported. Further, $Q_m^{(j)}$ is determined to be 8 in the calculation of the maximum data rate for sidelink transmission when 256QAM is supported. In the disclosure, supporting of 256QAM may denote that an MCS table for 256QAM can be used. Whether or not 256QAM is supported may be determined via higher layer signaling from the base station or higher layer signaling between terminals. For example, when the use of the 256QAM MCS table is configured via higher layer signaling, or when the use of the 256QAM MCS table is previously defined, the terminal may determine that 256QAM is supported.

In another embodiment, in the sidelink, $Q_m^{(j)}$ may be configured in a resource pool configured in a sidelink BWP, or may be determined according to the MCS table preconfigured to be used. For example, if a specific terminal has a configuration such that the 256QAM MCS table can be used in at least one resource pool among resource pools configured in the sidelink BWP, $Q_m^{(j)}$ may be determined to be 8, and in other cases, $Q_m^{(j)}$ may be determined to be 6.

For example, in the process of determining the maximum transmission data rate in the sidelink, the terminal may calculate the maximum data rate by using at least one of $OH^{(j)}$ value corresponding to transmission in a frequency band used in the sidelink, a value configured by maxNumberMIMO-LayersCB-PSSCH-TX parameter, which denotes the maximum number of layers that can be supported in PSSCH transmission, or a value configured by the supportedModulationOrderSLTX parameter, which denotes the maximum modulation order that can be supported in PSSCH transmission. For example, in the process of determining the maximum reception data rate in the sidelink, the terminal may calculate the maximum data rate by using at least one of $OH^{(j)}$ value corresponding to reception in a frequency band used in the sidelink, a value configured by maxNumberMIMO-LayersCB-PSSCH-TX parameter, which denotes the maximum number of layers that can be supported in PSSCH reception, or a value configured by the supported-ModulationOrderSLTX parameter, which denotes the maximum modulation order that can be supported in PSSCH reception.

In the above, an example in which the maximum number of layers, the maximum modulation order, and $OH^{(j)}$ values have separate values according to the communication counterpart (down/uplink vs. sidelink) of the terminal has been described. However, this is only an example and does not denote that parameters such as $f^{(j)}$ and $N_{PRB}^{BW(j),\mu}$ do not have separate values depending on the communication counterpart. When other parameters have separate values according to the communication counterpart of the terminal, the above method may be applied to other parameters.

(1-3)th Embodiment

According to an embodiment of the disclosure, the maximum data rate supported by a terminal may be different depending on a counterpart with which the terminal communicates. That is, the maximum data rate supported by the terminal may be different depending on whether the terminal transmits or receives data to or from a base station or another terminal. The maximum data rate supported by the terminal may be determined through the following process. In this embodiment, the maximum data rate in the sidelink is determined according to the configured resource pool configuration, and may be determined according to the configured number of resource pools.

For NR, the approximate data rate for a given number of aggregated carriers in a band or band combination is computed as follows.

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

wherein

J is the number of aggregated component carriers in a band or band combination. For NR sidelink, J is the number of resource pools (pre-) configured to the UE.

$R_{max} = 948/1024$

For the j-th CC, (in case of sidelink, for the j-th resource pool), $v_{Layers}^{(j)}$ is the maximum number of supported layers given by higher layer parameter maxNumberMIMO-LayersPDSCH for downlink and the maximum of higher layer parameters maxNumberMIMO-LayersCB-PUSCH, maxNumberMIMO-LayersNonCB-PUSCH for uplink, maxNumberMIMO-LayersCB-PSSCH-TX for sidelink transmission, and maxNumberMIMO-LayersCB-PSSCH-RX for sidelink reception.

$Q_m^{(j)}$ is the maximum supported modulation order given by higher layer parameter supportedModulationOrderDL for downlink, higher layer parameter supportedModulationOrderUL for uplink, higher layer parameter supportedModulationOrderSLTX for sidelink transmission, and higher layer parameter supportedModulationOrderSLRX for sidelink reception.

$f^{(j)}$ is the scaling factor given by higher layer parameter scalingFactor and can take the values 1, 0.8, 0.75, and 0.4.

μ is the numerology (as defined in TS 38.211 [6])

$T_s^{\mu}$ is the average OFDM symbol duration in a subframe for numerology μ, i.e.

$$T_s^\mu = \frac{10^{-3}}{14 \cdot 2^\mu}.$$

Note that normal cyclic prefix is assumed.

$N_{PRB}^{BW(j),\mu}$ is the maximum RB allocation in bandwidth $BH^{(j)}$ with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
0.14, for frequency range FR1 for DL
0.18, for frequency range FR2 for DL
0.08, for frequency range FR1 for UL
0.10, for frequency range FR2 for UL
0.21, for frequency range FR1 for SL-TX
0.21, for frequency range FR2 for SL-TX
0.21, for frequency range FR1 for SL-RX
0.21, for frequency range FR2 for SL-RX NOTE: Only one of the UL or SUL carriers (the one with the higher data rate) is counted for a cell operating SUL.

In the above, J may be the number of carriers subjected to carrier aggregation (CA). In the sidelink, J may be the number of resource pools configured for a terminal.

In the above, maxNumberMIMO-LayersPDSCH denotes the maximum number of layers supportable at the time of PDSCH reception in the downlink, and maxNumberMIMO-LayersNonCB-PUSCH denotes the maximum number of layers supportable at the time of PUSCH transmission through the uplink. In addition, in the above, maxNumber-MIMO-LayersCB-PSSCH-TX and maxNumberMIMO-LayersCB-PSSCH-RX denote the maximum number of layers that can be supported in PSSCH transmission and reception in the sidelink, respectively.

In the above, supportedModulationOrderDL denotes a maximum modulation order supportable in PDSCH reception in the downlink, and supportedModulationOrderUL denotes a maximum modulation order supportable in PUSCH transmission through the uplink. In addition, in the above, supportedModulationOrderSLTX and supported-ModulationOrderSLRX denote a maximum modulation order that can be supported for transmission and reception in the sidelink, respectively.

The terminal and the base station may use at least one of parameters associated with each link in determining the respective maximum data rates in the downlink, uplink, and sidelink. For example, in order to determine the maximum data rate of the sidelink, one or more parameters defined for the sidelink can be used. If a separate parameter for each link is not defined, an existing parameter (or a parameter defined for another link) can be used. For example, a sidelink transmission terminal may use an existing uplink parameter, and a sidelink reception terminal may use an existing downlink parameter.

In the sidelink, $Q_m^{(j)}$ may be determined according to whether the terminal supports 256QAM. That is, if 256QAM is not supported when the terminal performs sidelink transmission in the corresponding resource pool, $Q_m^{(j)}$ is determined to be 6 in the calculation of the maximum data rate for sidelink transmission since up to 64 QAM is supported. Further, $Q_m^{(j)}$ is determined to be 8 in the calculation of the maximum data rate for sidelink transmission when the terminal supports 256QAM. Alternatively, if it is configured to use the 256QAM MCS table in the corresponding resource pool, $Q_m^{(j)}$ is determined to be 8 in the calculation of the maximum data rate, and if it is configured not to use the 256QAM MCS table in the resource pool, $Q_m^{(j)}$ is determined to be 6 in the calculation of the maximum data rate. The case where the 256QAM MCS table is configured not to be used in the resource pool may denote that the 256QAM table is not included in the usable MCS table configured in the resource pool. Alternatively, in a case where 256QAM is supported in at least one resource pool configured for the terminal, when the terminal determines the maximum data rate of the sidelink, $Qm^{(j)}$ for all resource pools may be determined to be 8. Supporting of 256QAM in the resource pool may be a configuration that enables 256QAM MCS table to be used through the corresponding resource pool configuration information, or may be a case that is preconfigured in the standard such that the 256QAM MCS table is to be used. This configuration may be made via higher layer signaling from the base station or higher layer signaling between terminals.

In another embodiment, in the sidelink, $Q_m^{(j)}$ may be configured in a resource pool configured in the sidelink BWP, or may be determined according to a preconfigured MCS table. For example, if a specific terminal has a configuration such that the 256 QAM MCS table is usable in at least one resource pool among resource pools configured in the sidelink BWP, $Q_m^{(j)}$ may be determined to be 8, otherwise $Q_m^{(j)}$ may be determined to be 6.

For example, in the process of determining the maximum transmission data rate in the sidelink, the terminal may calculate the maximum data rate by using at least one of $OH^{(j)}$ value corresponding to transmission in a frequency band used in the sidelink, a value configured by maxNumberMIMO-LayersCB-PSSCH-TX parameter, which denotes the maximum number of layers that can be supported in PSSCH transmission, or a value configured by the supportedModulationOrderSLTX parameter, which denotes the maximum modulation order that can be supported in PSSCH transmission. For example, in the process of determining the maximum reception data rate in the sidelink, the terminal may calculate the maximum data rate by using at least one of $OH^{(j)}$ value corresponding to reception in a frequency band used in the sidelink, a value configured by maxNumberMIMO-LayersCB-PSSCH-RX parameter, which denotes the maximum number of layers that can be supported in PSSCH reception, or a value configured by the supportedModulationOrderSLTX parameter, which denotes the maximum modulation order that can be supported in PSSCH reception. Alternatively, the OH value may be a value determined according to whether or not PSFCH is configured in the resource pool.

For example, if the PSFCH is determined to be included in every slot, the OH value may be 0.35 or 5/14, which is obtained because a total of 5 symbols including a first symbol which is a repetition symbol for AGC use, two symbols for PSFCH, and gap symbols before and after the PSFCH, among 14 symbols of one slot may not be used for data transmission. Alternatively, the OH value may be determined to be 0.45 by including the overhead of control information and DMRS symbol.

As another example, if the PSFCH is determined to be included in every two slots, the OH value may be 0.21 or 3/14, which is obtained because the overhead of 5 symbols (a total of 5 symbols including the first symbol which is a repetition symbol for AGC use, two symbols for PSFCH, and gap symbols before and after PSFCH) cannot be used for data transmission in a slot in which the PSFCH can be transmitted, the overhead of 1 symbol (the first symbol for AGC use) cannot be used for data transmission in a slot in which PSFCH resources do not exist, and thus the average value thereof may be 0.21. Alternatively, the OH value may be determined to be 0.35 by including the overhead of the control information and the DMRS symbol.

As still another example, if the PSFCH is determined to be included in every four slots, the OH value may be 0.14, which is obtained because the overhead of 5 symbols cannot be used for data transmission in a slot in which the PSFCH can be transmitted, the overhead of 1 symbol cannot be used for data transmission in a slot in which PSFCH resources do not exist, and thus the average value thereof may be 0.14. Alternatively, the OH value may be determined to be 0.28 by including the overhead of the control information and the DMRS symbol.

As still further another example, the OH value may be 0.07 in a resource pool in which the PSFCH resource is not configured because the overhead of 1 symbol (the first symbol for AGC use) cannot be used for data transmission in a slot in which PSFCH resources do not exist, and thus the OH value may be configured to be 0.28 by including the overhead of the control information and the DMRS symbol.

In the above, an example in which the maximum number of layers, the maximum modulation order, and $OH^{(j)}$ values have separate values according to the communication counterpart (down/uplink vs. sidelink) of the terminal has been described. However, this is only an example and does not denote that parameters such as $f^{(j)}$ and $N_{PRB}^{BW(j),\mu}$ do not have separate values depending on the communication counterpart. When other parameters have separate values according to the communication counterpart of the terminal, the above method may be applied to other parameters.

Second Embodiment

According to an embodiment, a terminal may determine a maximum data rate by calculating the maximum data rate according to a communication counterpart or by acquisition from among stored values. In addition, the determined maximum data rate can be used for comparison with an actual instantaneous data rate. This comparison can be performed by Equation 2 below.

In Equation 2 below, the left side of the inequality may denote the instantaneous data rate of scheduled data, and DataRateCC (which can be determined according to the terminal capability) on the right side thereof may denote the maximum data rate in the corresponding serving cell of the terminal. The DataRateCC of the right side may have a value determined depending on whether the scheduling is for transmission/reception to/from a base station, such as PDSCH or PUSCH, or for transmission/reception to/from a terminal, such as PSSCH.

$$\frac{\sum_{m=0}^{M-1} V_{j,m}}{L \times T_s^\mu} \leq \text{Data Rate } CC \quad \text{Equation 2}$$

In the above, L is the number of OFDM symbols allocated to the PDSCH or PSSCH, and M is the number of TBs transmitted through the corresponding PDSCH or PSSCH. In the above, L may also include an AGC symbol transmitted by the terminal through the sidelink. $T_s^\mu$ is calculated by $$T_s^\mu = \frac{10^{-3}}{2^\mu \cdot N_{symb}^{slot}},$$

and μ is the subcarrier spacing used for transmission of the PDSCH or PSSCH. For the m-th TB, $v_{j,m}$ is calculated based on $$V_{j,m} = C' \cdot \left\lfloor \frac{A}{C} \right\rfloor,$$

A is the size of TB (TBS), C is the number of code blocks (CB) included in the TB, and C' is the number of code blocks scheduled in the TB. In the case of code block group (CBG) retransmission, C and C' may be different. $\lfloor x \rfloor$ denotes the largest integer not greater than x.

In the above, DataRateCC is the maximum data rate supported by the terminal in a corresponding carrier or serving cell, and may be determined based on Equation 1 above. Alternatively, DataRateCC may be calculated as in Equation 3 below.

$$\text{data rate (in } Mbps\text{)} = \\ 10^{-6} \cdot V_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)})$$

Equation 3

Equation 3 is an equation showing an example of calculating the DataRateCC of the j-th serving cell.

In Equation 3, $R_{max}$=948/1024, $V_{Layers}^{(j)}$ is a maximum number of layers, $Q_m^{(j)}$ is a maximum modulation order, $f^{(j)}$ is a scaling index, and μ is a subcarrier spacing. $f^{(j)}$ may be reported by a terminal as one of values of 1, 0.8, 0.75, and 0.4, and μ may be given in Table 8 above. In addition, $T_s^\mu$ is the average OFDM symbol length, $T_s^\mu$ can be calculated as $$\frac{10^{-3}}{14 \cdot 2^\mu},$$

and $N_{PRB}^{BW(j),\mu}$ is the maximum number of RBs in BW(j). $OH^{(j)}$ is an overhead value, and may be given as 0.14 in the downlink of FR1 (a band equal to or less than 6 GHz) and 0.18 in the uplink thereof, and may be given as 0.08 in downlink of FR2 (a band above 6 GHz) and 0.10 in the uplink thereof.

Different values of $OH^{(j)}$ may be applied to the sidelink, and the value may correspond to $OH_{sub6}$ in FR1 (a band equal to or less than 6 GHz) and $OH_{above6}$ in FR2 (band above 6 GHz). $OH_{sub6}$ may have a specific value or greater regardless of the configuration of a physical sidelink feedback channel (PSFCH). For example, $OH_{sub6}$ may have a value greater than 2/12. Alternatively, the value of $OH^{(j)}$ may be determined by a configuration value of a higher layer. For example, one or more sidelink resource pools may be configured in the terminal for transmission and reception of a physical sidelink shared channel (PSSCH), and the OH(j) value may be determined by a parameter of a resource pool having the largest bandwidth, among the sidelink resource pools. Other values except for $OH^{(j)}$ may also have different values applied according to a link, that is, whether it is a downlink, an uplink, or a sidelink, as described in the above embodiment.

As an example, another method of identifying whether the actual instantaneous data rate satisfies the terminal capability may be calculated based on Equation 4 below. In Equation 4 below, the left side of the inequality may denote the instantaneous data rate of data transmitted from J serving cells upon scheduling, and the DataRate on the right side thereof may denote the maximum data rate in the J serving cells configured in the terminal according to the terminal capability. The DataRate on the right side may be a value determined depending on whether the scheduling is for transmission/reception to/from a base station, such as PDSCH or PUSCH, or for transmission/reception to/from a terminal, such as PSSCH.

$$\sum_{j=0}^{J-1} \frac{\sum_{m=0}^{M-1} V_{j,m}}{T_{slot}^{\mu(j)}} \leq \text{Data Rate} \quad \text{Equation 4}$$

In the above, J is the number of serving cells configured in the corresponding terminal in the corresponding frequency range. For the j-th serving cell, M is the number of TBs transmitted in a slot. In addition, it is defined as $T_{slot}^{\mu(j)} = 10^{-3}/2^{\mu(j)}$, and $\mu(j)$ is a subcarrier interval used for the PDSCH or PSSCH in the slot of the j-th serving cell. For the m-th TB, $v_{j,m}$ is calculated as $$V_{j,m} = C' \cdot \left\lfloor \frac{A}{C} \right\rfloor,$$

A is the size of the TB (TBS), C is the number of code blocks (CBs) included in the TB, and C' is the number of code blocks scheduled in the TB. In the case of CBG retransmission, C and C' may be different. $\lfloor x \rfloor$ denotes the largest integer not greater than x.

Figure 13:
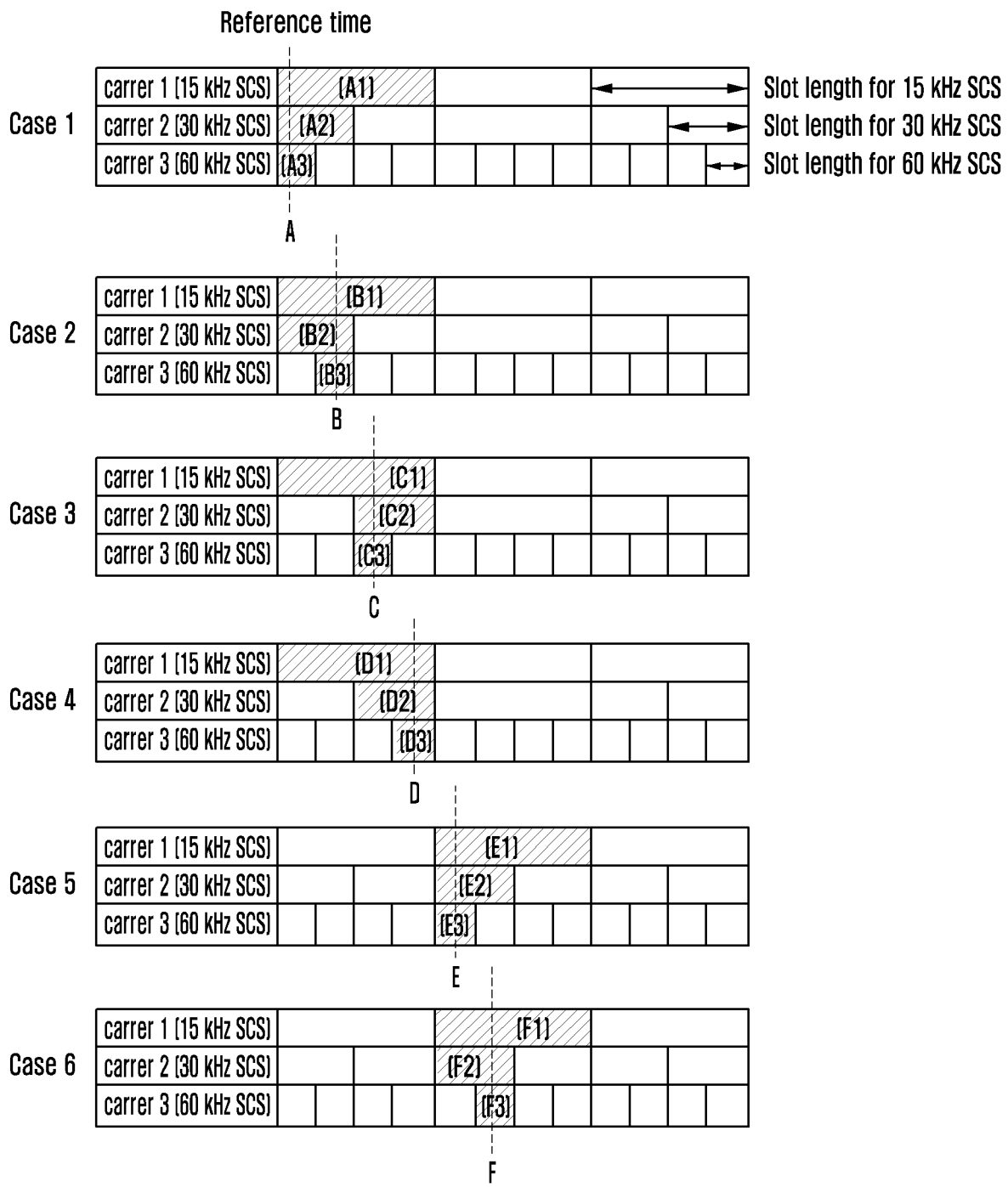
FIG. 13 illustrates an example of determining a slot including a specific time in a carrier configured in a terminal via higher layer signaling according to an embodiment of the disclosure.

In the above, DataRate is the maximum data rate supported by the J serving cells configured in the corresponding terminal and may be determined based on Equation 1. In Equation 4, the actual average transmission rate of the terminal at a specific time (reference time) may be determined by considering the sum of the total number of bits of TB or CB included in the PDSCH, PUSCH or PSSCH scheduled in a slot including the specific time. In the above, the slot including the specific time may be determined as shown in FIG. 13.

In the above, an example of determining whether Equation 2 or 4 is satisfied has been described. As another example, one or a combination of the following methods may be applied by considering that the terminal may perform sidelink transmission and reception in slot units in the sidelink and receive data from various resource pools.

Method 1: The terminal compares the maximum data rate with the instantaneous data rate by using the equation of $$\frac{TBS}{T_{slot}^{\mu}} \leq \text{Data Rate}.$$

TBS denotes TBS transmitted through (one or more) PSSCHs. $T_{slot}^{\mu}$ is the slot length.

Method 2: The terminal compares the maximum data rate with the instantaneous data rate by using the equation of $$\sum_{j=0}^{J-1} \frac{TBS_j}{T_{slot}^{\mu}} \leq \text{Data Rate}.$$

TBSj denotes TBS transmitted from the j-th resource pool. $T_{slot}^{\mu}$ is the slot length.

When "DataRateCC$_1$" is the maximum data rate in the corresponding serving cell of the terminal when communicating with the base station, and "DataRateCC$_2$" is the maximum data rate in the corresponding serving cell of the terminal when communicating with another terminal, the terminal may determine a value applied to the right side of [Equation 2] according to the communication counterpart. When the maximum data rate in J serving cells of the terminal when communicating with the base station is "DataRate$_1$" and the maximum data rate in the J serving cells of the terminal when communicating with another terminals is "DataRate$_2$", the terminal may determine a value applied to the right side of [Equation 4] according to the communication counterpart. If the actual instantaneous data rate is greater than the value of DataRateCC or DataRate determined according to the communication counterpart, the terminal may omit the reception or transmission operation in the corresponding slot. Specifically, the terminal may omit an operation of receiving the PDSCH or transmitting the PUSCH from or to the base station in the corresponding slot, or may omit an operation of transmitting or receiving the PSSCH in the corresponding slot.

Figure 11B:
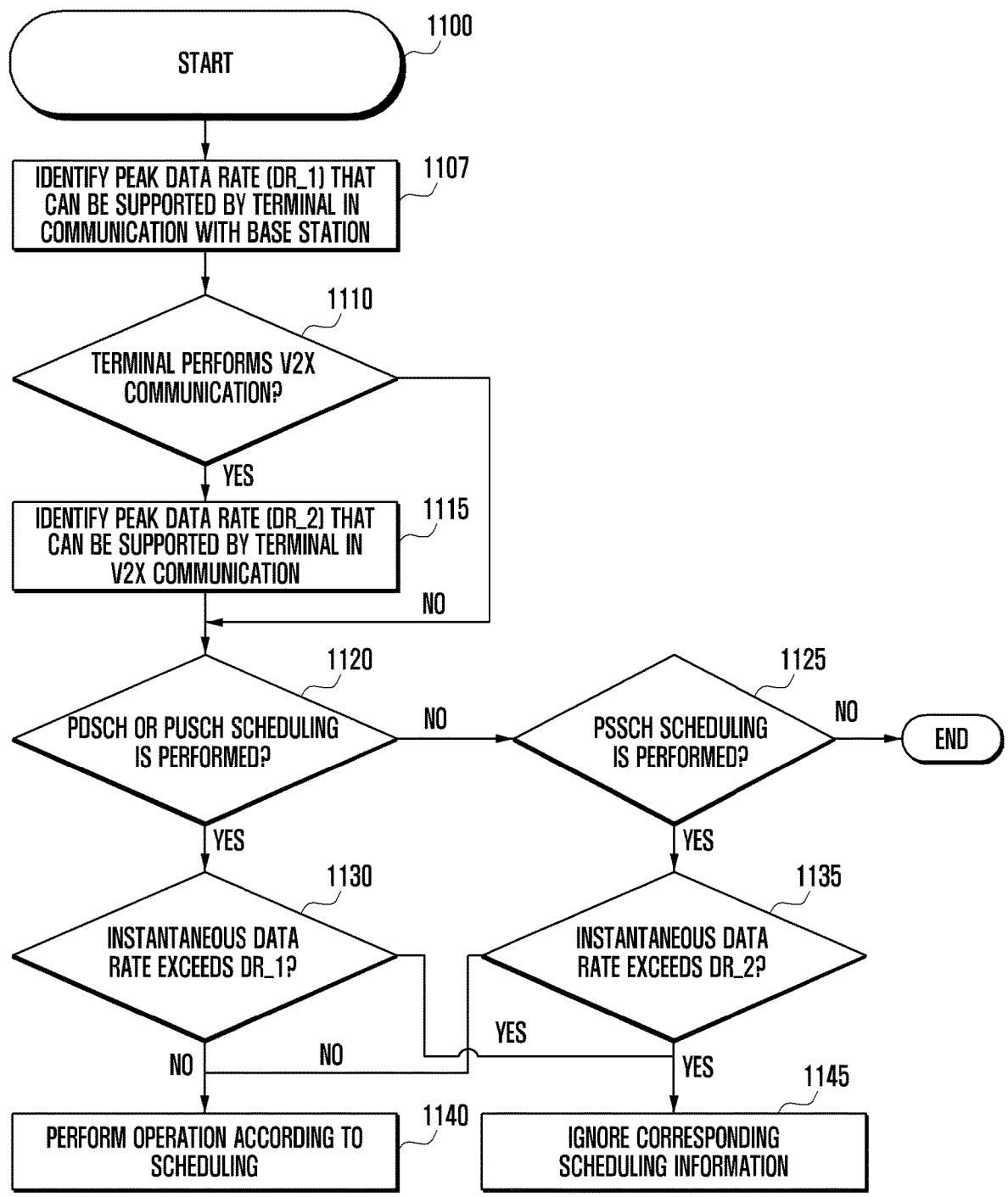
FIG. 11B is a flowchart illustrating a method of determining whether a terminal performs PDSCH decoding, PUSCH transmission, and PSSCH reception according to an embodiment of the disclosure.

FIG. 11B is a flowchart illustrating a method of determining whether a terminal performs PDSCH decoding, PUSCH transmission, and PSSCH reception according to an embodiment of the disclosure. Referring to FIG. 11B, the method may start at 1100. The terminal may identify a peak data rate (DR_1) that can be supported in communication with a base station (operation 1107). The terminal may determine whether to perform additional V2X communication (operation 1110), and when the terminal needs to additionally perform V2X communication, that is, when the terminal needs to perform direct communication with another terminal, the terminal may identify a peak data rate (DR_2) that can be supported by the terminal in V2X communication (direct communication with another terminals) (operation 1115). The UE may monitor the PDCCH in a predetermined resource region such as CORESET, and may determine whether the PDSCH or PUSCH is scheduled as a result of the monitoring of the PDCCH (operation 1120). When the PDSCH or PUSCH is scheduled as a result of the monitoring of the PDCCH, the terminal may compare the instantaneous data rate of the corresponding PDSCH or PUSCH with DR_1 (operation 1130), and if the instantaneous data rate exceeds DR_1, the terminal may ignore the corresponding scheduling (operation 1145). On the other hand, the terminal may perform a reception or transmission operation according to the corresponding scheduling (operation 1140). As a result of monitoring of the PDCCH, the terminal determines whether the PSSCH is scheduled (operation 1125), and when the PSSCH is scheduled, the terminal may compare the instantaneous data rate of the PSSCH with DR_2 (operation 1135), and when the instantaneous data rate exceeds DR_2, the terminal may ignore the corresponding scheduling (operation 1145). On the other hand, a PSSCH reception operation may be performed according to the corresponding scheduling (operation 1140).

Third Embodiment

With respect to scheduling of retransmission, for example, even if retransmission is performed, if the condition of [Equation 2] or [Equation 4] needs to be satisfied, retransmission may not be scheduled in many cases.

Figure 12:
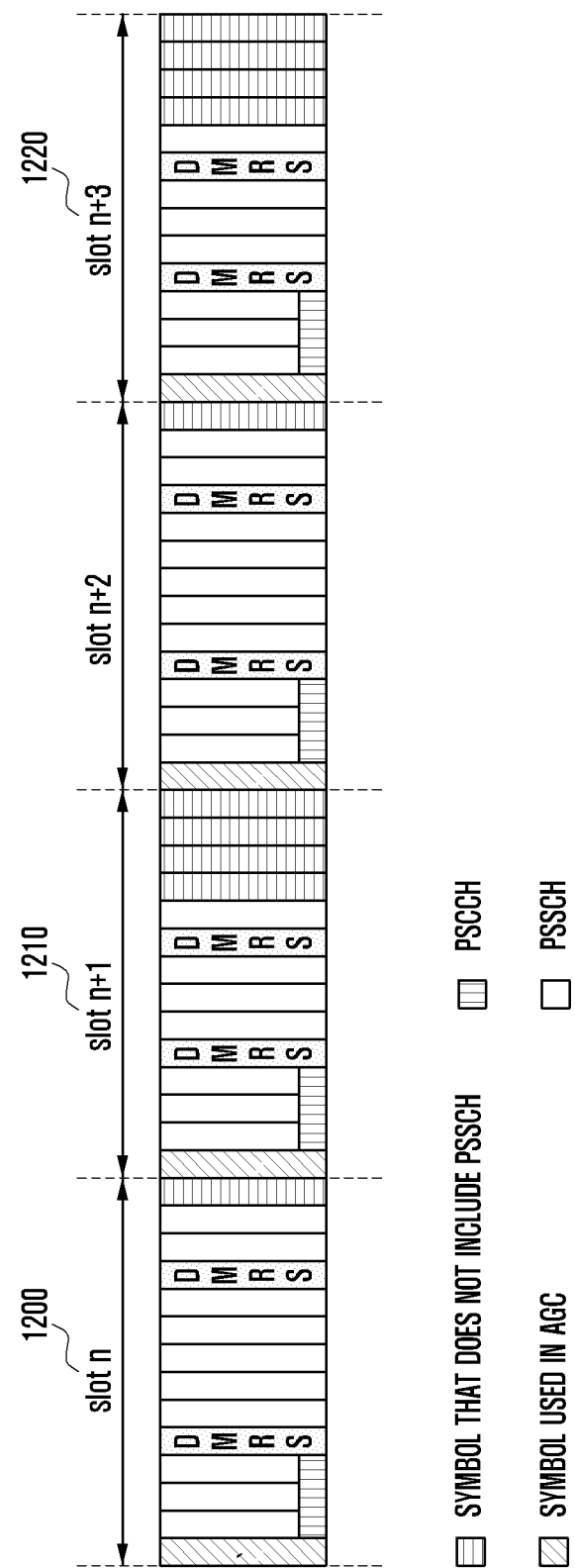
FIG. 12 illustrates an example in which a sidelink symbol or channel is mapped to a slot and used according to an embodiment of the disclosure.

FIG. 12 illustrates an example in which a channel or a sidelink symbol is mapped to a slot and used.

Referring to FIG. 12, if TB1 satisfies a comparison between the maximum data rate and the instantaneous data rate in slot n 1200, then TB1 may be initially transmitted in slot n 1200. The TB1 may not satisfy the "comparison between the maximum data rate and the instantaneous data rate" in slot n+1 1210 and slot n+3 1220. Therefore, TB1 may not be retransmitted in slot n+1 1210 and slot n+3 1220.

According to an embodiment, a comparison between the maximum data rate and the instantaneous data rate by using [Equation 2] or [Equation 4] may be applied differently depending on whether initial transmission or retransmission is performed. For example, the "comparison between the maximum data rate and the instantaneous data rate" using [Equation 2] or [Equation 4] is applied only to the initial transmission between the terminal and another terminal, and in the case of retransmitting at least a part of data included in the initial transmission, the terminal may not perform the "comparison between the maximum data rate and the instantaneous data rate". That is, in the case of retransmission, the terminal may transmit or receive PSSCH without the "comparison between the maximum data rate and the instantaneous data rate".

If the $I_{MCS}$ value for at least one TB in SCI transmitted through the PSCCH is greater than a specific value (W), the $I_{MCS}$ value may be considered for the sidelink retransmission for the at least one TB. An MCS table to be used by the terminal may be configured via higher layer signaling such as mcs-Table-SL, and the specific value (W) corresponding to retransmission may be determined according to the configured MCS table (MCS table 1, MCS table 2, or MCS table 3). For example, the terminal and the base station may understand that, when MCS table 2 is configured, the case where the MCS value included in the SCI is greater than 27, that is, the MCS values of 28, 29, 30, or 31, corresponds to retransmission, and when MCS table 1 or MCS table 3 is configured, the case where the MCS value is greater than 28, that is, the MCS values of 29, 30, or 31, corresponds to retransmission.

Fourth Embodiment

The current embodiment relates to a method and apparatus for scheduling and receiving data so as not to exceed a maximum data rate of a terminal in performing data transmission or retransmission. In the current and subsequent embodiments, data may be interchangeably referred to as TB or transport block.

When a terminal accesses a base station, the terminal capability may be reported to the base station, and the terminal capability may include at least one of parameters capable of calculating the maximum data rate of the terminal, such as the maximum number of layers that the terminal can support, the maximum modulation order, and the like.

The maximum data rate of the terminal may be calculated, for example, as given in Equation 1, based on the terminal capability reported to the base station and parameters configured in the terminal by the base station via RRC signaling. The maximum data rate of the terminal may be determined based on the baseband processing or signal processing capability of the corresponding terminal, including channel estimation, equalization, channel code decoding, and multi-antenna reception. That is, if a terminal has a high maximum data rate, it can be considered that the terminal has a high signal processing capability. The terminal may calculate a "maximum data rate" for communication with the base station and a "maximum data rate" for communication with the terminal, respectively. Different values may be used for at least one parameter used when calculating the "maximum data rate" depending on the communication counterpart. The parameter may include a parameter at least such as $OH^{(j)}$.

The terminal may receive downlink control information or sidelink control information including scheduling information, may identify the scheduling information, and may calculate the actual instantaneous data rate by using at least one of the following methods.

The terminal may be aware of the amount of data to be transmitted/received or the TBS value based on the scheduling information, and may also identify the number of symbols to which the PDSCH, PUSCH or PSSCH is mapped.

If the actual data rate calculated based on the information scheduled for the terminal is greater than the maximum data rate of the corresponding terminal, the terminal may not be able to complete signal processing required for transmitting and receiving the scheduled data within a predetermined time. Therefore, the base station may need to schedule the actual instantaneous data rate to be smaller than the maximum data rate of the corresponding terminal. This is because when scheduling is performed so that the actual instantaneous data rate is greater than the maximum data rate of the terminal, the terminal does not complete signal processing within a predetermined time, and thus the frequency time resource is used inefficiently.

Scheduling and data transmission/reception methods may differ according to the method of calculating the actual instantaneous data rate in the above. As an example, a method of identifying whether the actual instantaneous data rate satisfies the terminal capability may be calculated based on Equation 2 for example.

FIG. 13 illustrates an example of determining a slot including the specific time in a carrier configured in a terminal via higher layer signaling according to an embodiment of the disclosure.

The length of a slot may be different for each carrier according to a subcarrier spacing, and indicated slots correspond to slots including a specific time. As a specific time is changed, for example, a reference time A is changed to a reference time B, slots including a corresponding specific time may be changed from slots A1, A2, and A3 to slots B1, B2, and B3, for example.

Referring to FIG. 13, slot A1 and slot B1 may be the same slot, and slot A2 and slot B2 may be the same slot. Therefore, for example, only the PDSCH, the PUSCH, or the PSSCH, which are mapped to slots (that is, slots A1, A2, and A3) including reference time A corresponding to the specific time and transmitted, are considered and code blocks transmitted in the PDSCH, PUSCH or PSSCH may be used at the time of calculation of the actual average transmission rate of the terminal at the reference time A.

When the reference time D changes to the reference time E, slots D1, D2, and D3 including the reference time D are changed to slots E1, E2, and E3, and in this case, all of slots including the reference time are changed. The terminal may perform operations for PDSCH reception, PUSCH transmission, and PSSCH transmission/reception only when the actual transmission rate calculated as described above is scheduled to be smaller than the maximum transmission rate of the terminal itself calculated as in Equation 1. If the calculated actual transmission rate is greater than the maximum transmission rate of the terminal itself, the PDSCH reception, PUSCH transmission, and PSSCH transmission/reception operations in the corresponding slot may be omitted. In the current and subsequent embodiments, a slot including a reference time may be referred to as an overlapped slot.

In the above, Equation 4 may serve as a condition applied to all cases including initial transmission and retransmission, and Equation 2 may serve as a condition applied to retransmission. However, Equation 2 or 4 is only an example of a condition of limiting scheduling, and is not limited to the scope of the disclosure.

For all cases in which the base station schedules retransmission of a specific TB for the terminal, for example, if scheduling is limited so as to satisfy the condition of Equation 2, retransmission may not be scheduled in many cases.

In the above, "scheduling of retransmission of a specific TB" for the terminal by the base station may denote a condition of "when MCS is greater than 27" in a case where the following MCS table 2 is configured, or the condition of "when MCS is greater than 28" in a case where a configuration other than MCS table 2 is established.

In actual retransmission of the NR system, scheduling is performed using all MCS values and data transmission/reception may be performed. Scheduling of retransmission in the current and subsequent embodiments may be interpreted such that scheduling is performed using a MCS value greater than 27, that is, MCS values of 28, 29, 30, or 31 when the scheduling is performed based on MCS table 2. However, the disclosure is not limited thereto, and the disclosure may be applied even in the case of retransmission even if a different MCS value is used.

In addition, scheduling of retransmission in the current and subsequent embodiments may be interpreted such that scheduling is performed using an MCS value greater than 28, that is, MCS values of 29, 30, or 31 when the scheduling is performed based on MCS table 1 (Table 20) or MCS table 3 (Table 22), or the case other than MCS table 2 (Table 21). However, the disclosure is not limited thereto, and the disclosure may be applied even in the case of retransmission even if a different MCS value is used.

TABLE 20

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 21

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 22

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |

TABLE 22-continued

| MCS Index $I_{MCS}$ | Modulation Order $Q_m$ | Target code Rate R × [1024] | Spectral efficiency |
|---|---|---|---|
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Alternatively, more specifically, a case in which the $I_{MCS}$ value for at least one TB in the DCI is greater than a specific value (W=27 or 28) may be assumed or considered to be retransmission. In the above, a specific value for comparison with $I_{MCS}$ may be determined to be 27 or 28 according to the configuration relating to an MCS table to be used.

For example, the specific value W may be determined according to a higher layer parameter mcs-Table value included in a configuration related to PDSCH transmission, PUSCH transmission, or SPS transmission. For example, when "256-QAM" is configured, the specific value may be 27, and in the other cases, the specific value may be 28.

For example, if a subcarrier spacing of 120 kHz is used for 2-layer transmission based on 64-QAM in a frequency band of 100 MHz, and if a base station has initially transmitted one TB to a terminal by using a PDSCH through 7 symbols based on MCS 26, then the base station may fail to perform retransmission through the same 7 symbols. This is because a specific terminal may not be able to process scheduling in which the condition of Equation 2 is not satisfied.

Therefore, when retransmission is being performed, a case where the base station and the terminal consider the scheduling limiting condition (e.g., Equation 2) in determining a subsequent operation may be limited as specific cases. Meanwhile, in the following, Equation 2 is described as an example of scheduling limiting condition, but the embodiment of the disclosure is not limited thereto.

As an example, the scheduling limiting condition may be applied only to the case where the number of symbols L allocated to PDSCH transmission for retransmission is less than 7. This may be a method considering the condition given by Equation 2, when retransmission is performed or in a case where the $I_{MCS}$ value for at least one TB in the DCI is greater than a specific value (W=27 or 28), and the PDSCH is mapped to a symbol less than 7 and transmitted. That is, when the number of symbols L to which the PDSCH used for retransmission is mapped is greater than or equal to 7, the condition of Equation 2 is not applied.

In the current and subsequent embodiments, when determining the number of symbols used for PDSCH mapping, the number of symbols allocated for PDSCH transmission, or the number of symbols used for PDSCH transmission, a demodulation reference signal (DMRS) symbol for the PDSCH may also be included in a symbol used for PDSCH transmission. That is, in order to determine the number of symbols, both DCI indicating PDSCH mapping information and configuration information related to symbols for PDSCH transmission transmitted via higher layer signaling may be considered. Likewise to the case of PUSCH, a symbol used for PUSCH transmission may be determined to include a DMRS symbol for PUSCH.

In the above, the condition of Equation 2 is considered only in a case where the PDSCH is mapped to a symbol less than 7 and transmitted because the frequency of scheduling in which data transmitted at the initial transmission is mapped to a symbol less than 7 is small and there are many cases in which the data is mapped to symbols greater than or equal to 7. According to the relaxation of these conditions, the complexity of the base station scheduling algorithm and implementation method can be reduced.

In the embodiment, a method of comparing the number of symbols L, to which the PDSCH used for retransmission is mapped, with 7 symbols has been described as an example. However, the scope of the disclosure is not limited to 7 symbols, and can be extended and applied to a method of comparing the same based on different numbers of symbols, such as 8 symbols or 9 symbols.

Besides the embodiment in which the scheduling limiting condition (Equation 2) is applied based on whether or not the retransmission occurs and the number of symbols of the PDSCH, Equation 2 may serve as a condition applied in other cases. As an example, when the UE reports the capability of fast processing time, when higher parameters of Capability2-PDSCH-Processing are configured, or when processingType2Enabled in the higher parameter set of PDSCH-ServingCellConfig (or PUSCH-ServingCellConfig) is configured as "TRUE", Equation 2 above may also be applied. In the above, applying of Equation 2 may indicate that the condition of Equation 2 is identified, and thus only in a case where scheduling satisfies Equation 2, data transmission/reception is enabled based on the scheduling.

Fifth Embodiment

The current embodiment relates to a method and apparatus for scheduling and receiving data so as not to exceed a maximum data rate of a terminal in performing data transmission or retransmission.

When a terminal accesses a base station, the UE capability may be reported to the base station, and the UE capability may include at least one of parameters capable of calculating the maximum data rate of the terminal, such as the maximum number of layers that the terminal can support, the maximum modulation order, and the like.

The maximum data rate of the terminal may be calculated, for example, as given in Equation 1, based on the UE capability reported to the base station and parameters configured in the terminal by the base station via RRC signaling. The maximum data rate of the terminal may be determined based on the baseband processing or signal processing capability of the corresponding terminal, including channel estimation, equalization, channel code decoding, and multi-antenna reception. That is, if a terminal has a high maximum data rate, it can be considered that the terminal has a high signal processing capability. The terminal may calculate a "maximum data rate" for communication with the base station and a "maximum data rate" for communication with the terminal, respectively. Different values may be used for at least one parameter used when calculating the "maximum data rate" depending on the communication counterpart. The parameter may include a parameter at least such as $OH^{(j)}$.

The terminal may receive downlink control information or sidelink control information including scheduling information, may identify the scheduling information, and may calculate the actual instantaneous data rate by using at least one of the following methods.

The terminal may be aware of the amount of data to be transmitted/received or a TBS value based on the scheduling information, and may also identify the number of symbols to which the PDSCH, PUSCH or PSSCH is mapped.

If the actual data rate calculated based on the information scheduled for the terminal is greater than the maximum data rate of the corresponding terminal, the terminal may not be able to complete signal processing required for transmitting and receiving the scheduled data within a predetermined time. Therefore, the base station may need to schedule the actual instantaneous data rate to be smaller than the maximum data rate of the corresponding terminal. This is because when scheduling is performed so that the actual instantaneous data rate is greater than the maximum data rate of the terminal, the terminal does not complete signal processing within a predetermined time, and thus the frequency time resource is used inefficiently.

Scheduling and data transmission/reception methods may differ according to the method of calculating the actual instantaneous data rate in the above. As an example, a method of identifying whether the actual instantaneous data rate satisfies the UE capability may be calculated based on Equation 2 for example. In Equation 2 above, the left side of the inequality may denote the instantaneous data rate of scheduled data, and DataRateCC (which can be determined according to the UE capability) on the right side thereof may denote the maximum data rate in the corresponding serving cell of the terminal. The DataRateCC of the right side may have a value determined depending on whether the scheduling is for transmission/reception to/from a base station, such as PDSCH or PUSCH, or for transmission/reception to/from a terminal, such as PSSCH.

As an example, another method of identifying whether the actual instantaneous data rate satisfies the UE capability may be calculated based on Equation 4 above. In Equation 4 below, the left side of the inequality may denote the instantaneous data rate of data transmitted from J serving cells upon scheduling, and the DataRate on the right side thereof may denote the maximum data rate in the J serving cells configured in the terminal according to the UE capability. The DataRate on the right side may be a value determined depending on whether the scheduling is for transmission/reception to/from a base station, such as PDSCH or PUSCH, or for transmission/reception to/from a terminal, such as PSSCH.

In the above, Equation 4 may serve as a condition applied to all cases including initial transmission and retransmission, and Equation 2 may serve as a condition applied to retransmission. However, Equation 2 or 4 is only an example of a condition of limiting scheduling, and is not limited to the scope of the disclosure.

With respect to all cases in which the base station schedules retransmission of a specific TB for the terminal, for example, if scheduling is limited so as to satisfy the condition of Equation 2, retransmission may not be scheduled in many cases. In the above, "scheduling of retransmission of a specific TB" for a terminal by a base station or another terminal may denote a condition of "when MCS, which is indicated by an indicator included in DCI or SCI, is greater than 27" in a case where MCS table 2 is configured, or the condition of "when MCS is greater than 28" when a configuration other than MCS table 2 is established. Details thereof are the same as those described in the above.

Alternatively, more specifically, a case in which the $I_{MCS}$ value for at least one TB in the DCI is greater than a specific value (W=27 or 28) may be assumed or considered to be retransmission. In the above, a specific value for comparison with $I_{MCS}$ may be determined to be 27 or 28 according to the configuration relating to an MCS table to be used.

For example, the specific value W may be determined according to a mcs-Table-SL value or a higher layer parameter mcs-Table value included in a configuration related to PDSCH transmission, PUSCH transmission, PSSCH transmission or reception, or SPS transmission. For example, when "256-QAM" is configured, the specific value may be 27, and in the other cases, the specific value may be 28.

The specific value W may differ depending on a table, which is determined among MCS table 1, MCS table 2, and MCS table 3, used for scheduling for data transmission.

For example, if a subcarrier spacing of 120 kHz is used for 2-layer transmission based on 64 QAM in a frequency band of 100 MHz, and if a base station or a terminal has initially transmitted one TB to another terminal by using a PDSCH through 7 symbols based on MCS 26, then the base station or the terminal may fail to perform retransmission through the same 7 symbols. This is because a specific terminal may not be able to process scheduling in which the condition of Equation 2 is not satisfied.

Therefore, when retransmission is being performed, a case where the base station and the terminal consider the scheduling limiting condition (e.g., Equation 2) in determining a subsequent operation may be limited as specific cases. Meanwhile, in the following, Equation 2 is described as an example of scheduling limiting condition, but the embodiment of the disclosure is not limited thereto.

As an example, when scheduling retransmission of a specific TB, a method enabling the condition of Equation 2 to be applied only when the number of symbols L, to which the PDSCH or PSSCH used for retransmission is mapped, is less than the number of symbols L', to which the PDSCH or PSSCH used for initial transmission is mapped, can be used. That is, the condition of Equation 2 may not be applied when the number of symbols L to which the PDSCH or PSSCH used for retransmission is mapped is greater than or equal to the number of symbols L' to which the PDSCH or PSSCH used for initial transmission is mapped.

In the current and subsequent embodiments, when determining the number of symbols used for PDSCH or PSSCH mapping, a demodulation reference signal (DMRS) symbol for the PDSCH or PSSCH may also be included in a symbol used for PDSCH or PSSCH transmission. That is, in order to determine the number of symbols, all of DCI or SCI indicating PDSCH or PSSCH mapping information and symbols used for PDSCH or PSSCH transmission, transmitted via higher layer signaling, may be considered. Likewise to the case of PUSCH, a DMRS symbol for PUSCH may be determined to be included in a symbol used for PUSCH transmission.

Accordingly, when retransmission is performed or when the $I_{MCS}$ value for at least one TB in DCI or SCI is greater than a specific value (W=27 or 28), the scheduling limiting condition given by Equation 2 may be considered only in a case where the PDSCH or PSSCH for retransmission is mapped to a symbol, the number of which is less than a symbol to which the PDSCH or PSSCH used for initial transmission is mapped, and transmitted. This is because, in many cases, the base station performs the initial transmission and the retransmission by using the same number of symbols, and thus the complexity of the base station scheduling algorithm and implementation method can be reduced.

Besides the embodiment in which the scheduling limiting condition (that is, Equation 2) is applied based on whether or not the retransmission occurs and the number of symbols of the PDSCH or PSSCH, Equation 2 may serve as a condition applied to other cases. As an example, when the terminal reports the capability of fast processing time, when higher parameters of Capability2-PDSCH-Processing are configured, or when processingType2Enabled in the higher parameter set of PDSCH-ServingCellConfig (or PUSCH-ServingCellConfig) is configured as "TRUE", Equation 2 above may also be applied. In the above, applying of Equation 2 may indicate that the condition of Equation 2 is identified, and thus only in a case where scheduling satisfies Equation 2, data transmission/reception is enabled based on the scheduling.

Sixth Embodiment

The current embodiment relates to a method and apparatus for scheduling and receiving data so as not to exceed a maximum data rate of a terminal in performing data transmission or retransmission.

When a terminal accesses a base station, the UE capability may be reported to the base station, and the UE capability may include at least one of parameters capable of calculating the maximum data rate of the terminal, such as the maximum number of layers that the terminal can support, the maximum modulation order, and the like.

The maximum data rate of the terminal may be calculated, for example, as given in Equation 1, based on the UE capability reported to the base station and parameters configured in the terminal by the base station via RRC signaling. The maximum data rate of the terminal may be determined based on the baseband processing or signal processing capability of the corresponding terminal, including channel estimation, equalization, channel code decoding, and multi-antenna reception. That is, if a terminal has a high maximum data rate, it can be considered that the terminal has a high signal processing capability. The terminal may calculate a "maximum data rate" for communication with the base station and a "maximum data rate" for communication with the terminal, respectively. Different values may be used for at least one parameter used when calculating the "maximum data rate" depending on the communication counterpart. The parameter may include a parameter at least such as $OH^{(j)}$.

The terminal may receive downlink control information or sidelink control information including scheduling information, may identify the scheduling information, and may calculate the actual instantaneous data rate by using at least one of the following methods.

The terminal may be aware of the amount of data to be transmitted/received or a TBS value based on the scheduling information, and may also identify the number of symbols to which the PDSCH, PUSCH or PSSCH is mapped.

If the actual data rate calculated based on the information scheduled for the terminal is greater than the maximum data rate of the corresponding terminal, the terminal may not be able to complete signal processing required for transmitting and receiving the scheduled data within a predetermined time. Therefore, the base station may need to schedule the actual instantaneous data rate to be smaller than the maximum data rate of the corresponding terminal. This is because when scheduling is performed so that the actual instantaneous data rate is greater than the maximum data rate of the terminal, the terminal does not complete signal processing within a predetermined time, and thus the frequency time resource is used inefficiently.

Scheduling and data transmission/reception methods may differ according to the method of calculating the actual instantaneous data rate in the above. As an example, a method of identifying whether the actual instantaneous data rate satisfies the UE capability may be calculated based on Equation 2 for example. In Equation 2 above, the left side of the inequality may denote the instantaneous data rate of scheduled data, and DataRateCC (which can be determined according to the UE capability) on the right side thereof may denote the maximum data rate in the corresponding serving cell of the terminal. The DataRateCC of the right side may have a value determined depending on whether the scheduling is for transmission/reception to/from a base station, such as PDSCH or PUSCH, or for transmission/reception to/from a terminal, such as PSSCH.

As an example, another method of identifying whether the actual instantaneous data rate satisfies the UE capability may be calculated based on Equation 4 above. In Equation 4 below, the left side of the inequality may denote the instantaneous data rate of data transmitted from J serving cells upon scheduling, and the DataRate on the right side thereof may denote the maximum data rate in the J serving cells configured in the terminal according to the UE capability. The DataRate on the right side may be a value determined depending on whether the scheduling is for transmission/reception to/from a base station, such as PDSCH or PUSCH, or for transmission/reception to/from a terminal, such as PSSCH.

In the above, Equation 4 may serve as a condition applied to all cases including initial transmission and retransmission, and Equation 2 may serve as a condition applied to retransmission. However, Equation 2 or 4 is only an example of a condition of limiting scheduling, and is not limited to the scope of the disclosure.

For all cases in which the base station schedules retransmission of a specific TB for the terminal, for example, if scheduling is limited so as to satisfy the condition of Equation 2, retransmission may not be scheduled in many cases. In the above, "scheduling of retransmission of a specific TB" for a terminal by a base station or another terminal may denote a condition of "when MCS, which is indicated by an indicator included in DCI or SCI, is greater than 27" when MCS table 2 is configured, or the condition of "when MCS is greater than 28" when a configuration other than MCS table 2 is established. Details thereof are the same as those described in the above.

Alternatively, more specifically, a case in which the $I_{MCS}$ value for at least one TB in the DCI or SCI is greater than a specific value (W=27 or 28) may be assumed or considered to be retransmission. In the above, a specific value for comparison with $I_{MCS}$ may be determined to be 27 or 28 according to the configuration relating to an MCS table to be used.

For example, the specific value W may be determined according to a mcs-Table-SL value or a higher layer parameter mcs-Table value included in a configuration related to PDSCH transmission, PUSCH transmission, PSSCH transmission or reception, or SPS transmission. For example, when "256-QAM" transmission is configured, the specific value may be 27, and in the other cases, the specific value may be 28.

For example, if a subcarrier spacing of 120 kHz is used for 2-layer transmission based on 64 QAM in a frequency band of 100 MHz, and if a base station or a terminal has initially transmitted one TB to another terminal by using a PDSCH through 7 symbols based on MCS 26, the base station or the terminal may fail to perform retransmission through the same 7 symbols. This is because a specific terminal may not be able to process scheduling in which the condition of Equation 2 is not satisfied.

Therefore, when retransmission is being performed, a case where the base station and the terminal consider the scheduling limiting condition (e.g., Equation 2) in determining a subsequent operation may be limited as specific cases. Meanwhile, in the following, Equation 2 is described as an example of scheduling limiting condition, but the embodiment of the disclosure is not limited thereto.

As an example, when scheduling retransmission of a specific TB, a method enabling the condition of Equation 2 to be applied only when the number of symbols L, to which the PDSCH or PSSCH used for retransmission is mapped, is less than the number of symbols L', to which the PDSCH or PSSCH used for initial transmission is mapped, and less than 7, can be used. That is, the condition of Equation 2 may not be applied when the number of symbols L, to which the PDSCH or PSSCH used for retransmission is mapped, is equal to or greater than the number of symbols L', to which the PDSCH or PSSCH used for initial transmission is mapped, or when the number of symbols L, to which the PDSCH or PSSCH used for retransmission is mapped, is equal to or greater than 7.

As another example, when scheduling retransmission of a specific TB, a method enabling the condition of Equation 2 to be applied only when the number of symbols L, to which the PDSCH or PSSCH used for retransmission is mapped, is less than a smaller value between the number of symbols L', to which the PDSCH or PSSCH used for initial transmission is mapped, and 7, can be used. That is, the condition of Equation 2 may be applied when the number of symbols L, to which the PDSCH or PSSCH used for retransmission is mapped, is less than min (L', 7).

In the current and subsequent embodiments, when determining the number of symbols used for PDSCH or PSSCH mapping, a demodulation reference signal (DMRS) symbol for the PDSCH or PSSCH may also be included in a symbol used for PDSCH or PSSCH mapping. That is, in order to determine the number of symbols, all of DCI or SCI indicating PDSCH or PSSCH mapping information and symbols used for PDSCH or PSSCH transmission, transmitted via higher layer signaling, may be considered. Likewise to the case of PUSCH, a DMRS symbol for PUSCH may be determined to be included in a symbol used for PUSCH mapping.

Accordingly, when retransmission is performed or when the $I_{MCS}$ value for at least one TB in DCI or SCI is greater than a specific value (W=27 or 28), the scheduling limiting condition given by Equation 2 may be considered only in a case where the PDSCH or PSSCH for retransmission is mapped to a symbol, the number of which is less than a symbol to which the PDSCH or PSSCH used for initial transmission is mapped, and transmitted. This is because the complexity of the base station scheduling algorithm and implementation method can be reduced by the method proposed in the embodiment, based on the fact that the base station performs initial transmission and retransmission by using the same number of symbols in many cases, and that scheduling with a large TBS occurs frequently if the case of more than 7 symbols.

Besides the embodiment in which the scheduling limiting condition (that is, Equation 2) is applied based on whether or not the retransmission occurs and the number of symbols of the PDSCH or PSSCH, Equation 2 may serve as a condition applied to other cases. As an example, when the terminal reports the capability of fast processing time, when higher parameters of Capability2-PDSCH-Processing are configured, or when processingType2Enabled in the higher parameter set of PDSCH-ServingCellConfig (or PUSCH-ServingCellConfig) is configured as "TRUE", Equation 2 above may also be applied. In the above, applying of Equation 2 may indicate that the condition of Equation 2 is identified, and thus only in a case where scheduling satisfies Equation 2, data transmission/reception is enabled based on the scheduling.

Seventh Embodiment

The current embodiment relates to a method and apparatus for scheduling and receiving data so as not to exceed a maximum data rate of a terminal in performing data transmission or retransmission.

When a terminal accesses a base station, the UE capability may be reported to the base station, and the UE capability may include at least one of parameters capable of calculating the maximum data rate of the terminal, such as the maximum number of layers that the terminal can support, the maximum modulation order, and the like.

The maximum data rate of the terminal may be calculated, for example, as given in Equation 1, based on the UE capability reported to the base station and parameters configured in the terminal by the base station via RRC signaling. The maximum data rate of the terminal may be determined based on the baseband processing or signal processing capability of the corresponding terminal, including channel estimation, equalization, channel code decoding, and multi-antenna reception. That is, if a terminal has a high maximum data rate, it can be considered that the terminal has a high signal processing capability. The terminal may calculate a "maximum data rate" for communication with the base station and a "maximum data rate" for communication with the terminal, respectively. Different values may be used for at least one parameter used when calculating the "maximum data rate" depending on the communication counterpart. The parameter may include a parameter at least such as $OH^{(j)}$.

The terminal may receive downlink control information or sidelink control information including scheduling information, may identify the scheduling information, and may calculate the actual instantaneous data rate by using at least one of the following methods.

The terminal may aware the amount of data to be transmitted/received or a TBS value based on the scheduling information, and may also identify the number of symbols to which the PDSCH, PUSCH or PSSCH is mapped.

If the actual data rate calculated based on the information scheduled for the terminal is greater than the maximum data rate of the corresponding terminal, the terminal may not be able to complete signal processing required for transmitting and receiving the scheduled data within a predetermined time. Therefore, the base station may need to schedule the actual instantaneous data rate to be smaller than the maximum data rate of the corresponding terminal. This is because when scheduling is performed so that the actual instantaneous data rate is greater than the maximum data rate of the terminal, the terminal does not complete signal processing within a predetermined time, and thus the frequency time resource is used inefficiently.

Scheduling and data transmission/reception methods may differ according to the method of calculating the actual instantaneous data rate in the above. As an example, a method of identifying whether the actual instantaneous data rate satisfies the UE capability may be calculated based on Equation 2 for example. In Equation 2 above, the left side of the inequality may denote the instantaneous data rate of scheduled data, and DataRateCC (which can be determined according to the UE capability) on the right side thereof may denote the maximum data rate in the corresponding serving cell of the terminal. The DataRateCC of the right side may have a value determined depending on whether the scheduling is for transmission/reception to/from a base station, such as PDSCH or PUSCH, or for transmission/reception to/from a terminal, such as PSSCH.

As an example, another method of identifying whether the actual instantaneous data rate satisfies the UE capability may be calculated based on Equation 4 above. In Equation 4 below, the left side of the inequality may denote the instantaneous data rate of data transmitted from J serving cells upon scheduling, and the DataRate on the right side thereof may denote the maximum data rate in the J serving cells configured in the terminal according to the UE capability. The DataRate on the right side may be a value determined depending on whether the scheduling is for transmission/reception to/from a base station, such as PDSCH or PUSCH, or for transmission/reception to/from a terminal, such as PSSCH.

In the above, Equation 4 may serve as a condition applied to all cases including initial transmission and retransmission, and Equation 2 may serve as a condition applied to retransmission. However, Equation 2 or 4 is only an example of a condition of limiting scheduling, and is not limited to the scope of the disclosure.

For all cases in which the base station schedules retransmission of a specific TB for the terminal, for example, if scheduling is limited so as to satisfy the condition of Equation 2, retransmission may not be scheduled in many cases. In the above, "scheduling of retransmission of a specific TB" for a terminal by a base station or another terminal may denote a condition of "when MCS, which is indicated by an indicator included in DCI or SCI, is greater than 27" when MCS table 2 is configured, or the condition of "when MCS is greater than 28" when a configuration other than MCS table 2 is established. Details thereof are the same as those described in the above.

Alternatively, more specifically, a case in which the $I_{MCS}$ value for at least one TB in the DCI or SCI is greater than a specific value (W=27 or 28) may be assumed or considered to be retransmission. In the above, a specific value for comparison with $I_{MCS}$ may be determined to be 27 or 28 according to the configuration relating to an MCS table to be used.

For example, the specific value W may be determined according to a mcs-Table-SL value or a higher layer parameter mcs-Table value included in a configuration related to PDSCH transmission, PUSCH transmission, PSSCH transmission or reception, or SPS transmission. For example, when "256-QAM" transmission is configured, the specific value may be 27, and in the other cases, the specific value may be 28.

For example, if a subcarrier spacing of 120 kHz is used for 2-layer transmission based on 64 QAM in a frequency band of 100 MHz, and if a base station or a terminal has initially transmitted one TB to another terminal by using a PDSCH or PSSCH through 7 symbols based on MCS 26, then the base station or the terminal may fail to perform retransmission through the same 7 symbols. This is because a specific terminal may not be able to process scheduling in which the condition of Equation 2 is not satisfied.

Therefore, when retransmission is being performed, a case where the base station and the terminal consider the scheduling limiting condition (e.g., Equation 2) in determining a subsequent operation may be limited as specific cases. Meanwhile, in the following, Equation 2 is described as an example of scheduling limiting condition, but the embodiment of the disclosure is not limited thereto.

As an example, when scheduling retransmission of a specific TB, a method enabling the condition of Equation 2 to be applied only when the number of symbols L, to which the PDSCH or PSSCH used for retransmission is mapped, is less than L'-x with respect to the number of symbols L', to which the PDSCH or PSSCH used for initial transmission is mapped, can be used. That is, the condition of Equation 2 may not be applied when the number of symbols L, to which the PDSCH or PSSCH used for retransmission is mapped, is greater than or equal to the number of symbols L'-x to which the PDSCH or PSSCH used for initial transmission is mapped.

In the above, the x value may be applied as a fixed value such as 2 or 3, but may be a value separately configured by the base station via higher layer signaling. For example, when the x value is configured to be 2 or is predetermined, the number of symbols L, to which the PDSCH or PSSCH used for retransmission is mapped, is less than L'−2 with respect to the number of symbols L', to which the PDSCH or PSSCH used for initial transmission is mapped, the condition of Equation 2 can be applied.

In the current and subsequent embodiments, when determining the number of symbols used for PDSCH or PSSCH mapping, a demodulation reference signal (DMRS) symbol for the PDSCH or PSSCH may also be included in the number of symbols used for PDSCH or PSSCH mapping. That is, in order to determine the number of symbols, all of DCI or SCI indicating PDSCH or PSSCH mapping information and symbols used for PDSCH or PSSCH transmission, transmitted via higher layer signaling, may be considered. Likewise to the case of PUSCH, a DMRS symbol for PUSCH may be determined to be included in a symbol used for PUSCH mapping.

Accordingly, when retransmission is performed or when the $I_{MCS}$ value for at least one TB in DCI or SCI is greater than a specific value (W=27 or 28), the scheduling limiting condition given by Equation 2 may be considered only in a case where the PDSCH or PSSCH for retransmission is mapped to a symbol, the number of which is less than a symbol to which the PDSCH or PSSCH used for initial transmission is mapped, and transmitted. There are many cases in which the base station performs the initial transmission and the retransmission by using the same number of symbols, or performs retransmission using a symbol, the number of which is less than 2. Based on the above cases, the complexity of the base station scheduling algorithm and implementation method can be reduced by the method proposed in the embodiment.

Besides the embodiment in which the scheduling limiting condition (that is, Equation 2) is applied based on whether or not the retransmission occurs and the number of symbols of the PDSCH or PSSCH, Equation 2 may serve as a condition applied to other cases. As an example, when the terminal reports the capability of fast processing time, when higher parameters of Capability2-PDSCH-Processing are configured, or when processingType2Enabled in the higher parameter set of PDSCH-ServingCellConfig (or PUSCH-ServingCellConfig) is configured as "TRUE", Equation 2 above may also be applied. In the above, applying of Equation 2 may indicate that data transmission/reception is enabled based on scheduling only in a case where the scheduling satisfies Equation 2 by identifying the condition of Equation 2.

Hereinafter, the operation of a terminal will be described.

The terminal may identify a condition for determining a subsequent operation method through DCI or SCI transmitted through the PDCCH.

According to an embodiment, as a result of identifying DCI or SCI, the condition of Equation 5 below may be used to determine a subsequent operation method when initial transmission is performed.

$$\sum_{j=0}^{J-1} \frac{\sum_{m=0}^{M-1} V_{j,m}}{T_{slot}^{\mu(j)}} \leq \text{Data Rate} \qquad \text{Equation 5}$$

According to an embodiment, when the $I_{MCS}$ value for at least one TB in DCI or SCI is greater than a specific value (W=27 or 28), the terminal may use the instantaneous data rate condition of Equation 2 in order to determine a subsequent operation method. In the disclosure, the instantaneous data rate condition may be used in the same manner as the scheduling limiting condition described above.

In the above and the following embodiments, a specific value for comparison with $I_{MCS}$ may be determined to be 27 or 28 according to a configuration relating to an MCS table to be used. For example, the specific value may be determined according to a mcs-Table-SL value or a higher layer parameter mcs-Table value included in a configuration related to PDSCH transmission, PUSCH transmission, PSSCH transmission or reception, or SPS transmission. For example, when "256-QAM" transmission is configured, the specific value may be 27, and in the other cases, the specific value may be 28.

For a reception terminal, in the above, J may be a total number of PSSCHs received by a terminal in one slot.

In the sidelink operation, the reception terminal may select J so that Equation 5 is satisfied, and may select J PSSCHs from all the received PSSCHs in the descending order of priority (that is, PSSCHs having higher QoSs first). If PSSCHs have the same QoS, the selection may be randomly determined. Alternatively, the selection of J PSSCHs may be determined in the ascending order of PRB index.

According to an embodiment, whether the instantaneous data rate condition of Equation 2 is to be used may be determined according to the length of the number of symbols L of the PDSCH or PSSCH for retransmission, scheduled by DCI or SCI, and/or according to a result of comparison between the number of symbols L of the PDSCH or PSSCH for retransmission and the number of symbols L' of the PDSCH or PSSCH for initial transmission.

According to an embodiment, in a case where the number of symbols L of the PDSCH or PSSCH for retransmission, scheduled by DCI or SCI is less than a specific number (for example, L<7), and the $I_{MCS}$ value for at least one TB in the DCI or SCI is greater than a specific value (W=27 or 28), the terminal may utilize the instantaneous data rate condition of Equation 2 in order to determine a subsequent operation method. In a case where the number of symbols L of the PDSCH or PSSCH for retransmission is equal to or greater than a specific number (for example, L>=7), and the $I_{MCS}$ value for at least one TB in the DCI or SCI is greater than a specific value (W=27 or 28), the terminal may process the scheduled PDSCH or PSSCH without identifying whether the instantaneous data rate condition of Equation 2 is satisfied.

According to an embodiment, in a case where the number of symbols L of the PDSCH or PSSCH for retransmission, scheduled by DCI or SCI is less than the number of symbols L' of the PDSCH or PSSCH for initial transmission (for example, L<L'), and the $I_{MCS}$ value for at least one TB in the DCI or SCI is greater than a specific value (W=27 or 28), the terminal may utilize the instantaneous data rate condition of Equation 2 in order to determine a subsequent operation method. In a case where the number of symbols L of the PDSCH or PSSCH for retransmission is equal to or greater than the number of symbols L' of the PDSCH or PSSCH for initial transmission (that is, L>=L'), and the $I_{MCS}$ value for at least one TB in DCI or SCI is greater than a specific value (W=27 or 28), the terminal may process the scheduled PDSCH or PSSCH without identifying whether the instantaneous data rate condition of Equation 2 is satisfied.

According to an embodiment, in a case where the number of symbols L of the PDSCH or PSSCH for retransmission, scheduled by DCI or SCI is less than the number of symbols L' of the PDSCH or PSSCH for initial transmission and a specific number (for example, 7) (that is, L<7 and L<L'), and the $I_{MCS}$ value for at least one TB in the DCI or SCI is greater than a specific value (W=27 or 28), the terminal may utilize the instantaneous data rate condition of Equation 2 in order to determine a subsequent operation method. In a case where the number of symbols L of the PDSCH or PSSCH for retransmission is equal to or greater than an initial specific number or the number of symbols L' of the PDSCH or PSSCH for initial transmission (that is, L>=7 or L>=L'), and the $I_{MCS}$ value for at least one TB in DCI or SCI is greater than a specific value (W=27 or 28), the terminal may process the scheduled PDSCH or PSSCH without identifying whether the instantaneous data rate condition of Equation 2 is satisfied.

According to an embodiment, in a case where the number of symbols L of the PDSCH or PSSCH for retransmission, scheduled by DCI or SCI is less than the minimum value of the number of symbols L' of the PDSCH or PSSCH for initial transmission and a specific number (for example, 7) (that is, L<min(7, L')), and the $I_{MCS}$ value for at least one TB in the DCI or SCI is greater than a specific value (W=27 or 28), the terminal may utilize the instantaneous data rate condition of Equation 2 in order to determine a subsequent operation method. In a case where the number of symbols L of the PDSCH or PSSCH for retransmission is equal to or greater than the minimum value of the number of symbols L' of the PDSCH or PSSCH for initial transmission and a specific number (for example, 7) (that is, L>=min(7, U)), and the $I_{MCS}$ value for at least one TB in DCI or SCI is greater than a specific value (W=27 or 28), the terminal may process the scheduled PDSCH or PSSCH without identifying whether the instantaneous data rate condition of Equation 2 is satisfied.

According to an embodiment, in a case where the number of symbols L of the PDSCH or PSSCH for retransmission, scheduled by DCI or SCI is less than a difference between the number of symbols L' of the PDSCH or PSSCH for initial transmission and a specific symbol number x (that is, L<L'−x)), and the $I_{MCS}$ value for at least one TB in the DCI or SCI is greater than a specific value (W=27 or 28), the terminal may utilize the instantaneous data rate condition of Equation 2 in order to determine a subsequent operation method. In a case where the number of symbols L of the PDSCH or PSSCH for retransmission is equal to or greater than a difference between the number of symbols L' of the PDSCH or PSSCH for initial transmission and a specific symbol number x (that is, L>=L'−x)), and the $I_{MCS}$ value for at least one TB in DCI or SCI is greater than a specific value (W=27 or 28), the terminal may process the scheduled PDSCH or PSSCH without identifying whether the instantaneous data rate condition of Equation 2 is satisfied. The x value may be applied as a fixed value such as 2 or 3. Alternatively, the x value may be a value separately configured by the base station via higher layer signaling.

According to an embodiment, the terminal may determine the number of symbols L of the PDSCH or PSSCH for retransmission scheduled by DCI or SCI, by including punctured symbols.

According to an embodiment, the terminal may determine the number of symbols L of the PDSCH or PSSCH for retransmission scheduled by DCI or SCI by excluding punctured symbols.

The above embodiments can be applied to the PUSCH in the same manner. The above embodiments can be applied to the physical sidelink shared channel (PSSCH) in the same manner.

Eighth Embodiment

Figure 14:
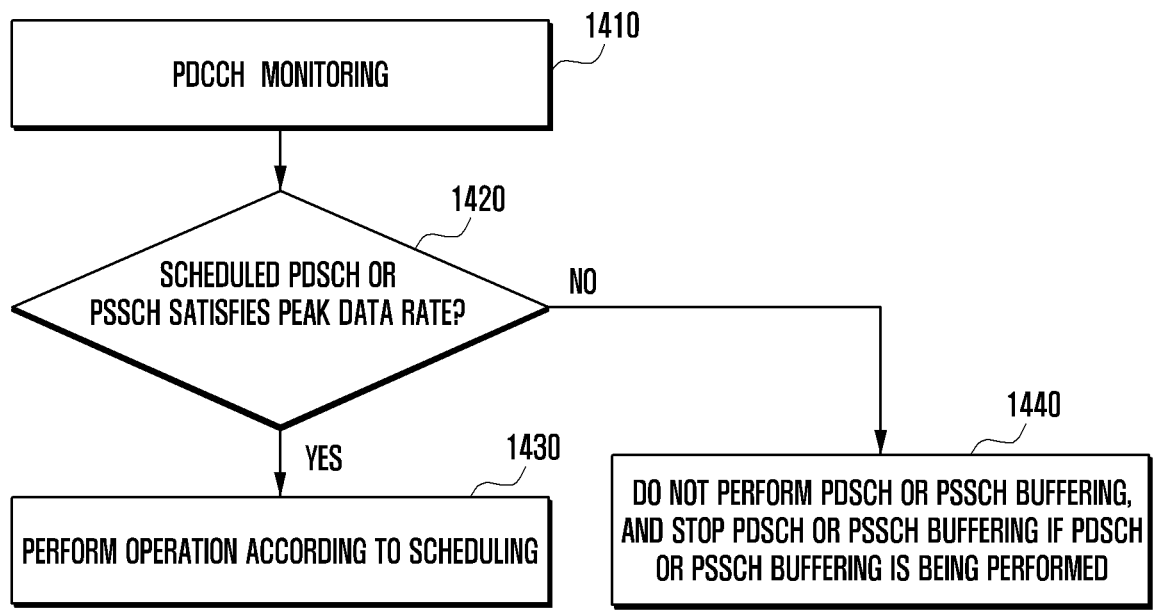
FIG. 14 illustrates a terminal operation for downlink reception or sidelink transmission/reception according to an embodiment of the disclosure.

FIG. 14 illustrates a terminal operation for downlink reception or sidelink transmission/reception according to an embodiment of the disclosure.

Referring to FIG. 14, the terminal may perform monitoring of a PDCCH (or PSCCH, which is equally applicable in the case of FIGS. 14 to 20B below) in a predetermined resource (operation 1410).

The terminal decodes DCI transmitted from a base station through the PDCCH (or SCI transmitted from another terminal through the PSCCH, hereinafter which is equally applicable in the case of FIGS. 14 to 20B), and may identify whether the instantaneous data rate condition is satisfied. If it is necessary to identify whether the instantaneous data rate condition is satisfied, the terminal may identify whether the PDSCH or PSSCH scheduled by the corresponding DCI satisfies the instantaneous data rate condition described above (operation 1420).

If the instantaneous data rate condition is satisfied, the terminal may perform an operation of receiving a scheduled PDSCH or transmitting and receiving a PSSCH (operation 1430).

If the instantaneous data rate condition is not satisfied, the terminal may not perform an operation of receiving the scheduled PDSCH or an operation of transmitting and receiving the PSSCH (operation 1440). The terminal may stop buffering the PDSCH or PSSCH or may not perform the buffering operation of the PDSCH or PSSCH. Although not shown, in the case of a terminal transmitting a PSSCH, when the instantaneous data rate condition is not satisfied, the generation of the PSSCH may be stopped or the generation operation may not be performed.

Ninth Embodiment

Figure 15:
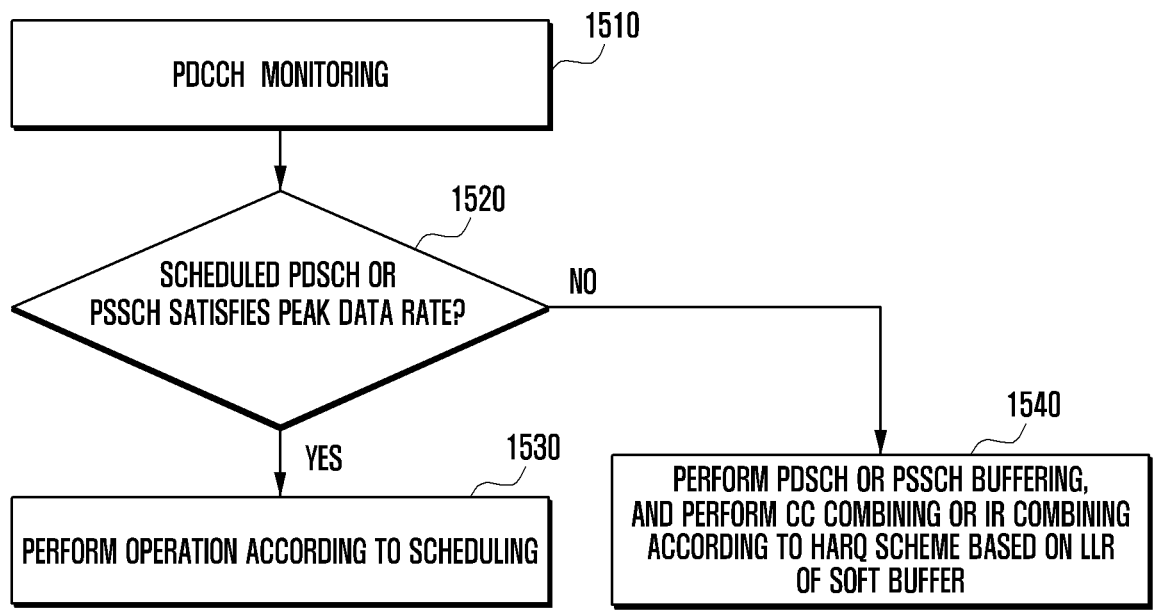
FIG. 15 is another diagram illustrating a terminal operation for downlink reception or sidelink transmission/reception according to an embodiment of the disclosure.

FIG. 15 is another diagram illustrating a terminal operation for downlink reception or sidelink transmission/reception according to an embodiment of the disclosure.

Referring to FIG. 15, the terminal may perform PDCCH monitoring in a predetermined resource (operation 1510).

The terminal decodes the DCI transmitted from the base station through the PDCCH, and may identify whether it is necessary to identify whether the instantaneous data rate condition described above is satisfied. If it is necessary to identify whether the instantaneous data rate condition is satisfied, the terminal may identify whether the PDSCH or PSSCH scheduled by the corresponding DCI satisfies the instantaneous data rate condition described above (operation 1520).

If the instantaneous data rate condition is satisfied, the terminal may perform an operation of receiving a scheduled PDSCH or transmitting and receiving a PSSCH (operation 1530).

If the instantaneous data rate condition is not satisfied, the terminal may perform the PDSCH or PSSCH buffering (i.e., storing an information value of the PDSCH or PSSCH in a buffer), and if the PDSCH or PSSCH corresponds to retransmission, the terminal may perform chase combining (CC) or incremental redundancy (IR) combining based on log likelihood ratio (LLR) information stored in a soft buffer and corresponding to the PDSCH or PSSCH, according to an HARQ scheme (operation 1540). When an SNR or energy of a value of a result of buffering or combining satisfies a specific condition, the terminal may start a decoding process. Alternatively, the terminal may start the decoding process after performing the combining more than a predetermined number of times, that is, after receiving data retransmission more than a predetermined number of times.

Tenth Example

Figure 16:
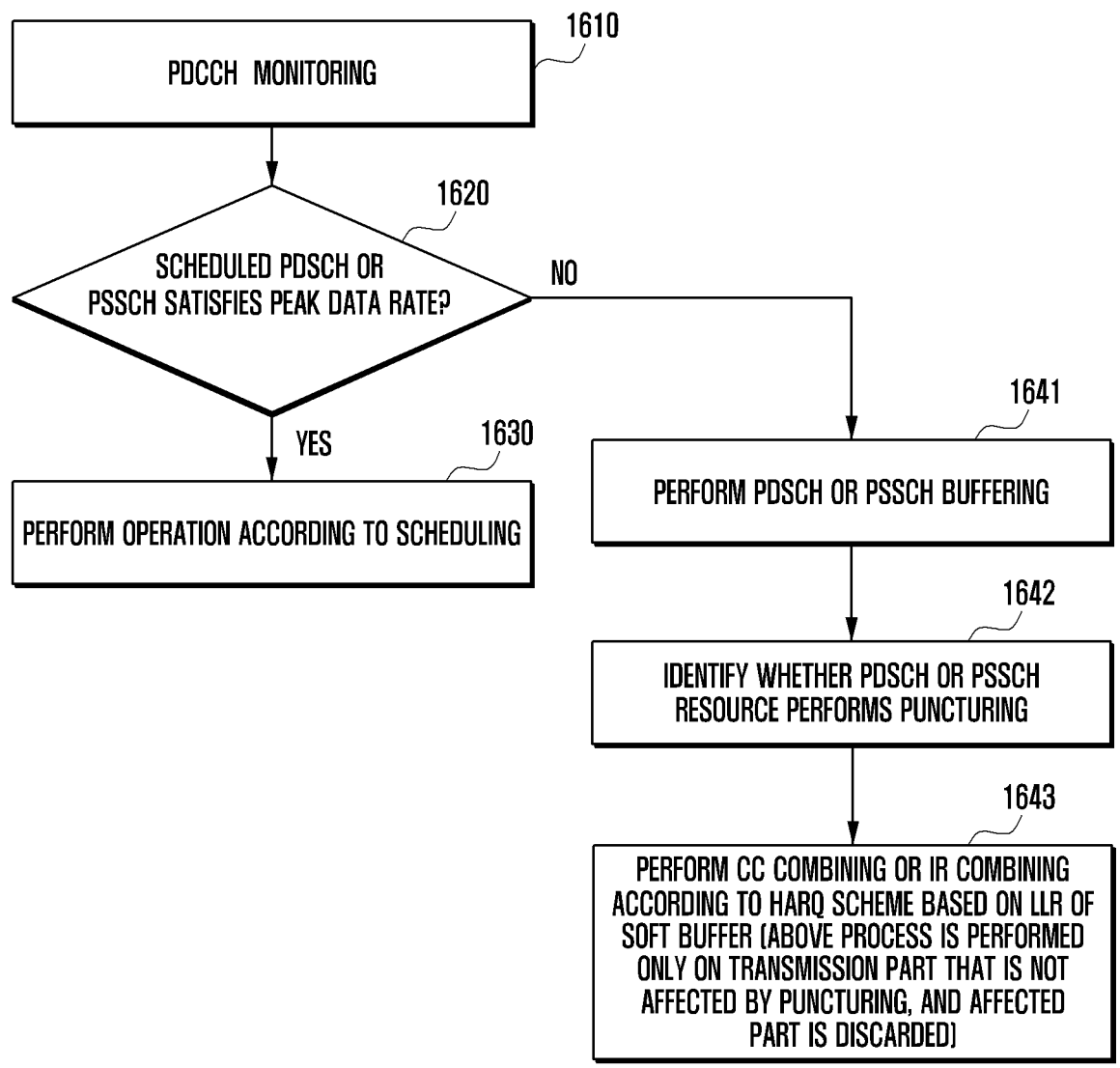
FIG. 16 is another diagram illustrating a terminal operation for downlink reception or sidelink transmission/reception according to an embodiment of the disclosure.

FIG. 16 is another diagram illustrating a terminal operation for downlink reception or sidelink transmission/reception according to an embodiment of the disclosure.

Referring to FIG. 16, the terminal may perform PDCCH monitoring in a predetermined resource or a configured resource (operation 1610).

The terminal decodes the DCI transmitted from the base station through the PDCCH, and may identify whether it is necessary to identify whether the instantaneous data rate condition is satisfied. If it is necessary to identify whether the instantaneous data rate condition is satisfied, the terminal may identify whether the PDSCH or PSSCH scheduled by the corresponding DCI satisfies the instantaneous data rate condition (operation 1620).

If the instantaneous data rate condition is satisfied, the terminal may perform an operation of receiving a scheduled PDSCH (operation 1630).

If the instantaneous data rate condition is not satisfied, the terminal may perform the PDSCH or PSSCH buffering (1641), and may identify whether the PDSCH or PSSCH resource is punctured (1642). For example, the terminal may receive configuration of at least one RNTI via RRC signaling, and a specific RNTI may be used to indicate whether a pre-allocated PDSCH or PSSCH resource is punctured. For example, such an RNTI may be INT-RNTI.

When the RNTI is configured, the terminal may store, in a soft buffer, only the LLR value of a data portion transmitted to the un-punctured resource, according to an HARQ scheme, and may perform CC combining or IR combining (operation 1643). The terminal may start the decoding process when the SNR or energy of the combined result value satisfies a specific condition. Alternatively, the terminal may start the decoding process after performing the combining more than a predetermined number of times, that is, after receiving the retransmission more than a predetermined number of times. The terminal does not consider (or discards) a value according to a signal transmitted from the punctured resource.

Eleventh Embodiment

Figure 17:
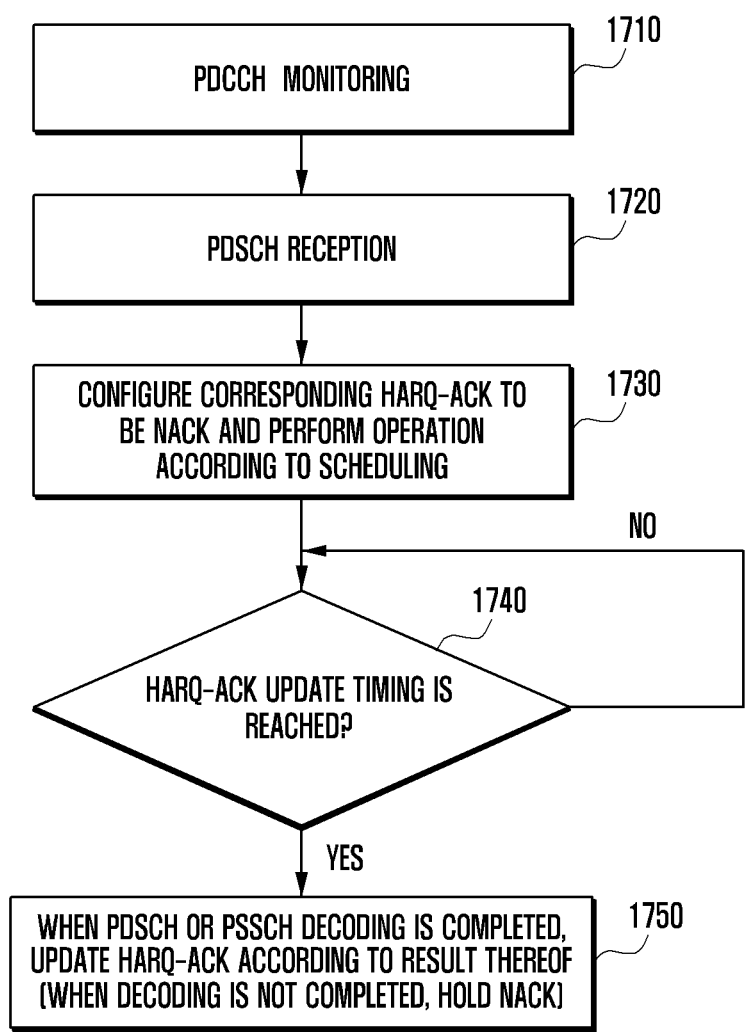
FIG. 17 is another diagram illustrating a terminal operation for downlink reception or PSSCH transmission and reception according to an embodiment of the disclosure.
Figure 18:
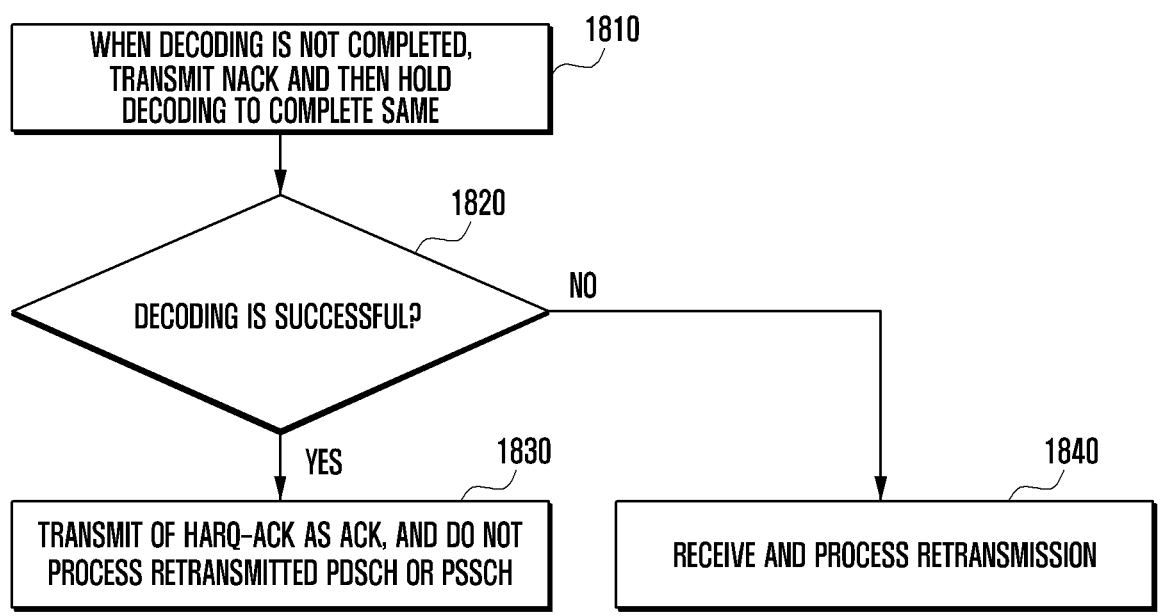
FIG. 18 is another diagram illustrating a terminal operation for downlink reception or PSSCH transmission and reception according to an embodiment of the disclosure.

FIG. 17 is still another diagram illustrating a terminal operation for downlink reception or PSSCH transmission/reception according to an embodiment of the disclosure, and FIG. 18 is still another diagram illustrating a terminal operation for downlink reception or PSSCH transmission/reception according to an embodiment of the disclosure.

Referring to FIG. 17, the terminal may perform PDCCH monitoring in a predetermined resource or a configured resource (operation 1710). The terminal may perform an operation of receiving a PDSCH or PSSCH scheduled through DCI transferred through the PDCCH without classification based on the length of the PDSCH or PSSCH and/or without identifying whether the instantaneous data rate condition is satisfied (operation 1720). In addition, the terminal may determine a resource (frequency and timing) in which HARQ-ACK information is to be transmitted through the transferred DCI.

The terminal may configure HARQ-ACK information corresponding to a corresponding PDSCH or PSSCH as NACK before PDSCH decoding (operation 1730).

In addition, the terminal may identify whether the HARQ-ACK update timing has arrived (operation 1740). The terminal may determine the HARQ-ACK update timing according to a position at which an HARQ-ACK transmission PUCCH resource is located on the time axis. For example, the HARQ-ACK update timing is a time point located a predetermined time before the start of the first symbol of the HARQ-ACK transmission PUCCH resource (e.g., PUCCH generation time for HARQ-ACK transmission, and this may be determined by the UE capability). The terminal may determine a deadline and determine whether the deadline has been reached.

When the HARQ-ACK update timing is reached, and if PDSCH or PSSCH decoding is completed, the terminal may update corresponding HARQ-ACK information based on a result thereof (operation 1750). For example, if the PDSCH or PSSCH decoding is successful, the terminal may update corresponding HARQ-ACK information as ACK. If the PDSCH or PSSCH decoding is completed before the HARQ-ACK information transmission timing and thus the HARQ-ACK information is updated, the terminal transmits the updated information as HARQ-ACK information, and if the PDSCH or PSSCH decoding is not completed until the HARQ-ACK transmission timing and thus the HARQ-ACK information is not updated, the terminal may transmit preconfigured HARQ-ACK information (i.e., NACK information).

Meanwhile, referring to FIG. 18, when the PDSCH or PSSCH decoding is not completed, the terminal may continue decoding although a transmission time of HARQ-ACK information has passed (operation 1810).

The terminal identifies whether the PDSCH or PSSCH decoding is successful (operation 1820), and if the decoding is successful, the terminal does not process data, retransmitted by a network through the PDSCH or retransmitted by another terminal through the PSSCH, and may transmit ACK in a HARQ-ACK information transmission resource which is newly designated (according to the DCI scheduling retransmission) (operation 1830). If decoding is not successful, the terminal may continue the decoding process after performing CC combining or IR combining according to a designated or determined HARQ scheme based on data, retransmitted by a network through the PDSCH or retransmitted by another terminal through the PSSCH (operation 1840).

According to another embodiment, the terminal may perform PDCCH monitoring in a predetermined resource or a configured resource.

The terminal decodes the DCI transmitted from the base station through the PDCCH, and may identify whether it is necessary to identify whether the instantaneous data rate condition is satisfied. If it is necessary to identify whether the instantaneous data rate condition is satisfied, the terminal may determine whether the PDSCH or PSSCH scheduled by the corresponding DCI satisfies the instantaneous data rate condition.

If the instantaneous data rate condition is satisfied, the terminal may perform an operation of receiving a scheduled PUSCH or PSSCH. Although not shown, when the instantaneous data rate condition is not satisfied, the terminal may not perform a preparation operation (for example, data preparation according to the HARQ scheme) for transmitting the scheduled PUSCH or PSSCH.

According to another embodiment, the terminal may perform PDCCH monitoring in a predetermined resource or a configured resource.

The terminal may perform a preparation operation (for example, at least one of data preparation, scrambling, modulation, etc. according to the HARQ scheme) for transmitting a PUSCH or PSSCH scheduled through DCI transferred through the PDCCH without classification according to the length of the PUSCH or PSSCH and/or without identifying whether the instantaneous data rate condition is satisfied.

The terminal may determine a resource (frequency and timing) at which a PUSCH or PSSCH is to be transmitted based on the DCI. Although not shown, when preparation for PUSCH or PSSCH transmission is completed before the PUSCH transmission timing, the terminal may perform PUSCH or PSSCH transmission on the scheduled PUSCH or PSSCH resource, and if not, the terminal may stop the PUSCH or PSSCH transmission preparation operation.

According to another embodiment, the base station may perform an operation for receiving the PUSCH in resources (frequency and timing) scheduled for the terminal through DCI transmitted through the PDCCH.

The base station may perform an operation of detecting the DMRS in the scheduled resource. If the DMRS is detected, the base station may continue an operation of receiving data of the PUSCH, and if the DMRS is not detected, the base station may not perform an operation of receiving the data of the PUSCH.

Twelfth Example

Figure 19:
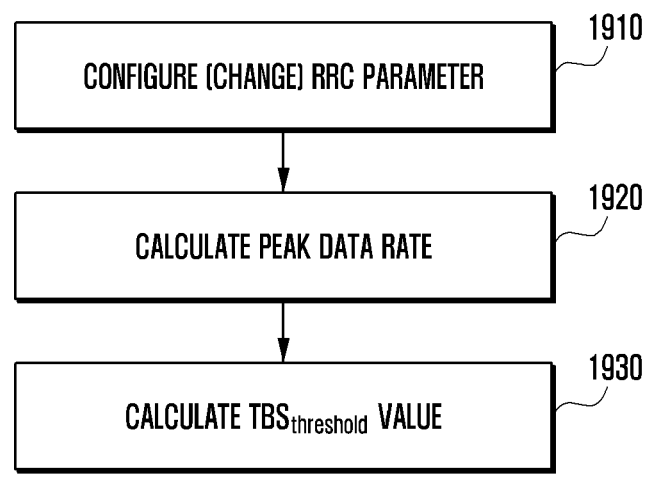
FIG. 19 is still another diagram illustrating an operation of a base station according to an embodiment of the disclosure.

FIG. 19 illustrates an operation of a base station according to an embodiment of the disclosure.

Referring to FIG. 19, a base station may determine at least one of a frequency band to be used, a bandwidth of a carrier to be used in the frequency band, and a subcarrier spacing to be used (operation 1910). In addition, the base station may determine, for each terminal, a higher layer parameter (e.g., an RRC parameter) related to an initially accessed terminal, a newly RRC-configured terminal, a terminal for which a change in the higher layer parameter has occurred, and a terminal for which UE capability exchange has occurred (for example, an RRC parameter).

The base station may calculate the maximum data rate for each terminal using the above parameters and Equation 1. The base station may calculate the maximum data rate according to a communication counterpart with which a terminal communicates, that is, whether the terminal transmits or receives data to or from the base station or the terminal transmits or receives data to or from another terminal (operation 1920).

In addition, the base station may calculate a $TBS_{threshold}$ value (operation 1930). Here, the $TBS_{threshold}$ may be calculated based on the size of a specific resource, for example, at least one of information related to a specific resource size, for example, the number of symbols with a specific length, and the like. An example of another parameter for calculating $TBS_{threshold}$ may be the number of symbols included in one slot.

Figure 20A:
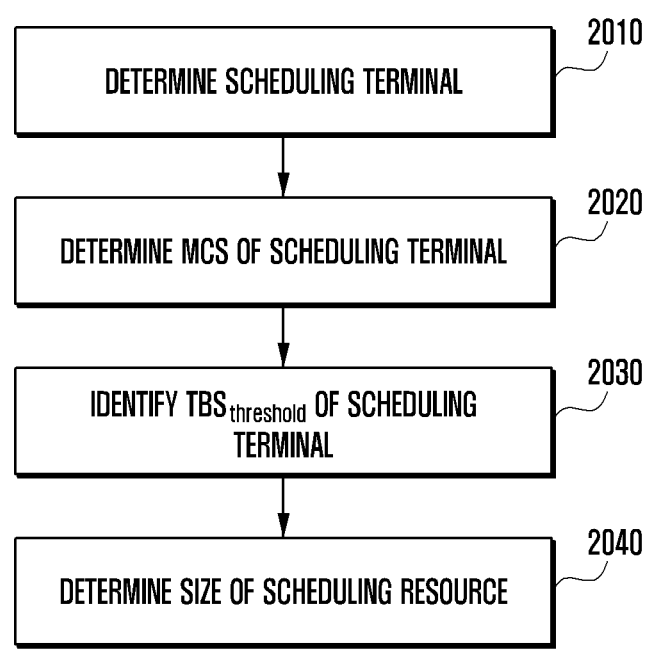
FIG. 20A is another diagram illustrating an operation of a base station according to an embodiment of the disclosure.

FIG. 20A is another diagram illustrating an operation of a base station according to an embodiment of the disclosure.

Scheduling for retransmission may be required because scheduling for initial transmission or decoding for initial transmission has failed. Here, a base station may determine a terminal requiring such scheduling (operation 2010).

Referring to FIG. 20A, the base station may determine an MCS of the scheduling terminal based on the determined channel state information (CSI) of the terminal, and the like (operation 2020).

In addition, the base station may identify the determined $TBS_{Threshold}$ for each terminal (operation 2030), and may determine the scheduling resource size of the terminal based on the $TBS_{Threshold}$ (operation 2040).

Figure 20B:
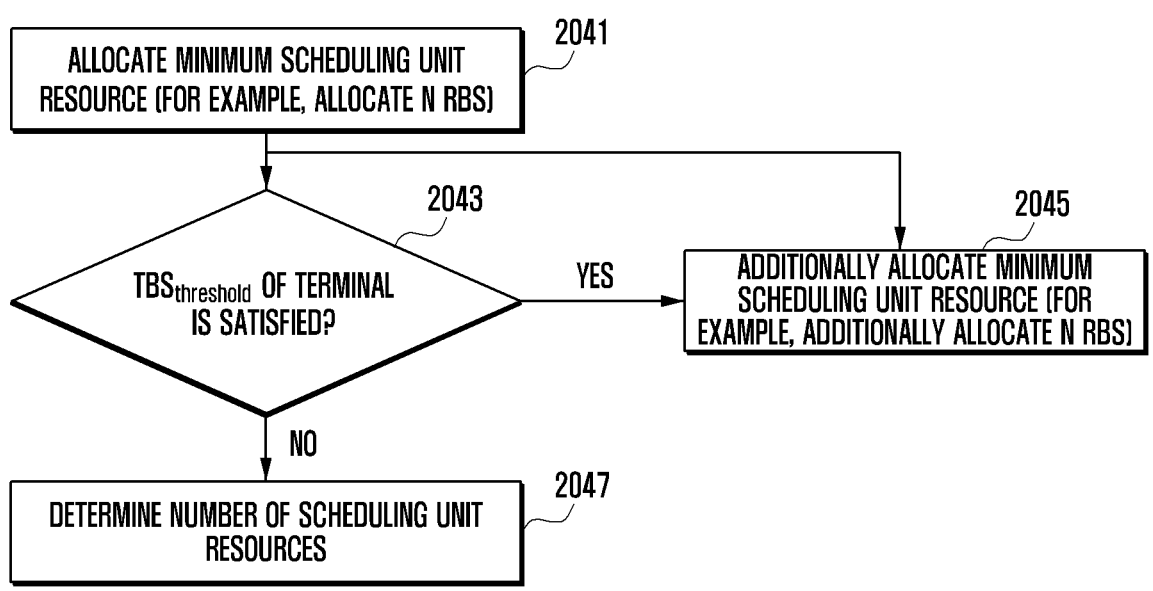
FIG. 20B illustrates an embodiment in which a base station determines a scheduling resource of a terminal according to an embodiment of the disclosure.

FIG. 20B illustrates an embodiment in which a base station determines a scheduling resource of a terminal according to an embodiment of the disclosure.

According to an embodiment of determining the scheduling resource of the terminal, the base station may determine a minimum scheduling unit resource (operation 2041). The minimum scheduling unit resource may be N RBs (wherein, N=1, 2, 3 . . . ).

Referring to FIG. 20B, the base station may apply the minimum scheduling unit resource N differently according to a given situation. For example, the minimum scheduling unit resource may be 1 RB. The base station may compare whether the $TBS_{Threshold}$ of the terminal is satisfied while adding the minimum scheduling unit resource, for example, 1 RB each (operation 2043).

If, as a result of comparison, the $TBS_{Threshold}$ is satisfied (that is, the TBS calculated based on the scheduled RB is less than the $TBS_{Threshold}$), the base station may additionally allocate the minimum scheduling unit resource (operation 2045). If the $TBS_{Threshold}$ is not satisfied (that is, when the TBS calculated based on the scheduled RB is equal to or greater than the $TBS_{Threshold}$), the terminal may determine the number of scheduling unit resources (operation 2047).

According to another embodiment of determining the scheduling resource of the terminal, the base station may pre-calculate a TBS value corresponding to the number of minimum scheduling unit resources and store the same in a table. Therefore, the base station may determine the number of scheduling unit resources satisfying the $TBS_{Threshold}$ value without performing calculation while adding a scheduling unit resource.

The base station may determine whether the scheduling resource of the determined size is available in the corresponding slot. That is, the base station may determine whether the scheduling resource of the determined size can be included in the corresponding slot. If the scheduling resource is available, the base station may finally determine resource allocation to the corresponding terminal, and may transmit DCI or SCI corresponding thereto to the corresponding terminal through the PDCCH. If the scheduling resource is not available, the base station may finally determine not to perform resource allocation in the corresponding slot of the corresponding terminal, or may perform allocation of only the available resources to the corresponding terminal and transmit DCI or SCI corresponding thereto to the corresponding terminal through the PDCCH.

In the above embodiments, examples of PDSCH transmission have been described, but the embodiments may be applied to PUSCH transmission or PSSCH transmission. In this case, UE capability information and base station configuration information related to downlink transmission used in the above embodiments may be changed to UE capability information and base station configuration information related to uplink transmission, and applied.

Thirteenth Example

The thirteenth embodiment provides a method of determining a data rate according to a band used for communication by a terminal or a combination of bands thereof.

The maximum data rate of the sidelink of the terminal may be calculated as described in the first embodiment, the (1-1)th embodiment, the (1-2)th embodiment, and the (1-3) th embodiment, and may be determined according to the UE capability. In particular, the value of f, which is a scaling factor, may be determined as described below.

$f^{(j)}$ is the scaling factor given by higher layer parameter scalingFactor and can take the values 1, 0.8, 0.75, and 0.4.

The f value may be determined according to a scalingFactor parameter, which is higher layer signaling, and the parameter may be determined to be one of values of 0.8, 0.75, and 0.4 (this does not limit a case where a new value is added), and if the parameter is not configured or not reported, the parameter may be regarded as 1.

However, the scalingFactor parameter may be a parameter value that the terminal reports to the base station or reports or transmits to neighboring terminals. The value may differ according to a frequency band supported by the terminal or a combination of frequency bands thereof, and may be transferred using one of the following methods or a combination of the following methods.

Method 1: Scaling Factor is determined using per-Uu-band-combination

Method 2: ScalingFactor is determined using per-PC5-band-combination

Method 3: ScalingFactor is determined using per-Uu-band-combination-and-per-PC5-band-combination Method 4: ScalingFactor is determined using per-PC5-band For example, in a case where method 1 is used, if a combination of (Uu band 1, Uu band 2) correspond to (band 3, band 5), respectively, the f value may be configured to be 0.4 and 0.75. In a case of a combination of different bands, the f value may be different even if the band has the same number.

In the case of using method 3 above, the baseband processing capability which a terminal can use in a PC5 band may differ according to whether the Uu band, in which the terminal performs an operation such as DL reception or UL transmission, is activated or not. On the other hand, the baseband processing capability which the terminal can use in the Uu band, in which the terminal performs an operation such as DL reception or UL transmission, may differ according to whether the terminal activates the PC5 band, that is, whether the terminal is performing a sidelink operation, or whether the terminal activates a V2X function. That is, since the baseband processing capability which the terminal can actually use differs according to whether the Uu and PC5 bands are activated, the f value (used for calculating the data rate) which the terminal should apply needs to be changed.

From the standpoint of the base station, even when DL and UL data transmission to the terminal is scheduled, DL and UL data scheduling methods may need to be changed according to whether the terminal activates the PC5 band, that is, whether the terminal is performing a sidelink operation, or whether the terminal activates the V2X function.

That is, the maximum DL TBS or the maximum UL TBS, which can be scheduled for the terminal by the base station, may be determined according to whether the terminal performs a sidelink operation. For example, depending on whether the terminal is performing a sidelink operation, the maximum TBS that can be scheduled in the DL or UL for the terminal may differ. For example, if the terminal is performing the sidelink operation in the PC5 band, the maximum TBS that can be scheduled in the DL or UL may be smaller. On the other hand, if the terminal is not performing the sidelink operation in the PC5, the maximum TBS that can be scheduled in the DL or UL may be large. However, since the base station does not know whether the terminal is performing the sidelink operation in the PC5 band, the base station may not know how to perform scheduling.

In order to solve the above problems, the following methods may be considered.

Method 1: A terminal may transfer information of a PC5 band or information (e.g., a list of bands) of a combination of PC5 bands, which is being activated by the terminal itself, to a base station. The information may be transferred via higher layer signaling (RRC signaling, UE capability) and the like.

Method 2: A base station may transfer, to a terminal, information on a combination of bands that the base station is currently applying in order to perform scheduling for the terminal. The band combination information may be configured for the terminal as configuration information. That is, this is a method of configuring a band combination applied to the corresponding terminal by the base station. The configured band combination may be one of those included in the UE capability reported by the terminal to the base station.

Method 3: A base station may perform scheduling for a terminal under an assumption that the terminal always activates a PC5 band if the PC5 band is included in a band combination, reported by the terminal via the UE capability. For example, when the terminal reports n71 band and also reports a band combination of n71-n47, if the base station performs scheduling for the terminal in the n71 band, the base station may perform DL and UL scheduling by considering the scaling factor that the terminal reports for the band combination of n71-n47, and may perform data scheduling within a maximum TBS corresponding thereto.

Method 4: A terminal may transfer information of a Uu band or information (e.g., a list of bands) of a combination of Uu bands, which is being activated by the terminal itself, to other neighboring terminals. The information may be transferred via higher layer signaling (RRC signaling, UE capability) and the like.

Method 5: When data transmission through the sidelink is performed, the terminal may generate a sidelink TBS under an assumption that the capability of a neighboring terminal has the smallest value (0.4 in the above example) among scalingFactor values in the corresponding sidelink band, to perform data transmission.

Method 6: A terminal may differently determine whether to perform DL data (PDSCH) reception and UL data (PUSCH) transmission, scheduled by a base station, according to whether the terminal itself is currently performing a PC5 operation. That is, when the terminal reports f=1 for a n71 band (or may not report the f value) and reports, as f=0.75, the scaling value in the n71 band for a band combination of n71-n47, if the terminal is performing transmission/reception or operations related thereto in the sidelink band of n47 band, the terminal may determine whether DL data (PDSCH) reception and UL data (PUSCH) transmission are performed in the n71 band, based on the maximum data rate in the n71 band calculated based on f=0.75.

On the other hand, in the above example, when the terminal is not performing transmission/reception or operations related thereto in the sidelink band n47, the terminal may determine whether DL data (PDSCH) reception and UL data (PUSCH) transmission are performed in the n71 band, based on the maximum data rate calculated based on f=1. On the other hand, even in the case of the sidelink, the required sidelink f value may be determined differently according to whether the sidelink operation is performed in the Uu band, based on the data rate of the sidelink which is to be calculated when determining whether to transmit/receive the sidelink data PSSCH.

The maximum data rate may be calculated, for example, as given in Equation 1, based on the UE capability reported to the base station and parameters which the base station configures for the terminal vial RRC signaling. The maximum data rate of the terminal may be determined based on the baseband processing or signal processing capability of the corresponding terminal, including channel estimation, equalization, channel code decoding, and multi-antenna reception. That is, if a terminal has a high maximum data rate, it can be considered that the terminal has a high signal processing capability. The terminal may calculate a "maximum data rate" for communication with the base station and a "maximum data rate for communication with another terminal, respectively. Depending on a communication counterpart, different values may be used for at least one parameter used when calculating the "maximum data rate". The parameter may include at least a parameter such as f, which is a scalingFactor.

The operation of the terminal performing the current embodiment may be as follows, for example. The operation of the terminal does not require all the described operations to be performed, and one or more operations described below may be performed, and the order thereof may be changed.

Figure 21:
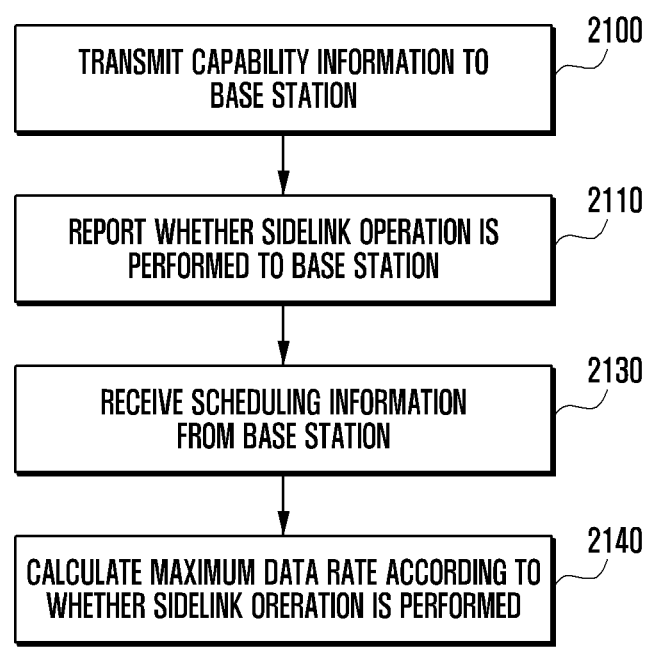
FIG. 21 illustrates an operation of a terminal performing an embodiment of the disclosure.

FIG. 21 illustrates an operation of a terminal performing an embodiment of the disclosure.

Referring to FIG. 21, a terminal may transmit capability information of the terminal itself to a base station (operation 2100). The capability information may include information on a band combination of a Uu band and a PC5 band (which can be supported by the terminal), regarded as capable of coexistence. Thereafter, the terminal reports whether the terminal itself operates a sidelink (or it can be understood as whether the terminal is performing a sidelink operation, whether the terminal has activated a V2X function, etc.) to the base station (operation 2110). Thereafter, the base station may schedule signal transmission/reception for the terminal by considering the UE capability information (operation 2130). The terminal may calculate the "maximum data rate" for communication with the base station and/or the "maximum data rate" for communication with another terminal by using a scaling factor parameter configured according to the current embodiment, according to whether the sidelink is operated (operation 2140). Thereafter, the terminal may transmit or receive a signal to or from the base station and/or another terminal or determine whether transmission or reception is performed, based on the calculated maximum data rate.

Figure 22:
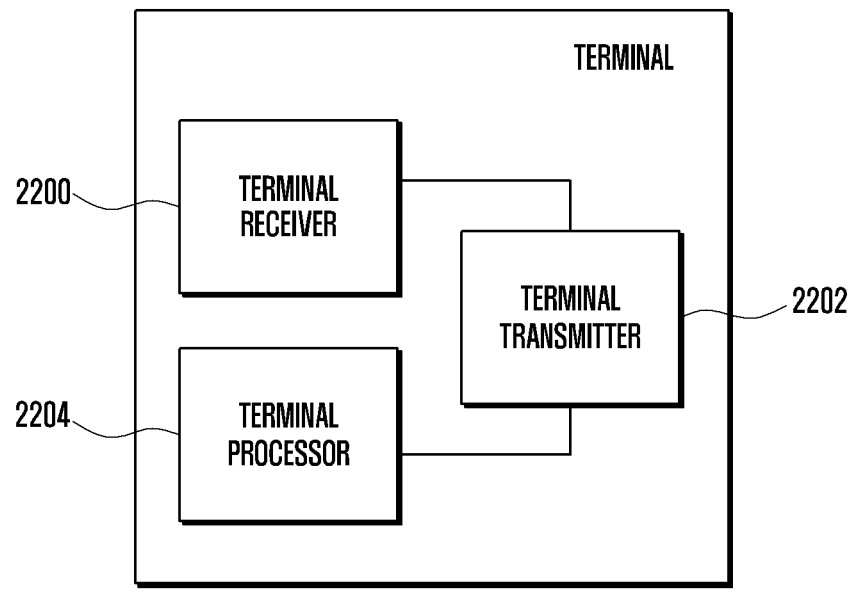
FIG. 22 is a block diagram of a terminal according to an embodiment of the disclosure.
Figure 23:
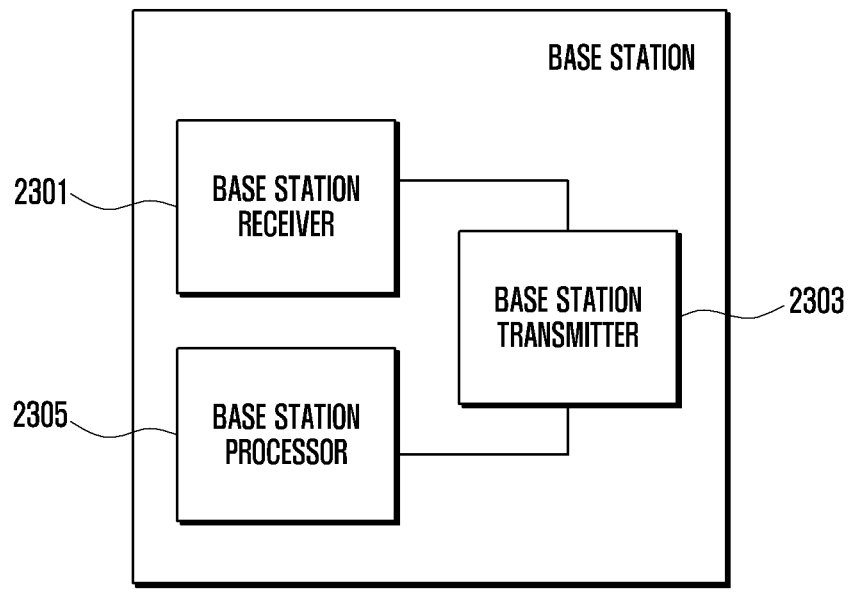
FIG. 23 is a block diagram of a base station according to an embodiment of the disclosure.

A transmitter, a receiver, and a processor of a terminal and a base station for performing the embodiments of the disclosure are shown in FIGS. 22 and 23, respectively. In order to calculate an actual data rate and perform a transmission/reception method according to at least one of various embodiments, a receiver, a processor, and a transmitter of a base station and a terminal may operate according to the embodiments described above.

FIG. 22 is a block diagram of a terminal according to an embodiment of the disclosure.

Referring to FIG. 22, a terminal of the disclosure may include a terminal receiver 2200, a terminal transmitter 2202, and a terminal processor 2204. In the disclosure, the terminal receiver 2200 and the terminal transmitter 2202 may be collectively referred to as a transceiver. The transceiver may transmit or receive a signal to or from a base station. Here, the signal may include control information and data. To this end, the transceiver may include an RF transmitter for up-converting and amplifying a frequency of the transmitted signal, and an RF receiver for low-noise amplifying the received signal and down-converting a frequency of the received signal.

Further, the transceiver may receive a signal through a wireless channel, output the signal to the terminal processor 2204, and transmit the signal output from the terminal processor 2204 through a wireless channel. The terminal processor 2204 may control a series of processes such that the terminal may operate according to the above-described embodiment. For example, the terminal receiver 2200 receives data and control information including scheduling information for data transmission from the base station, and the terminal processor 2204 may compare a peak data rate and a scheduled data amount of the terminal and determine whether to decode and transmit the same, and perform signal processing according thereto. Thereafter, signals that need to be transmitted by the terminal transmitter 2202 may be transmitted to the base station or another terminal.

FIG. 23 is a block diagram of a base station according to an embodiment of the disclosure.

Referring to FIG. 23, a base station of the disclosure may include a base station receiver 2301, a base station transmitter 2303, and a base station processor 2305. In the disclosure, the base station receiver 2301 and the base station transmitter 2303 may be collectively referred to as a transceiver. The transceiver may transmit or receive a signal to or from a terminal. Here, the signal may include control information and data. To this end, the transceiver may include an RF transmitter for up-converting and amplifying a frequency of the transmitted signal, and an RF receiver for low-noise amplifying the received signal and down-converting a frequency of the received signal. Further, the transceiver may receive a signal through a wireless channel, output the signal to the base station processor 2305, and transmit the signal output from the base station processor 2305 through a wireless channel.

The base station processor 2305 may control a series of processes such that the base station may operate according to the above-described embodiment. For example, the base station processor 2305 may calculate a peak data rate of the terminal, determine TBS within a range not exceeding the peak data rate, and schedule the TBS so as to generate control information.

Thereafter, the control information generated by the base station transmitter 2303 may be transmitted, and the base station receiver 2301 may receive an uplink data signal and feedback of the terminal.

In order to solve the above problem, the disclosure provides a method for a terminal in a wireless communication system, the method including: monitoring a physical downlink control channel (PDCCH); identifying whether to determine a scheduling limiting condition based on downlink control information (DCI) decoded as a result of the monitoring; if it is required to determine the scheduling limiting condition, identifying whether a physical downlink shared channel (PDSCH) scheduled through the DCI satisfies the scheduling limiting condition; and receiving data from a base station through the PDSCH when the scheduling limiting condition is satisfied.

In order to solve the above problem, the disclosure provides a terminal including: a transceiver; and a controller configured to: monitor a physical downlink control channel (PDCCH); identify whether to determine a scheduling limiting condition based on downlink control information (DCI) decoded as a result of the monitoring; if it is required to determine the scheduling limiting condition, identify whether a physical downlink shared channel (PDSCH) scheduled through the DCI satisfies the scheduling limiting condition; and receive data from a base station through the PDSCH when the scheduling limiting condition is satisfied.

In the drawings in which methods of the disclosure are described, the order of the description does not always correspond to the order in which operations of each method are performed, and the order relationship between the operations may be changed or the operations may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents. Further, the above respective embodiments may be employed in combination, as necessary. For example, embodiments 1 and 2 may be employed in combination, or a part of embodiment 1 and a part of embodiment 2 may be employed in combination. Further, other variants of the above embodiments, based on the technical idea of the embodiments, may be implemented in LTE and 5G systems.

What is claimed is:

1. A method performed by a terminal in a communication system, the method comprising:
   identifying a counterpart of a communication of the terminal as another terminal;
   obtaining at least one parameter for identifying a data rate for the communication; and
   identifying the data rate based on the at least one parameter and following equation:

$$\text{data rate (in } Mbps) = 10^{-6} \cdot v_{Layers} \cdot f \cdot Q_m \cdot R_{max} \cdot \frac{N_{PRB}^{BW,\mu} \cdot 12}{T_s^{\mu}} \cdot (1 - OH),$$

wherein the at least one parameter comprises an overhead parameter OH, a modulation parameter $Q_m$ being a maximum supported modulation order of the terminal between 6 or 8, and a scaling factor f being configured by higher layer signaling, and wherein the $v_{Layers}$ indicate a maximum number of supportable layers, $R_{max}$ equals to 948/1024, $T_s^\mu$ indicates an average orthogonal frequency division multiplexing (OFDM) symbol duration in a subframe for numerology $\mu$, $N_{PRB}^{BW(j),\mu}$ indicates a maximum number of resource blocks (RBs) (or a physical resource block (PRB)) in a bandwidth j ($BW^{(j)}$) with numerology $\mu$.

2. The method of claim 1,
wherein a value of the overhead parameter is based on a frequency range associated with the communication with the other terminal.

3. The method of claim 2, wherein the value of the overhead parameter of a frequency range under 6 GHz is larger than 2/12.

4. The method of claim 1, wherein one of a value of the scaling factor is 1.

5. The method of claim 1, wherein the at least one parameter comprises the $v_{Layers}$ being the maximum number of supported layers for the communication with the other terminal configured by higher layer signaling.

6. A terminal in a communication system, the terminal comprising:
a transceiver; and
a controller coupled with the transceiver and configured to:
identify a counterpart of a communication of the terminal as another terminal,
obtain at least one parameter for identifying a data rate for the communication, and
identify the data rate based on the at least one parameter and following equation:

$$\text{data rate (in Mbps)} = 10^{-6} \cdot v_{Layers} \cdot f \cdot Q_m \cdot R_{max} \cdot \frac{N_{PRB}^{BW(j),\mu} \cdot 12}{T_s^\mu} \cdot (1 - OH^{(j)}),$$

wherein the at least one parameter comprises an overhead parameter (OH), a modulation parameter $Q_m$ being a maximum supported modulation order of the terminal between 6 or 8, and a scaling factor f being configured by higher layer signaling, and
wherein the $v_{Layers}$ indicate a maximum number of supportable layers, $R_{max}$ equals to 948/1024, $T_s^\mu$ indicates an average orthogonal frequency division multiplexing (OFDM) symbol duration in a subframe for numerology $\mu$, $N_{PRB}^{BW(j),\mu}$ indicates a maximum number of resource blocks (RBs) (or a physical resource block (PRB)) in a bandwidth j ($BW^{(j)}$) with numerology $\mu$.

7. The terminal of claim 6,
wherein a value of the overhead parameter is based on a frequency range associated with the communication with the other terminal.

8. The terminal of claim 7, wherein the value of the overhead parameter of a frequency range under 6 GHz is larger than 2/12.

9. The terminal of claim 6, wherein one of a value of the scaling factor is 1.

10. The terminal of claim 6, wherein the at least one parameter comprises the $v_{Layers}$ being the maximum number of supported layers for the communication with the other terminal configured by higher layer signaling.

\* \* \* \* \*